US006826477B2

(12) United States Patent
Ladetto et al.

(10) Patent No.: US 6,826,477 B2
(45) Date of Patent: Nov. 30, 2004

(54) PEDESTRIAN NAVIGATION METHOD AND APPARATUS OPERATIVE IN A DEAD RECKONING MODE

(75) Inventors: Quentin Ladetto, Ecublens (CH); Vincent Gabaglio, Fribourg (CH); Josephus Van Seeters, Balgach (CH)

(73) Assignee: Ecole Polytechnique Federale de Lausanne (EPFL), Lausanne (CH)

( * ) Notice: Subject to any disclaimer, the term of this patent is extended or adjusted under 35 U.S.C. 154(b) by 89 days.

(21) Appl. No.: 09/839,204

(22) Filed: Apr. 23, 2001

(65) Prior Publication Data

US 2003/0018430 A1 Jan. 23, 2003

(51) Int. Cl.[7] .............................................. C01C 21/00
(52) U.S. Cl. ...................... 701/217; 701/213; 701/200; 340/944; 73/178 R
(58) Field of Search ................................ 701/217, 213, 701/200; 73/178 R; 340/944

(56) References Cited

U.S. PATENT DOCUMENTS

| | | | | |
|---|---|---|---|---|
| 5,583,776 A | * | 12/1996 | Levi et al. ................... 701/200 |
| 5,800,314 A | * | 9/1998 | Sakakibara et al. ............ 482/1 |
| 5,976,083 A | * | 11/1999 | Richardson et al. ........... 482/8 |
| 6,119,065 A | * | 9/2000 | Shimada et al. ............ 340/944 |
| 6,127,945 A | * | 10/2000 | Mura-Smith ................ 340/539 |
| 6,132,391 A | * | 10/2000 | Onari et al. ................ 600/595 |
| 6,135,951 A | * | 10/2000 | Richardson et al. ........... 482/8 |
| 6,167,346 A | * | 12/2000 | Fukawa .................. 342/357.13 |
| 6,184,847 B1 | * | 2/2001 | Fateh et al. .................. 345/729 |
| 6,185,157 B1 | * | 2/2001 | Farine ......................... 33/349 |
| 6,208,934 B1 | * | 3/2001 | Bechtolsheim et al. ..... 340/988 |
| 6,254,513 B1 | * | 7/2001 | Takenaka et al. ........... 235/105 |
| 6,266,615 B1 | * | 7/2001 | Jin .............................. 340/995 |
| 6,347,278 B2 | * | 2/2002 | Ito .............................. 340/988 |
| 6,359,603 B1 | * | 3/2002 | Zwern ........................ 345/158 |
| 6,366,856 B1 | * | 4/2002 | Johnson ...................... 701/200 |
| 6,388,615 B1 | * | 5/2002 | Chang et al. ............... 342/354 |
| 6,401,037 B1 | * | 6/2002 | Muller et al. .......... 342/357.08 |
| 6,426,719 B1 | * | 7/2002 | Nagareda et al. ........ 340/573.1 |
| 6,427,120 B1 | * | 7/2002 | Garin et al. ........... 342/357.09 |
| 6,442,480 B1 | * | 8/2002 | Takahashi ................... 340/500 |
| 6,445,364 B2 | * | 9/2002 | Zwern ........................ 345/156 |
| 6,452,544 B1 | * | 9/2002 | Hakala et al. ......... 342/357.06 |

FOREIGN PATENT DOCUMENTS

JP          A 2001-041766         2/2001

OTHER PUBLICATIONS

English abstract of JP 2001041776– Feb. 16, 2001— Traqveling body position recongization method and device as well as recording medium having processing program thereof recorded therein.*

(List continued on next page.)

Primary Examiner—Thomas G. Black
Assistant Examiner—Olga Hernandez
(74) Attorney, Agent, or Firm—Oliff & Berridge, PLC

(57) ABSTRACT

A displacement of a pedestrian is determined from his or her accelerations by detecting accelerations which is substantially non vertical, determining a characteristic feature in the detected accelerations correlated with a step frequency, determining the displacement on the basis of said determined characteristic.

The acceleration data can be submitted to waveform analysis to determine an actualized time interval of an occurring feature, such a maximum values, from which it is determined whether the actualized time period falls within determined limit values. The currently detected characteristic feature is then determined as corresponding to a displacement step if the actualized time period falls within said determined limit value.

By using non-vertical acceleration measurements, the invention can make it possible to distinguish between forward, backward, left and right stepping movements and take these into account for the navigation.

139 Claims, 28 Drawing Sheets

OTHER PUBLICATIONS

"Travail macanique dans la marche et la course", Giovanni A. Cavagna, J. Physiol. Paris, 1969, pp. 3–42.

"Biomechanics and energetics of muscular exercise", Rodolfo Margaria, Oxford, Clarendon Press, 1976.

"Improvement of walking speed prediction by acclerometry using altimetry, validated by Satellite positioning", O. Perrin et al., Medical & Biological Engineering & Computing, 38:164–168, 2000.

The relationship between velocity, stride time, support time and swing time during normal walking:, P. Rosenrot et al., Dr. Journal of Human Movement Studies, 1980, 6, 232–335.

"Gait analysis of slope walking: a study on step length, stride width, time factors and deviation in the center of pressure", Kenji Kawamura et al., Acta Medical Okayama 45: 179–184, 1991.

* cited by examiner

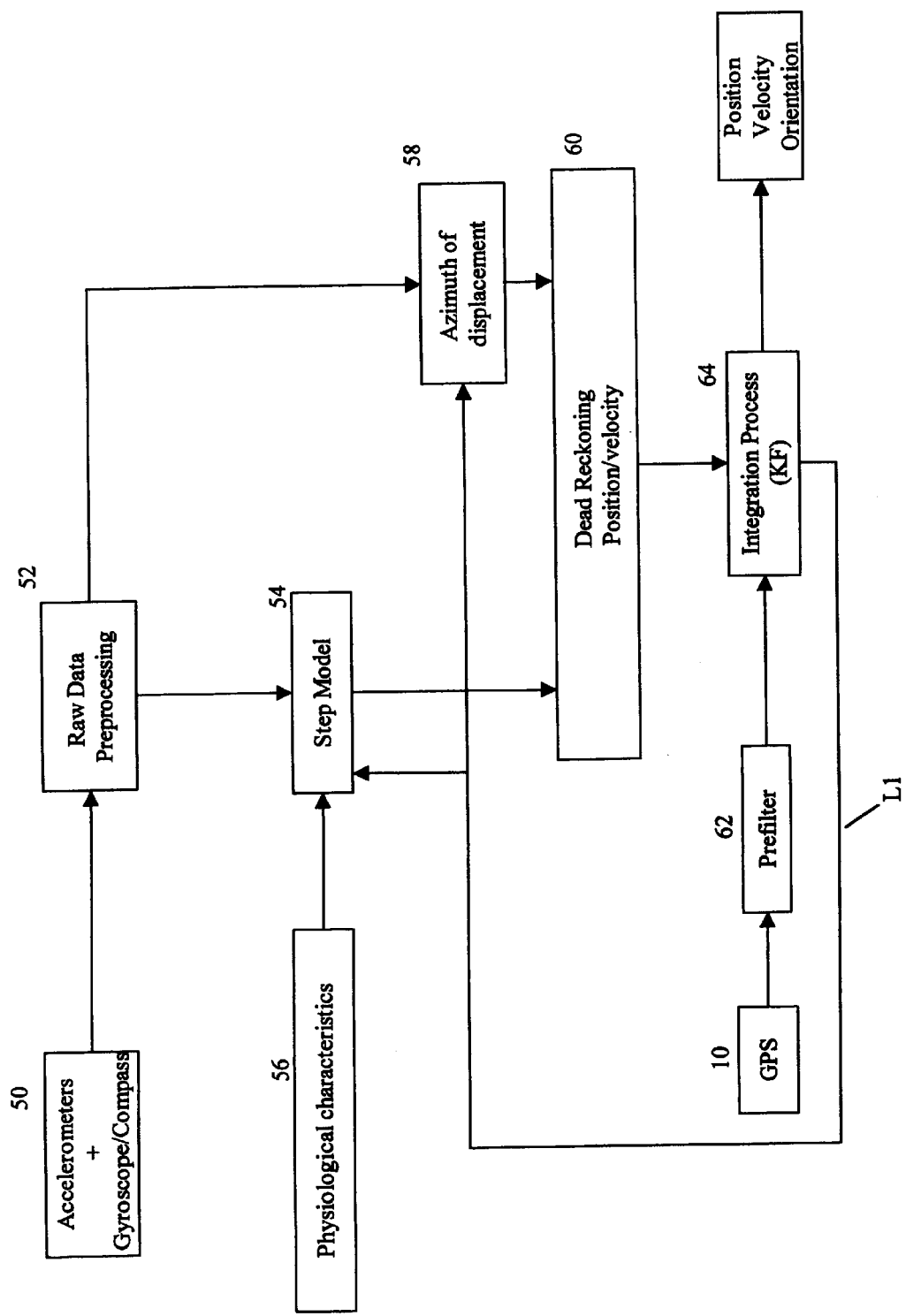

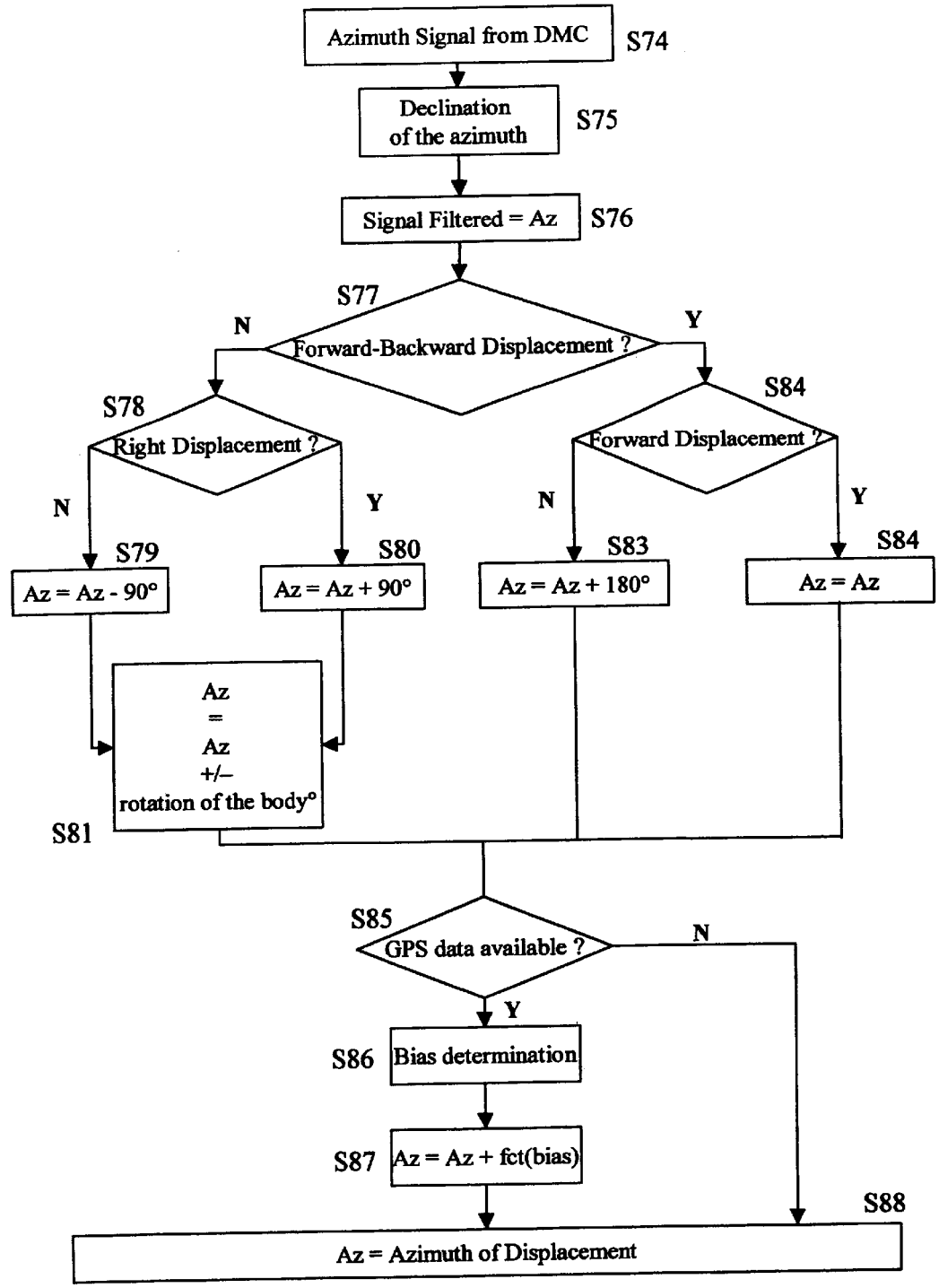

Fig 12 F, Step S61 and following

PEDESTRIAN NAVIGATION METHOD AND APPARATUS OPERATIVE IN A DEAD RECKONING MODE

BACKGROUND OF THE INVENTION

1. Field of the Invention

The present invention relates to the field of pedestrian navigation, based at least partially on a so-called "dead reckoning" (DR) approach, in which the evolving position of a pedestrian is determined from within his or her frame of reference. In other words, navigation by DR does not rely on means which use external positional references, such as GPS (global positioning by satellite), rangefinders, etc. It can however make use of the Earth's magnetic field to determine a compass bearing. Navigation by dead reckoning is required when external position references are not available or exploitable. For instance, GPS data cannot reach a pedestrian in surroundings at least partially hidden from elevational lines of sight: buildings, shadowed zones, dense forests, etc. or in case of jamming. GPS data can be used to complement dead reckoning data and also to establish initial calibration and parameterization.

2. Prior Art

Pedestrian navigation by DR is generally based on the detection of body movements during walking. A classical pedometer is one example based on such an approach, where a harmonic motion of a limb is used to count steps. The step count can then be multiplied by a computed stride length to yield an approximate estimate of a total traveled distance. However, a simple pedometer cannot indicate the pedestrian's net displacement in a random walk situation, as the direction of motion is not detected.

More sophisticated pedestrian DR navigation systems aim to estimate walking speed and direction in a combined manner to provide an indication of a net displacement from a known reference point. They also take into account the fact that the stride length varies with walking speed, and cannot be used as a constant factor, as in the case of a simple pedometer.

An example of such a system is disclosed in patent document U.S. Pat. No. 5,583,776 to Levi and Judd. Here, an accelerometer is used to provide acceleration data indicative of footsteps. Specifically, the accelerometer is set to measure a periodic variation in the vertical direction (i.e. in the head-foot alignment). A waveform analysis algorithm based on Fourier analysis is used to detect peaks in the vertical acceleration, these establishing the step frequency. The distance traveled is then derived on the basis of an initial calibration phase, in which a correspondence is established between the pedestrian's walking speed and the fundamental frequency of the vertical acceleration peaks in the frequency spectrum. North and East accumulators are used to track the evolution in direction with the distance traveled.

The vertical acceleration is produced by foot impacts with the ground. This means that the frequency spectrum from the accelerometer varies not only from one person to another, but also on ground conditions. The latter thus constitute an additional variable parameter that must be accommodated by the algorithm. Limits are quickly reached, however, and reliable navigation cannot be expected when the pedestrian is on soft or uneven ground (e.g. muddy fields, gravel, rubble, etc.). Under such conditions, steps can be missed out or over-counted, giving rise to accumulated errors quickly rising to unacceptable levels.

Reliance on vertical acceleration can also lead to false step detection when the pedestrian is jumping on the spot.

Moreover, vertical acceleration data alone does not provide a distinction between normal forward motion steps and backward steps. In other words, it cannot resolve forward/backward motion ambiguity in the pedestrian's step directions. Similarly, vertical acceleration data alone cannot serve to detect side stepping motion, let alone distinguish between left and right side steps. This can be an important drawback for pedestrians such as infantrymen, firefighters, sportsmen, people walking through crowds, cluttered environments, etc. who may be expected to make backward and side movements.

Moreover, vertical acceleration data does not provide a means for identifying steps when climbing up or down stairs in the state of the art.

Finally, useful vertical acceleration data is clearly absent when the pedestrian is effecting a crawling movement.

SUMMARY OF THE INVENTION WITH OBJECTS

It is an object of the present invention to provide a means of pedestrian navigation by dead reckoning (DR), which does not suffer the drawbacks of prior art approaches based on vertical acceleration measurements as the sole source of acceleration data.

The invention thus proposes a new approach to pedestrian navigation which either does not make use of vertical acceleration data, or else uses vertical acceleration, but in conjunction with non-vertical acceleration data, the former complementing the latter.

It is also an object of the invention to provide a compact and highly accurate dead reckoning mode pedestrian navigation apparatus by making use of standard miniaturized inertial navigation system (INS) modules as a source of accelerometric signals. In accordance with this aspect of the invention, one or more signal outputs of an INS module (typically corresponding to three orthogonal axes) is/are analyzed for peak detection, as opposed to being integrated in time in the case of a normal INS application for vehicle navigation. This way of exploiting an INS module output is advantageous from the point of view of miniaturization, economics, accuracy and reliability. It also makes it possible to exploit other sensing devices contained in commercially available INS modules, such as gyroscopes or a digital magnetic compass, temperature or pressure sensors, processor, etc. for realizing the pedestrian navigation apparatus according to the invention. When such an INS module is thus implemented in accordance with the invention, it shall be referred to as a "pedestrian navigation system" (PNS) module.

According to a first aspect, the invention proposes method of determining a displacement of a pedestrian by detecting accelerations of the pedestrian, the method comprising the steps of:

detecting accelerations along a direction which is substantially non-vertical, determining at least one characteristic feature of the detected accelerations correlated with a displacement step motion, and determining the displacement on the basis of the determined characteristic feature(s).

The term vertical refers to the direction given by a plumb line, following the usual definition.

Preferably, as will appear further, the accelerations are detected along a direction which is substantially perpendicular to the vertical direction.

The characteristic determination step may comprise the sub-steps of:
- detecting a repetition of a the characteristic feature in the accelerations,
- measuring a time interval separating a currently detected and a previously detected the characteristic feature, and
- determining whether the time interval falls within at least one of an upper and a lower limit,
- wherein the displacement determining step comprises the step of considering the currently detected characteristic feature as corresponding to a displacement step if the time interval falls within the limit(s).
- the characteristic feature can be a maximum acceleration value or a minimum acceleration value in a determined group of detected acceleration values acquired in a time window.

The acceleration is preferably detected along an antero-posterior (forward-backward) direction of the pedestrian and, depending on the algorithm used, possibly also along a lateral (left-right) direction of the pedestrian.

The step characteristic feature determining step preferably involves determining a peak acceleration from the detected accelerations and correlating the peak with a motion of the body corresponding to a displacement.

The method may further comprise the step of detecting whether the pedestrian is moving or not, the determining step comprising:
- acquiring acceleration values during a time interval,
- calculating a variance in the acquired acceleration values,
- comparing the variance to a determined threshold, and
- considering that the pedestrian is moving if the variance is superior to the threshold, It may also further comprise determining a direction, relative to the pedestrian, of a detected step.

In this connection, there can be provided a step of distinguishing between whether the pedestrian is making a step in an antero-posterior sense (forward or backward direction) on the one hand, and in a lateral sense (left or right direction) on the other, the distinguishing step comprising:
- determining a variance of successive acceleration values over a given time period for both an acceleration in the antero-posterior sense and in the lateral sense,
- comparing the variance determined for the antero-posterior acceleration values with the variance determined for the lateral acceleration values,
- determining that the pedestrian is making a step in the antero-posterior sense if the variance of the antero-posterior acceleration values exceeds the variance of the lateral acceleration values, and
- determining that the pedestrian is making a step in the lateral sense if the variance of the lateral acceleration values exceeds the variance of the antero-posterior acceleration values.

There can also be provided a step of distinguishing between forward and backward steps relative to the pedestrian, the distinguishing step comprising:
- detecting accelerations along an antero-posterior (forward-backward) direction relative to the pedestrian,
- determining a time of occurrence of a current first characteristic value and a previous first characteristic value in the antero-posterior accelerations,
- determining whether a time interval separating the current and previous first characteristic values is within determined time limits,
- determining a time of occurrence of a second characteristic value in the antero-posterior accelerations occurring within a time range at least sufficiently large to contain the determined time limits, and
- discriminating between a forward and a backward step on the basis of the order of occurrence of the current first characteristic value and the second characteristic value.

In the above case, the first characteristic value can be a maximum value in a group of detected acceleration values, and the second characteristic value a minimum value of the detected accelerations, the displacement step being determined as corresponding to a forward displacement step if the minimum value precedes the maximum value, and as corresponding to a backward step if the maximum value precedes the minimum value.

Similarly, the method may comprise a step of distinguishing between left and right displacement steps relative to the pedestrian, the distinguishing step comprising:
- detecting accelerations along a lateral (left-right) direction relative to the pedestrian,
- determining a time of occurrence of a current first characteristic value and a previous first characteristic value in the lateral accelerations,
- determining whether a time interval separating the current and previous first characteristic values is within determined time limits,
- determining a time of occurrence of a second characteristic value in the lateral accelerations occurring within a time range at least sufficiently large to contain the determined time limits, and
- discriminating between a left and a right step on the basis of the order of occurrence of the current first characteristic value and the second characteristic value.

Likewise, the first characteristic value can be a maximum value in a group of detected acceleration values, and the second characteristic value can be a minimum value of the detected accelerations, the displacement step being determined as corresponding to a right displacement step if the minimum value precedes the maximum value, and as corresponding to a left displacement step if the maximum value precedes the minimum value.

The acceleration detecting step can also further comprise detecting accelerations along the vertical direction.

The characteristic determination step can comprise the sub-steps of:
- determining a first time corresponding to an occurrence of a characteristic feature in the accelerations along a direction substantially perpendicular to a vertical direction of the pedestrian,
- detecting accelerations along a vertical direction of the pedestrian,
- determining a second time corresponding to an occurrence of the characteristic feature in the accelerations along a vertical direction of the pedestrian,
- comparing the first and second times, and
- using a result of the comparison to confirm the presence of a displacement step.

In this case, the characteristic feature can be a maximum acceleration value in a determined group of detected acceleration values.

In one embodiment, a step direction in at least one of an antero-posterior (forward-backward) sense and a lateral (left-right) sense is distinguished using a model adapted to recognize patterns in detected acceleration values that are representative of specific step directions. The model in question can be a Hidden Markov Model.

Advantageously,
the acceleration detecting step comprises acquiring successive acceleration values,
the characteristic and displacement determination steps comprise the sub-steps of:
determining a current peak acceleration in the successive acceleration values by means of a sliding window,
determining a variance of the successive acceleration values acquired between the current peak and a previous peak acceleration value,
comparing the variance to an adaptive threshold to detect if the pedestrian is walking or not,
determining whether the time interval between two successive peak acceleration values falls within a physiologically possible time interval, and
storing the time of acquisition of the current peak acceleration value as the time of occurrence of a detected foot impact corresponding to a displacement step.

The displacement determining step can involve determining a distance traveled by using at least one first model which yields a pedestrian displacement speed in response to a variance and/or a frequency of occurrence of the characteristic feature in values of the acquired accelerations, and at least a time indicator or a second model which correlates a pedestrian displacement speed obtained by the first model with a step length.

The first mathematical model can correlate displacement speed with the variance in accordance with the following relationship:

2-dimensional relative speed=$D*(variance)^E+F*$frequency of steps where D, E and F are numerical coefficients from which D and F can be set equal to 0 or a finite value, 2-dimensional displacement speed being obtained by multiplying the 2-dimensional relative speed by stature or the leg length according to the model which is chosen and 3-dimensional displacement speed then being computed by adding the vertical displacement $v_{baro}$ to the 2-dimensional displacement speed.

It may also correlate displacement speed with either the variance or a frequency of occurrence of the characteristic feature in accordance with the following relationship:

2-dimensional relative speed=$A*$(Frequency or Variance)$^B+C$, where AB, and C are numerical coefficients. Relative speed is determined by dividing the velocity by stature or by leg-length, according to the model which is chosen, 2-dimensional displacement speed being obtained by multiplying the 2-dimensional relative speed by stature or the leg length according to the model which is chosen and 3-dimensional displacement speed then being computed by adding the vertical displacement $v_{baro}$ to the 2-dimensional displacement speed.

The time indicator can correspond to a time interval between two successive said characteristic features, whereby:

step length=speed*time between two successive characteristic features

The second mathematical model can correlate step length with displacement speed in accordance with the following relationship:

step length=$sl_0+m\times$displacement speed;

where $sl_0$ is a fraction of the step length which is constant and independent of speed of progression, and m is a slope of a function describing the step length as a function of displacement speed.

An initial $sl_0$ value is preferably determined with different model for a male or a female pedestrian.

There can be further provided the step of updating at least one parameter of the second mathematical model on the basis of external positioning data, such as data from a global positioning by satellite (GPS) system.

The displacement determining step can involve calculating a displacement on foot and/or a displacement speed of the pedestrian.

Preferably, the method comprises the step of azimuth computation for each step or group of steps effected to determine a position of the pedestrian.

An azimuth computation can be computed for each determined displacement step, the computation e.g. comprising the steps of:
distinguishing a direction of a step between forward, backward, left and right displacement steps,
detecting an azimuth from a sensor carried by the pedestrian,
correcting the detected azimuth with bias and an offset angle in accordance with a distinguished of step.

In the above case, the azimuth computation can be performed from azimuth signals produced by magnetic sensor means or by magnetic sensor means yielding raw angular data signals, the step comprising a sub step of extracting the cosine and sine components of the raw azimuth data and filtering the cosine and sine components.

The azimuth computation can also be performed from azimuth signals produced by a gyroscopic sensor.

In one embodiment where the azimuth computation is performed by magnetic sensor means and by other sensor means not dependent on the North magnetic field, such as gyroscope means, the method may further comprise the steps:
comparing azimuth readings from the magnetic and the other sensor means, and
ignoring azimuth readings from the magnetic sensor means if the comparison step reveals a discrepancy between the readings exceeding a limit value, indicative of a significant magnetic disturbance.

Advantageously, there is further provided a step of detecting an about turn in a displacement of the pedestrian, comprising:
detecting a condition in which an azimuth rate of change of the pedestrian exceeds a determined threshold,
determining whether the azimuth rate of change corresponds roughly to a 180° turn,
in the affirmative, determining whether alignments of trajectories before and after the turn are the same to within a determined discrepancy limit,
in the affirmative, considering that an about turn is effected.

In the above procedure, any step made during a period in which the azimuth rate of change exceeds the determined threshold is preferably not used to calculate a distance of displacement.

An azimuth in the above procedure can be calculated on the basis of an average between the alignments corresponding to a forward and return path.

The about turn can be considered to be effected only on the further condition that the azimuth measured after the determined turn is 180° different respect to the other. The person is considered as going back on his or her footsteps only while the trajectory effected after the azimuth rate of change of the pedestrian exceeds a determined threshold is statistically shorter than or equal to a trajectory effected before the azimuth rate of change of the pedestrian exceeds a determined threshold.

The method can further comprise the step of acquiring barometer data to determine an elevational component in the determined displacement.

Satellite positioning means can also be used to correct displacement information obtained through the accelerations.

The accelerations can be detected by acceleration sensor means mounted on the waist or trunk of the pedestrian.

The accelerations can be detected by using sensors of an inertial navigation system (INS). These can housed in a module together with azimuth detection means, the azimuth detection means being one of a magnetometer means and gyroscope means, and being used to acquire azimuth data.

The accelerations can be detected by means of three mutually orthogonal acceleration sensors each delivering an acceleration component of a respective orthogonal axis on a separate channel.

More economical embodiments of the invention can be contemplated, in which the accelerations are detected by means of two mutually orthogonal acceleration sensors each delivering an acceleration component operatively aligned along a respective orthogonal axis, the alignment of at least one of the sensors having a component in a non vertical direction when operatively carried by the pedestrian.

In the above two-sensor embodiment, at least one the axis of an accelerometer is preferably inclined with respect to a vertical axis of the pedestrian.

According to a second aspect, the invention provides a method of pedestrian navigation operative in a dead reckoning mode, comprising the steps of:

detecting an evolving signal indicative of accelerations of the pedestrian in the antero-posterior (forward-backward) direction, analyzing the signals to determine a variation therein conforming to predetermined constraints, using the variation to establish a displacement step motion and to determine displacement information comprising at least one of a speed and distance of displacement, determining an azimuth of the pedestrian, and combining the displacement data with the azimuth to obtain pedestrian navigation information.

According to a third aspect, the invention provides a method of pedestrian navigation operative in a dead reckoning mode, comprising the steps of:

using an Inertial Navigation System (INS) as a source acceleration signals, the system having a motion detection sensor responsive to accelerations along the antero-posterior (forward-backward) direction of the pedestrian, submitting signals from the INS to a waveform analysis to determine a step of the pedestrian, and determining pedestrian navigation information on the basis of the waveform analysis.

The INS may also have a motion sensor responsive to accelerations along a lateral (left-right) direction of the pedestrian, signals therefrom being submitted to a waveform analysis to determine a left or right displacement effected by the pedestrian.

The INS may also have a motion sensor responsive to accelerations along a vertical direction of the pedestrian, signals therefrom being submitted to a waveform analysis to provide a confirmation of a determination of a displacement step.

The INS may further comprise bearing detection means in the form of magnetometer means and/or gyroscope means, the means being used to obtain an azimuth of the pedestrian for the determination of the navigation information.

The INS can be in the form of a module carried on the waist or trunk of the pedestrian.

According to a fourth aspect, the invention provides an apparatus for determining a displacement of a pedestrian by detecting accelerations of said pedestrian, said apparatus comprising:

sensing means for detecting accelerations along a direction which is substantially non vertical, characteristic determining means for determining at least one characteristic feature of said detected accelerations correlated with a displacement step motion, and displacement determining means for determining said displacement on the basis of said determined characteristic feature(s).

According to a fifth aspect, the invention provides an apparatus for pedestrian navigation operative in a dead reckoning mode, comprising:

means for detecting an evolving signal indicative of accelerations of said pedestrian in the antero-posterior (forward-backward) direction, means for analyzing said signals to determine a variation therein conforming to predetermined constraints, means using said variation to establish a displacement step motion and to determine displacement information comprising at least one of a speed and distance of displacement, means for determining an azimuth of said pedestrian, and means for combining said displacement data with said azimuth to obtain pedestrian navigation information.

According to a sixth aspect, the invention provides an apparatus for pedestrian navigation operative in a dead reckoning mode, comprising:

an Inertial Navigation System (INS) serving as a source acceleration signals, said system having a motion detection sensor aligned along the antero-posterior (forward-backward) direction of said pedestrian, means for submitting signals from said INS to a waveform analysis to determine a step of said pedestrian, and means for determining pedestrian navigation information on the basis of said waveform analysis.

It shall be noted that the optional aspects of the invention presented above in the context of the method apply mutatis mutandis to the apparatus forms of the invention.

BRIEF DESCRIPTION OF THE FIGURES

The invention and its advantages shall become more apparent upon reading the following description of the preferred embodiments, given purely as non-limiting examples, in conjunction with the appended drawings in which:

FIG. 11 is a block diagram giving a general overview an algorithm for producing navigation information from different sensor data and a parameterized physiological model in accordance with the invention;

FIGS. 12A to 12L are flow charts showing in detail the algorithm used for producing navigation information in accordance with the invention;

DETAILED DESCRIPTION OF THE PREFERRED EMBODIMENTS

Figure 1:
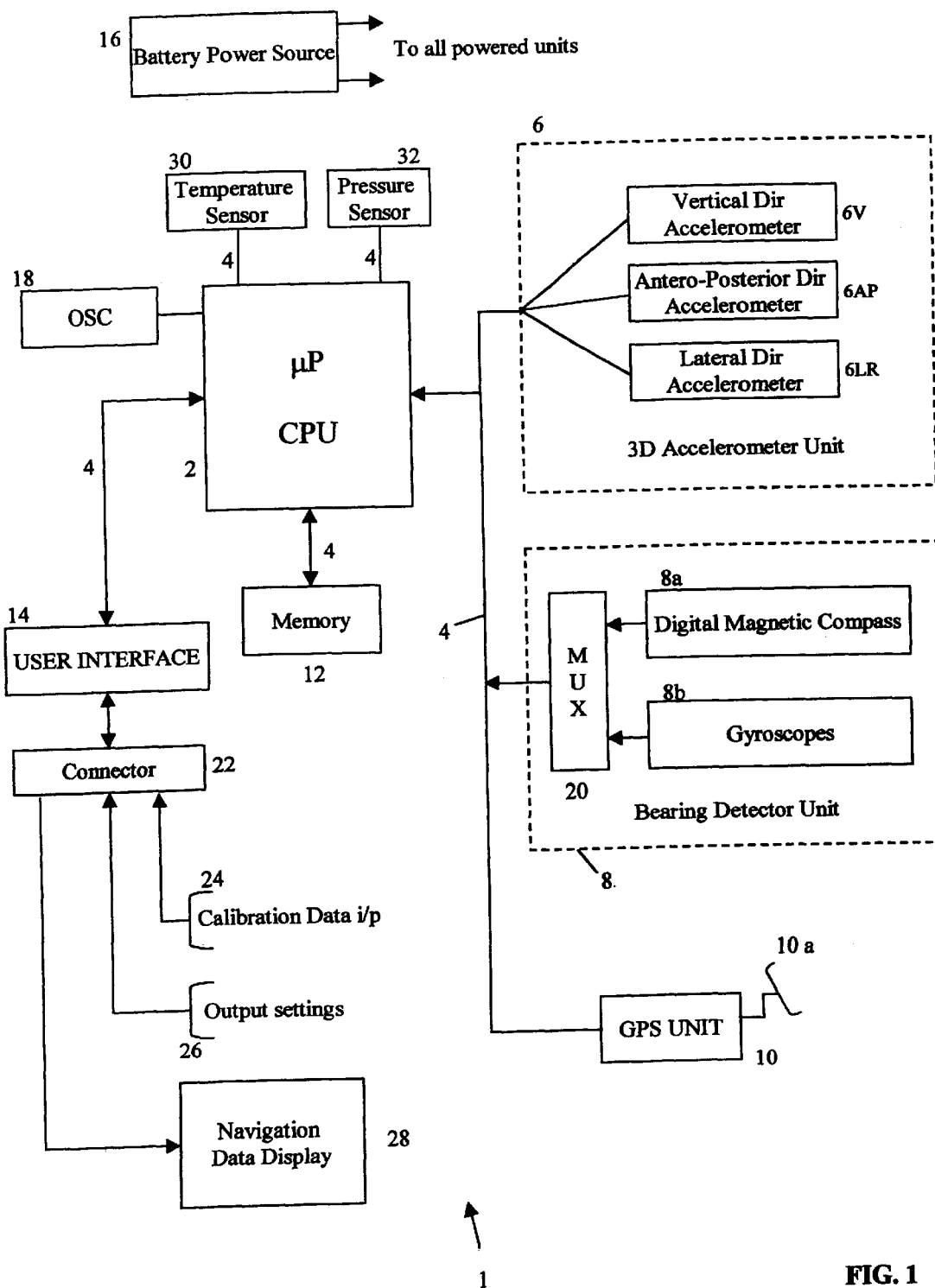
FIG. 1 is a block diagram showing the functional units that constitute a pedestrian navigation apparatus in accordance with a preferred embodiment of the invention.

The main functional units of a pedestrian navigation apparatus shall be described with reference to the block diagram of FIG. 1. The apparatus 1 is housed in a small, self-contained portable unit that can be carried unobtrusively on the person. It comprises a main microprocessor unit (CPU) 2 functionally connected through a two-way bus system 4 to the following units:

a three-dimensional (3D) accelerometer unit 6,
a bearing detector 8,
a GPS (global positioning by satellite) device 10,
a memory unit 12, and
a user interface 14.

The power to the microprocessor and all the above units is obtained from an internal battery 16. The necessary clock signals for the microprocessor and other synchronous logic portions of the apparatus are delivered by an internal quartz oscillator 18.

The above configuration corresponds to a full-specification embodiment of the invention; less complex embodiments can be envisaged, notably by simplifying the 3D accelerometer unit 6 and/or the bearing detector 8.

The memory unit 12 comprises ROM and RAM portions respectively for storing fixed data, such as internal management code and temporary data, such as navigational data, updatable physiological models, user parameters, etc. as shall appear further.

The 3D accelerometer unit 6 comprises three separate accelerometers 6V, 6AP and 6LR configured and oriented to yield signals representing respectively: a vertical acceleration, an antero-posterior (i.e. forward-backward) acceleration, and a lateral (i.e. left-right) acceleration. All these three directions are defined relative to a human pedestrian wearing the apparatus in the prescribed manner.

The bearing detector unit 8 contains two separate sensor devices which independently provide bearing data: a digital magnetic compass (DMC) 8a and/or a gyro 8b. One or the other of these sensor devices 8a, 8b can be selected at the level of the microprocessor 2 through a multiplexer 20 connecting them to the data bus 4.

The GPS unit 10 is operative when the apparatus is not in a dead reckoning (DR) mode or for updating navigational data at determined moments, when overhead conditions allow. The GPS unit 10 may be physically separated from the apparatus housing, at least as far as its miniature aerial 10a is concerned, for optimum exposure.

All the above units are periodically accessed and driven through an internal management program stored in the memory unit 12.

The user interface 14 provides a two-way communication port between the microprocessor 2 and the outside world. The ports are terminated by a connector 22 on the apparatus housing, which allows the apparatus 1 to be temporarily coupled to receive calibration data 24, output settings 26 for the downloading of acquired navigation data and internal diagnosis data, and to deliver navigation data on a display 28. The interface 14 may also provide a permanent or semi-permanent connection to some form of remotely-connected navigation indicator display (not shown) carried by the pedestrian, e.g. on the wrist front part of the body.

In order to establish 3D navigation data taking elevation into account, the apparatus 1 also incorporates a temperature sensor 30 and a pressure sensor 32.

In the embodiment, the 3D accelerometer 8 and the digital magnetic compass 8a are contained in a combined module which is commercially available from Leica Geosystems AG, Defense and Special Projects, CH-9435 Heerbrugg, Switzerland, (or Leica Technologies Inc., 107 North King Street, Leesburg, Va. 20176-2820, USA) under product reference "Leica DMC-SX"). Full technical details on this module can also be obtained from the Internet address www.leica-geosystems.com/optronics.

Specifically, the Leica DMC-SX module incorporates three magnetic field sensors in the form of digital output magnetometers and three microelectromechanical (MEM)

accelerometers. These three MEM accelerometers are implemented in the module as inclination sensors, each responsive to a movement in a respective one of three orthogonal directions. They are thus used in accordance with the present invention to constitute the respective accelerometers 8V, 8AP and 8LR.

The magnetometers of the above module, together with the accelerometers constitute the digital magnetic compass 8a. Their outputs are combined to obtain a magnetic North bearing.

The gyro-based bearing detector can be implemented in the form of a commercially available digital motion unit (DMU), produced e.g. by the firm "Crossbow".

The apparatus can be constructed using both the Leica DMC-SX module and a DMU module, in which case the bearing detector 8 can produce selectively a bearing obtained from the magnetometers and/or from the gyroscope (s), as in the architecture of FIG. 1. Gyroscope(s) can be implemented in an Pedestrian Navigation System (PNS) that also includes 3D accelerometers. Given that both modules separately include tri-axial accelerometers, each suitable to form the 3D accelerometer unit 6, a variant of the apparatus can be constructed using just one or the other of these modules. A first variant using just the Leica DMC-SX module would provide the 3D accelerometer data with the bearing data obtained from just the digital magnetic compass 8a, while a second variant using just the INS module would provide the 3D accelerometer data with the bearing data obtained from just the gyroscopes 8b.

In either of these two modules, the invention implements their tri-axial accelerometers specifically as Pedestrian Navigation System (PNS) sensors. To this end, the output signals from these accelerometers are not integrated in time as in the classical way of implementing an inertial navigation system (INS) for vehicles and similar moving platforms. Rather, the invention makes a new use of such inertial navigation system (INS) sensors as accelerometers for detecting characteristic features in the acceleration signals which are indicative of the dynamics of a footstep, and possibly of a footstep direction.

The GPS unit 10 is based on a mono frequency GPS receiver produced by $\mu$-blox AG. It provides positions at 1 Hz. The absolute position is computed with the GPS code smoothed by the carrier phase. Differencing two successive GPS positions provides precise azimuth and velocity. Cycle slip is detected during the count of the carrier cycle. This azimuth is used for the initialization of the orientation and the calibration of the bias. Alternatively, use can be made of a double-frequency GPS receiver produced by IBM or other constructors.

The air temperature and pressure sensors 30 and 32 are implemented with a miniature pressure sensor commercialized by Intersema SA.

The apparatus implements a number of statistical and filtering tools for processing data from the different units (cf. section I below). These are software implemented using digital processing techniques performed at the level of the main microprocessor 2, possibly in conjunction with local processors associated with the sensing units 6 or 8. To this end, the memory 12 has a section containing the necessary statistical and filtering code.

The apparatus 1 also executes algorithms (cf. section II below) for following an ordered sequence of processing steps with conditional branch points. The algorithm is performed by the main microprocessor 2 from an algorithm program whose code is stored in memory 12.

The following sections of the description shall cover the preparation of experimental or empirical data for calibration, parameterization and navigational data calculation procedure for the apparatus, the algorithms employed for operating the apparatus, the different operating modes of the apparatus and general considerations.

I. Calibration, Parameterization, Preprocessing and Navigational Data Acquisition Protocol and Calculation Procedure.

As the human stride is everything but constant, an updatable step calibration is an advantage. This can obtained with the help of a GPS system. Within the range of variation in the step length, the required precision is at the centimeter level. Such required accuracy is commonly reached using GPS-based measuring devices, after determining the cycle ambiguities of the carrier phase observations for each satellite. However, for short baselines (less than 5 km), both phase and differential code solutions (differentiation of two successive positions) match within 5 cm. This permits to work with code solutions that are more convenient for this kind of application.

The length of a stride can be modeled as a function of several parameters, such as step frequency, the accelerometer signal covariance as well as the physiological aspects such as the height of the person, the leg length and the fitness, and whether the pedestrian is male or female. The biological step length variability has to be taken into account for a realistic approach. All physiological characteristics can be considered during the dead reckoning procedure as involving low-pass filtering or wavelet preprocessing of the signal and both complementary recursive prediction and adaptive Kalman filtering. In order to better understand the influence of these parameters, one of the inventors conducted several tests in real-life situations of outdoor walking.

All the necessary information to detect step occurrences is found in the accelerometer signal. The detection algorithms can be applied on both the vertical and antero-posterior signal, in accordance with the present invention. A lateral signal from accelerometer 6LR is also used advantageously to detect lateral displacements. Several identification strategies can be envisaged, but the present description shall focus on the one that is preferred for providing the most reliable results while requiring the least computation time.

The global idea is to localize maxima within a fixed interval. The size of this interval depends on the analyzed signal content. When working with vertical acceleration, a pattern of two peaks, close in time, can appear at each step depending where on the body the sensors are placed. These peaks can be interpreted as the impacts of the heel and of the sole with the ground, but a vertical motion of the trunk always takes place when somebody is moving on foot (walking, skating, cross-country skiing, . . . ). During single-limb support, the body is at its highest point: the low points occur during double-limb support, when one limb is outstretched forward and the other backward. The peaks detected are the accelerations caused by these movements. The heel impact normally shows the biggest value for flat and light incline walks, but the pattern also varies from one person to the other. Mechanics of walking completely changes once the slope becomes greater than 10%.

Figure 2:
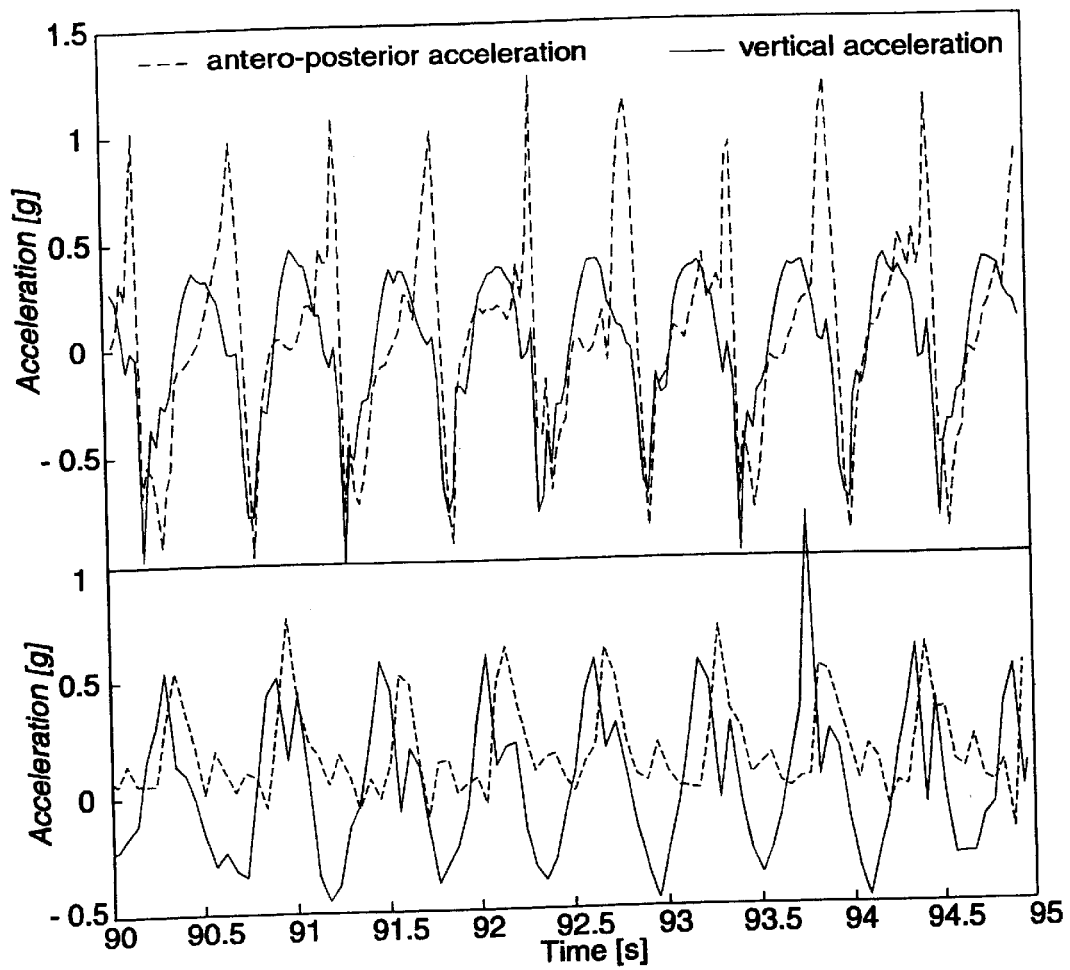
FIG. 2 shows typical accelerometer signal waveforms corresponding to accelerations in the antero-posterior and vertical directions, in accordance with the invention.

The antero-posterior acceleration presents one main maximum, corresponding to the displacement of the body in that direction, as can be seen in FIG. 2. The latter shows typical shifted antero-posterior and vertical acceleration patterns during walking (acceleration (g) measured along the ordinate, time (s) measured along the abscissa). The sensors are placed on the lower back (top graph) or on the thorax (lower graph).

Physically, the antero-posterior acceleration represents the forward displacement of the body. Ideally, integrating this signal twiceshould permit to deduce the step length. The step identification using the presence of both shifted peaks should be considered as the most physiologically correct strategy. The rapid and brief variation of both individual vertical and antero-posterior accelerations allows to work with only one signal to give a robust step detection. A combined analysis has been tested using both signals together, and it validated the approach. However, to determine the direction of the movement—forwards or backwards—the use of the AP signal is necessary.

As one step will be defined as the traveled distance between two heel impacts, this introduces a necessary notion of time interval between impacts. If a maximum peak is not followed after a certain time by another one, the person is still considered at the previous location. Such singularities generally occur during short and non regular walking periods (shopping, etc).

Taking wrong time intervals will give an over(-under) evaluated number of steps. In the dead reckoning mode, this rapidly leads to errors of tens of meters. Such an error source can be partially removed by preprocessing the signal, applying a low-pass filter or a wavelet decomposition if real time information is not an issue. This provides a smoother signal where the acceleration pattern is lost to the benefit of a better shape.

Figure 3:
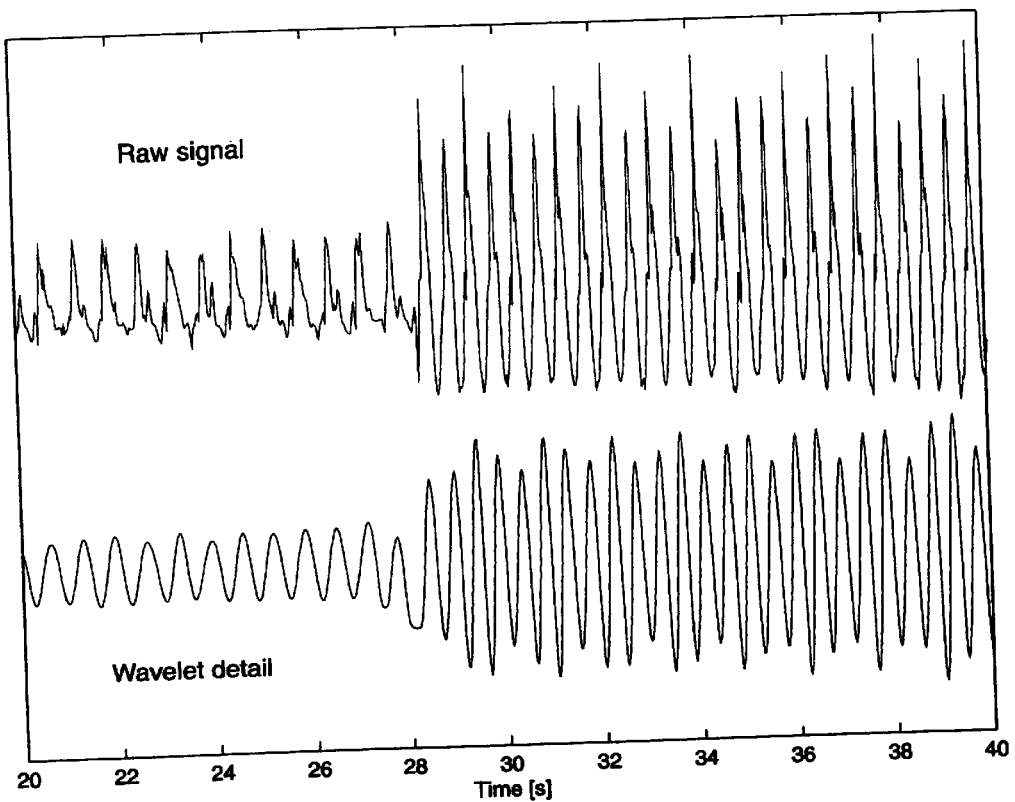
FIG. 3 shows both raw and preprocessed data using the Meyer wavelet function at level four decomposition for an accelerometer signal.

FIG. 3 presents both raw and preprocessed data using the Meyer wavelet function at level four decomposition. The detail at this level reproduces the step occurrences very well, with one maximum only at each occurrence.

Because a good knowledge of the gait pattern is of major importance for dead reckoning, empirical data is acquired to highlight the inter- and intra-individual variability of locomotion as a function of external factors (for instance slope) and internal factors (for instance metabolic energy requirements).

In the example, data is acquired from a sample typically of 10 to 20 persons (male and female) of different physical characteristics (weight, age, height, body mass index), on a known circuit which presents uphill and downhill portions. The precise positioning is achieved by a GPS device working in the differential phase mode.

Four parameters are averaged from GPS data over 7 second periods: walking speed, stride frequency (assessed by Fourier transform analysis), stride length (calculated from speed and stride frequency), and slope. The different parameters are sorted according to the slope, the latter being divided into five categories, each corresponding to an intermediate range of slope in either the uphill or downhill directions. The intermediate ranges are contiguous and thus form a continuous range covering the relief of the circuit.

The study shows how pedestrians adapt their gait according to ground inclination. The results show that the subjects do not modify significantly their speed in downhill walking as compared to level walking. They tend to slow down only in a very steep uphill. The speed change is induced primarily by a reduction in the step frequency. Large inter-individual variations as well as individual variations in time are observed. Such results, in accord with other studies, confirm the usefulness of a continuous adaptation of the models to obtain optimal results.

The above observations and findings are taken into account for establishing the dead reckoning calibration data to be fed into the memory 12 for the calculation algorithms, as shall be described below.

Correlating Step Detection with Walking Speed

Classical inertial mechanization to deduce speed, position and orientation is not optimal for pedestrian navigation. A step detection procedure counting each occurrence and multiplying it by an average step length gives much better results than a mathematical integration of the accelerometer signal, as in the case of a classical inertial navigation system. The logical relationship between step size and walking speed is well explained in the literature and can provide an adequate physiological step model. For instance, reference can be made to Cavagna, "Travail mécanique dans la marche et la course", J. Physiol. Paris, 1969, pp.3–42; Margaria "Biomechanics and energetics of muscular exercise", Oxford, Clarendon Press, 1976; and Perrin et al "Improvement of walking speed prediction by accelerometry using altimetry, validated by DGPS", Med biol Eng Comp. 38:164–168, 2000. The enhancement and modification of some formulae according to the available measurement data provide accurate models to compute the traveled distance independently of the person doing the tests. Therefore the distance traveled is estimated mainly by means of accelerometers.

The approach is to determine first an estimated walking speed as a function of step frequency combined with signal variance, both being derived from accelerometric signals as explained above.

From the estimated walking speed, a physiological model is used to determine a step length. The distance walked is then the accumulation of each step length determined in the above way.

Preferred embodiment makes use of the Margaria model or the Cavagna model for the physiological model (references given above). The parameters are initialized and then controlled by different models derived from numerous physiological studies that can be found in the literature. For instance, reference is made to Rosenrot et al "The relationship between velocity, stride time, support time and swing time during normal walking", J. Hum. Mov. Stud. 6:32314 335,1980, and Kawamura et al "Gait analysis of slope walking: a study on step length, stride width, time factors and deviation in the center of pressure", Acta Med. Okayama 45:179–184, 1991.

Margaria has shown that in walking and running, the length of a step 1 increases linearly with the average speed of progression.

Figure 4:
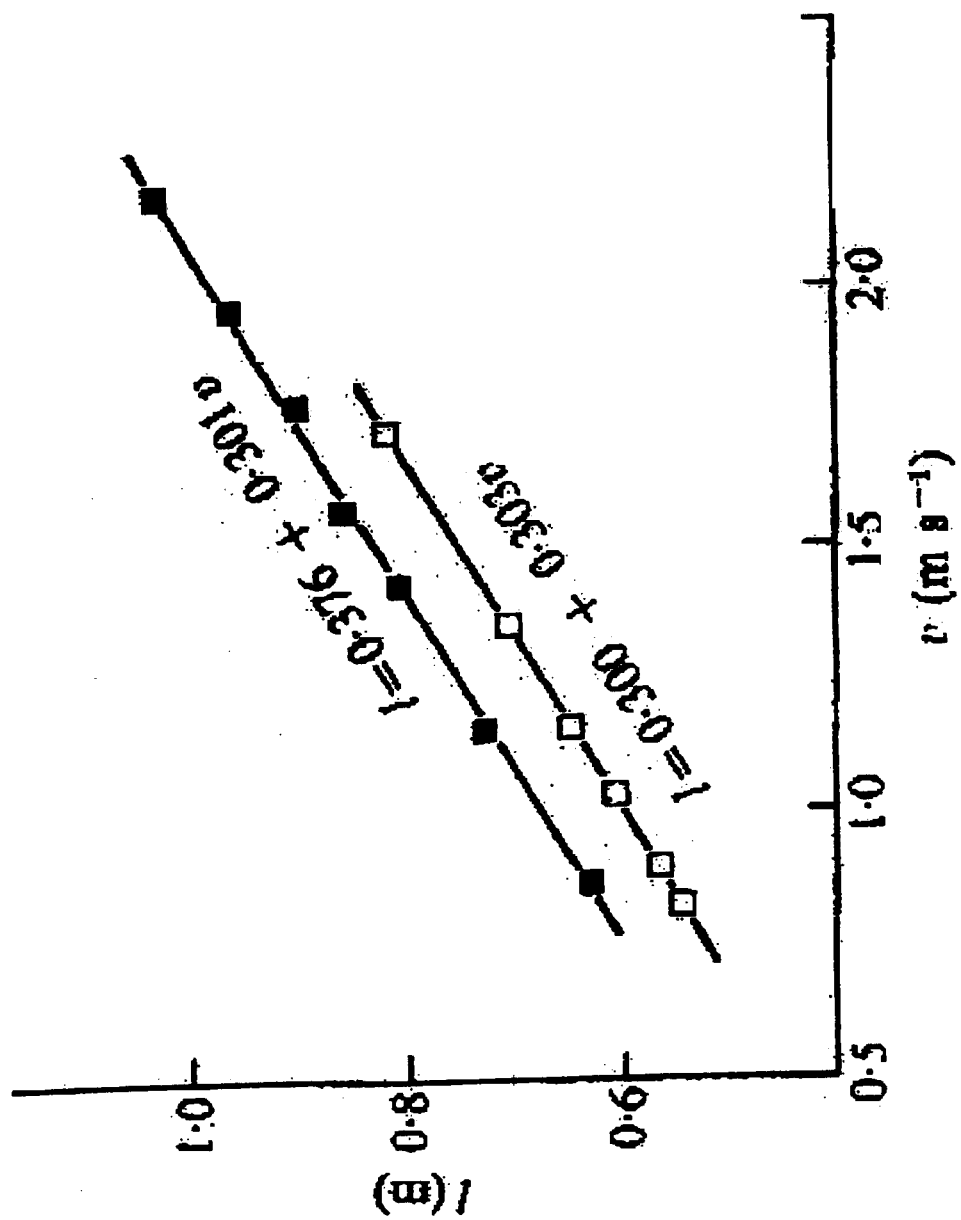
FIG. 4 shows the linear relationship between step length and walking speed in accordance with the Margaria physiological model.

FIG. 4 shows typical plots of step length 1 versus walking speed for an adult and a child (upper and lower lines respectively). It can be seen clearly that walking speed is substantially linear. For walking or running at a constant speed, 1 logically does not start at zero. This implies that the relation between step length and walking speed involves the addition of a constant term. The latter is simply the extrapolation to zero of the slope of plotted lines. This constant term is found to be generally equal to about 0.3 m.

The slope of the plotted lines indicate the period of oscillation of the pedestrians body. Its value of about 0.3 s corresponds to a step frequency of about 180–200 steps/min, or a running speed of 16–18 Km/h.

The Margaria model produces substantially the value for the frequency of oscillation. Margaria showed that the slope dl/dv of the line describing step length as a function of the speed of progression always maintains the same value, irrespective of whether the subject walks uphill or downhill, or whether the body size is increased.

Modeling Step Length

Taking into account the data acquired in the above experimental phase, the predicted step length is modeled using the Margaria or Cavagna model using the following equation:

Step length=$sl_0$+$m$*(displacement speed)+$u$ 2-dimensional relative speed=$D$*(variance)$^E$+ $F$*frequency of steps where D, E and F are numerical coefficients;

Freq is the actual step frequency; Var is the variance of the signal; and u is the Gaussian noise $N\sim(0,\sigma)$. This relation shall be referred to as the Ladetto model.

displacement speed=2-dimensional displacement speed+ $v_{baro}$ $v_{baro}$ is the vertical velocity measured by the barometer Displacement speed is the three-dimensional speed of the pedestrian relative to ground.

Relative speed is a normalized displacement speed which reflects the fraction of a pedestrian's stature or length covered in overground distance in one second.

Thus, 2-dimensional displacement speed is obtained by multiplying the 2-dimensional relative speed by stature or the leg length according to the model which is chosen. 3-dimensional displacement speed is then computed by adding the vertical displacement $v_{baro}$ to the 2-dimensional displacement speed.

Calibration

The step frequency can be determined with a changing number of occurrences using a Fast Fourier Transformation (FFT) or by time-differencing the maxima. Since the dynamics of a walk can change very rapidly, the smaller the calibration period, the quicker the adaptation of the estimated value is. This is the reason why working in the time domain is preferred to a fast Fourier transform (FFT) analysis. The quality of the estimation depends directly on the "individually" computed parameters of the regression. Once determined, they are fixed per person for the interval inside which the step sizes are varying without any possible update (in the absence GPS data). Once satellite signals are available, these parameters are updated by means of an adaptive Kalman filter.

The adaptive context comes from the processing noise uncertainty and variability. In this application, no standard values are available. The most probable value comes from examining the physics of the problem. The processing noise represents here the uncertainty by which the predicted step length can match the true value. Inspired from the model presented by Hirokawa et al in respect of the coefficient of variation of the step length as a function of velocity, the values were adapted according to the results obtained in free living conditions. Computing the Gaussian distribution of the residuals will give information about the processing noise.

Continuous Step Calibration

This aspect calls for a recursive least squares step length prediction in the absence of GPS data. The number of steps taken into account to predict the next value will influence the time response of the filter to an abrupt change in the step length (e.g. walk to run situation).

Different tests are conducted with a 20-step update period. The sample based on twenty persons brings to the fore that the step length is more irregular when walking slowly. Values can vary from 4% at 130 steps/min rate walk up to 15% for a 60 steps/min walk. Considering a mean step value of 75 cm, the standard deviation of the step length varies from 3 cm to 11 cm depending on the frequency.

Taking this biological characteristic into account, the following prediction procedure is adopted.

The approach takes into account the "natural" behavior of human walk. Although steps are not constant, they normally vary around a more stable value. The procedure takes advantage of this property by considering the Gaussian noise distribution.

When GPS data is available, it will enable both a recalibration of the step length and the computation of the regression parameters of equation (1). The state space of the adaptive Kalman fitter is then:

Movement: $sl_0^-(k)=sl_0^+(k-1)+u(k-1)$

Observation: Distance (GPS)/# steps−$m$*Speed$_{mean}$=$A(k)+n(k)$.

Both noises are assumed to be Gaussian. The measurement noise is fixed to $N\sim(0, 5 [cm])$, and the process noise is determined according to the Hirokawa et al model. The state matrix is fixed to the identity and the observation matrix simply equal to 1.

If GPS measurements occur at one walking speed only, the update is performed only on the "slo" parameter of equation (1). It corresponds to the fraction of the step that is constant. The other parameter and the parameters of the speed models are kept to the previous values until new frequencies can be observed.

The adaptive Kalman filter supplies an adaptation of the model to a changing walking dynamic of the person.

1. As step length is not constant but exhibits a continuous variation around a more stable value, the Gaussian approximation offers the most appropriate model. Concretely, this means that underestimated step lengths are compensated by overestimated ones when computing the distance traveled.

2. The analyzed test of several walking speeds and frequencies show differences between the effective and predicted distance of less than 2%. In other words, this corresponds to a distributed error of 1.4 cm per step. Such values are fully acceptable for pedestrian navigation applications as long as they are normally distributed around the results obtained with the step length models.

Navigational Data Acquisition Protocol and Calculation Procedure

From the above described empirical analysis, the preferred embodiment establishes the following protocol and procedure for acquiring and processing the measured data.

The present personal positioning system is to provide both real-time navigation information, e.g. on a display carried by the pedestrian, and data available for post-processing surveying tasks. The system is designed to work in all environments by integrating satellite signals from the GPS unit 10 and by dead reckoning technology using the accelerometer unit 6 and the bearing detector unit 8. The type of accelerometer and the presence of the gyroscope are chosen according to the precision, reliability, and the kind of information needed.

The accelerometers 6V, 6AP, 6LR serve to detect the step occurrences and the direction of displacement (forwards, backwards, left and right). To be considered as corresponding to a displacement, each vertical impact, detected when the foot hits the ground, must be followed by an anteroposterior or lateral acceleration according, to the direction. The pattern of the signal and its numerical value provide information on the kind of movement effectuated (going up or down the stairs, crawling, . . . ), and on the type of ground on which the person is walking (hard-soft surface, sand, . . . ). The model takes into account various dynamics that can happen in different applications i.e. navigation for blind or elderly persons, military personnel, etc.

The step length model is calibrated either using speed measurements or a known distance. As the model uses 3-dimensional speed, the velocity is computed in two different ways according to the kind of data available and the type of application. If no differential corrections are available to improve the satellite positions, only the horizontal speed is computed with the satellite data while the vertical component is deduced from the output of the pressure sensor 32. If differential corrections can be applied, the three-dimensional speed is computed with satellite data combined with air pressure measurements.

The azimuth of displacement is provided by the digital magnetic compass 8a and/or the gyroscope(s) 8b which is/are initially aligned with the compass output. In case of magnetic disturbances, the compass will react while the gyroscope will remain unaffected: the continuous comparison of both outputs allows dead-reckoning correction of the azimuth. If satellite data are available, the azimuth bias of the magnetometer in the compass 8a is corrected as well as the bias and drifts of the gyroscope(s) considering the heading computed from the satellite as the true value.

A significant economical advantage and a reduction in data storage requirements for post processing applications can be obtained when mounting the module containing the acceleration sensors, i.e. the INS, inclined, still providing the same information with equal precision using 2 accelerometers instead of 3 as done in state-of-the-art technologies.

The system also provides information on whether a person is crawling. The gravity signal is analyzed and if its component is more on the AP signal than on the VERT signal, then the person is considered as crawling and a particular model for distance traveled and azimuth is applied.

Description of the Procedure

The steps of the procedure are summarized below. A more detailed description of the procedure is given in connection with the algorithm of FIGS. 12A to 12L

1. Step Detection Procedure

Generation of a set of accelerations;

Determining a peak acceleration in the set of accelerations by means of a sliding window whose length can be adapted or not depending on the frequency of the step occurrences;

Determining the variance of the signal during two foot impacts;

Comparing the computed variance to an adaptive threshold to detect if the person is moving or not;

Comparing if the time elapsed between two successive foot impacts falls into a physiologically possible time interval;

Storing the peak acceleration as a newly detected foot impact;

2. Determination of the Distance Traveled

Generating 2 (or 3) adaptive default values, using the following modeling procedures:

i) Modeling the 2-dimensional speed using the variance or/and frequency of the accelerometric signal:

2-dimensional relative speed=$D*(variance)^E + F*frequency$,

D or F could be set to 0 or finite values.

(The advantage here is that if the variance=0, there is no speed and hence no need for a default constant when no movement is detected,). N. B. The frequency can also be used instead of the variance and has shown to yield very reliable results during long duration tests.

ii) Modeling the 2-dimensional speed using the frequency and/or variance of the accelerometric signal using the Rosenrot model iii) Computing a weighted mean of the two processed speeds.

iv) Adding $v_{baro}$ (vertical displacement speed) to the 2-dimensional speed to obtain the 3-dimensional speed.

v) Modeling the step length using the Margaria model (1976) (or the Cavagna model):

$$step_{13}\ length = sl_0 + m*speed\ 3\text{-dimensional}$$

$sl_0$=fraction of the step length which is constant and independent of the speed of progression (cf. FIG. 4).

m=slope of the function describing the step length as a function of the speed of progression (cf. FIG. 4).

Continuous recalibration of these value can be performed when satellite data are available.

Adding the vertical velocity to the 2-dimensional speed to get the total 3-dimensional speed Counting the foot impacts and displacements while the user is walking Computing the variance of the accelerometric signal between two foot impacts Determining the step length using the presented model If no step is detected but the person is considered to be moving, the distance traveled is computed using the predicted speed and time of displacement (distance=speed*time).

3. Determination of the Direction and Types of Displacement

Detecting footsteps according to the method already presented

Analyzing the value of the accelerometer output, once a step occurrence is detected, to see in which direction the displacement took place: forwards, backwards, side step to the left, side step to the right.

Type

Generating a set of patterns in the accelerometric data describing different situations of walk;

Establishing, the relation between the kind of movement and the traveled distance (different for crawling, climbing stairs or moving freely, . . . )

Comparing the pattern with the different 3-dimensional accelerometer outputs to see if it matches;

If matched within a statistical limit, considering the type of movement effectuated according to the pattern;

Considering the kind of movement, the corresponding displacement is modeled and the new position is computed.

The above procedure serves as a basis for deriving a traveled distance taking into account step directions. It is also required to establish a bearing to obtain navigational data allowing the pedestrian to have his or her position identifiable with respect a fixed reference system.

Thus, having the traveled distance computed, the walking line of sight must also be continuously determined in order to provide a position in dead reckoning mode. This is accomplished using the magnetic compass 8a or/and gyroscopes 8b.

Satellite data from the GPS unit 10 is mainly used to correct the azimuth bias of the magnetic compass as well as the bias and drift of the gyros. The data integration is performed via different Kalman filter algorithms and will be discussed later.

For bearing detection, a choice must be made as to whether to use the magnetic compass 8a or the gyroscopes 8b. This choice can be available during use, if both types of bearing detectors 8a and 8b are accessible, as in the apparatus shown in FIG. 1. The most appropriate detector is then selected according to circumstances, as indicated below, through the multiplexer 20. Where the apparatus takes on a simplified form by providing just one type of bearing detector: magnetic 8a or/and gyroscopic 8b, the choice must be made at the design stage. Economic considerations aside, this choice will depend on the terrain over which the apparatus is most likely to be used. In this case too, the indications below will help decide on the choice of bearing detector.

Basically, the magnetic compass 8a senses the North direction by means of the magnetic field sensors, while the gyroscopic sensor 8b deduces it with the help of gyros. Both systems have their strengths and weaknesses and they may complement each other.

Exploiting Bearing Data from the Magnetic Compass 8a

The taking of bearings involves the notion of azimuth. To be rigorous, the azimuth for a magnetic compass 8a is defined as the angle between the horizontal projection of the line of sight of the person walking and the horizontal component of the Earth's magnetic field. Knowing the direction where a person is pointing, the azimuth is computed by the projection of the Earth magnetic field vector sensed by the output of the three orthogonal magnetic field sensors and at least two inclination sensors. At present, the specifications of the Leica DMC-SX regarding the precision, size, weight and power-consumption make it the best candidate for such applications. According to the inventor's knowledge, the survey community uses this sensor in several oil research projects and in mobile mapping systems (MMS).

In order to compare the azimuth output by the DMC-SX with the one derived from two consecutive GPS positions obtained from the GPS unit 10, the former must be corrected for magnetic declination. The declination is the difference angle between the geographic North and the magnetic North. The latter varies with time and geographical location. Global or regional models are currently available and are known as the International Geomagnetic Reference Field (IGRF) (National Geophysical Data Center). Some countries have their own mathematical representation of the magnetic field with superior accuracy. For pedestrian navigation, a precision of 1° is sufficient and global models are usually adequate.

The different autonomous signals that are going to be analyzed are strongly influenced by the placement of the unit on the body. To maintain the stability during the walk, the unit is placed at the waist level of the person. The output azimuth will therefore correspond to the line of sight of the waist which, most of the time, is in the in the direction of walk.

The accuracy of the azimuth angle depends strongly on the local disturbances of the magnetic field. Such disturbances can be characterized as being of two types: hard-magnetic and soft-magnetic. Hard-magnetic perturbations are caused by permanent magnets and electrical currents which add changes to the Earth magnetic field irrespective of its strength and orientation. Soft-magnetic disturbances are caused by magnetic material distorting the Earth magnetic field and are therefore dependent on the strength and position this field. Different calibration routines are implemented in the DMC-SX module which are performed before placing it on the person. However, in the day-to-day life, the magnetic field is permanently disturbed by a variety of sources such as computers, power lines, iron objects, reinforcement in buildings, etc. The azimuth error caused by these disturbances depends on the inverse of the second power $1/d^2$ (possibly on the third power $1/d^3$) of the distance d to the object. Some of these effects are eliminated by filtering the azimuth, but in the absence of external input such as GPS or gyros, the disturbances cannot be compensated. Particular care must be taken not to filter out the motion when smoothing the noise in the azimuth signal.

Figure 5:
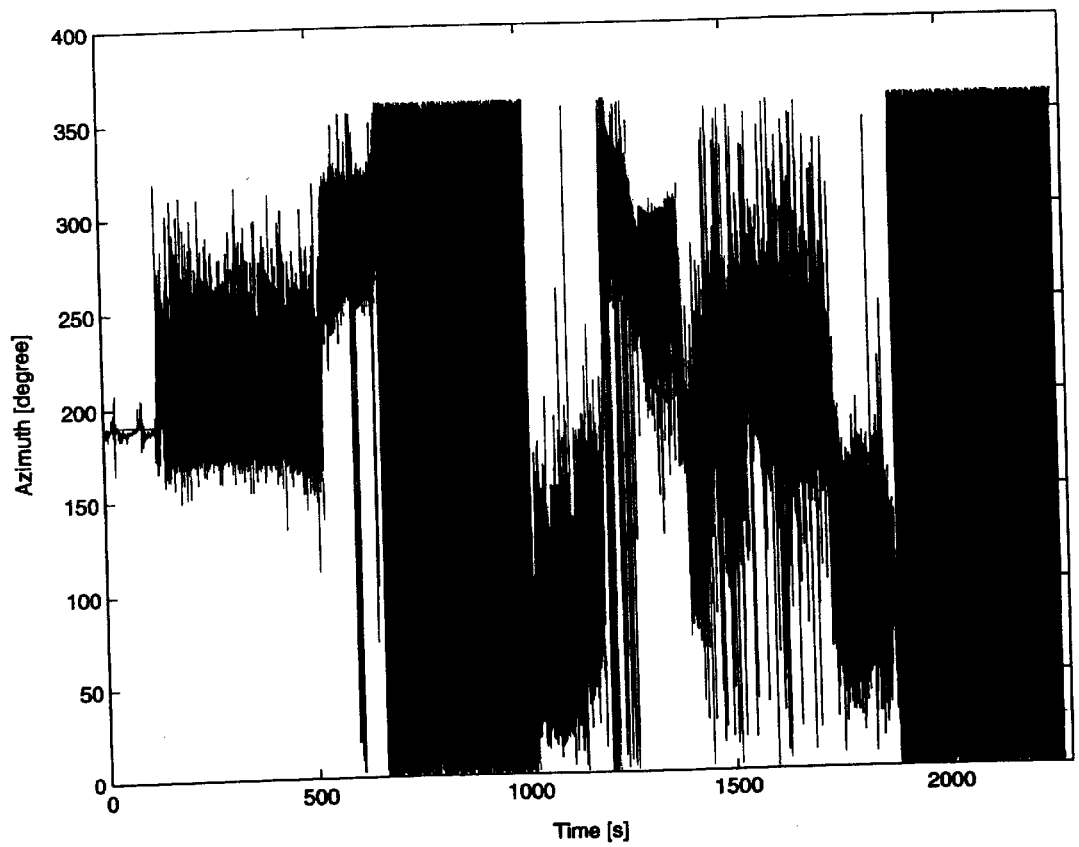
FIG. 5 shows typical raw and filtered azimuth signals from a digital magnetic compass of FIG. 1.

FIG. 5 shows a sample of azimuth raw and filtered signal obtained from the Leica DMC-SX module, the azimuth (degree) being along the ordinate and time (s) along the abscissa. The variation in the signal is caused mainly by the dynamics of walking motion.

As the perturbations tend to be reasonably constant for a given environment, magnetic correction maps can be created for areas such as campuses, commercial centers and any other particular place of interest. A typical application could be to find one's way out of a building, a situation fairly common for blind persons or firefighters in conditions of reduced visibility (smoke) inside a building.

If the repeatability of a trajectory is the main interest, no particular compensation is required.

After several trials, the inventor has determined that an appropriate localization of the sensor is at the lower back, which can be considered as relatively stable while walking. This stability will mainly influence the azimuth signal as well as the reliability of the step detection procedure. However, the orientation of the waist does not always correspond with the walking direction as for backward displacements and side-stepping. Such movements are detected through filtering and pattern recognition of the three-dimensional accelerometric signal of the accelerometers 6V, 6AP and 6LR integrated with the module. Once the correct direction of the displacement is known, the azimuth is computed.

The combination with GPS data is performed via different Kalman filters. When GPS is available, individual models for the step length are calibrated as well as the digital magnetic compass. Particular attention is given to the azimuth derived from the GPS positions. The error in position influences the azimuth. In consequence, the computed heading will depend strongly on the distance between two considered epochs. This aspect will have a major influence on the azimuth-bias calibration.

Exploiting Bearing Data from the Gyroscopic Sensors 8b

If the system contains both gyroscope(s) and magnetic compass, the magnetic compass will, in a first time, determine the absolute orientation of the gyroscope(s). It will then check the presence of magnetic disturbances: in case of a disturbance and no turn, the gyroscope(s) remain(s) still while the compass indicates a turn. If both sensors, comparing the respective azimuth rate of change, are not indicating a turn at the same time, then no turn is considered and a magnetic perturbation is detected. At this stage, only the gyroscope output will be considered to compute the azimuth of displacement. If both data are coherent, they are merged through by means of a Kalman filter. If the PNS contains only a gyroscope and no magnetic compass, the absolute orientation of the gyroscope is provided by computed GPS azimuth. Computed GPS azimuth is also used to model the bias of the magnetic compass as well as the bias and drift of the gyroscope(s).

The GPS positions and speed are required to recalibrate the different models and provide the absolute location of the user. With minimal change, any type of position provided by another system (GSM, Loran, . . . ) can be implemented in the filter. Thus, the developed algorithms can be quite easily extended to include other positioning systems.

The output signal characteristics from the accelerometers 6V, 6AP and 6LR shall now be described. Typical accelerometric data are shown in FIGS. 6 to 10.

Figure 6:
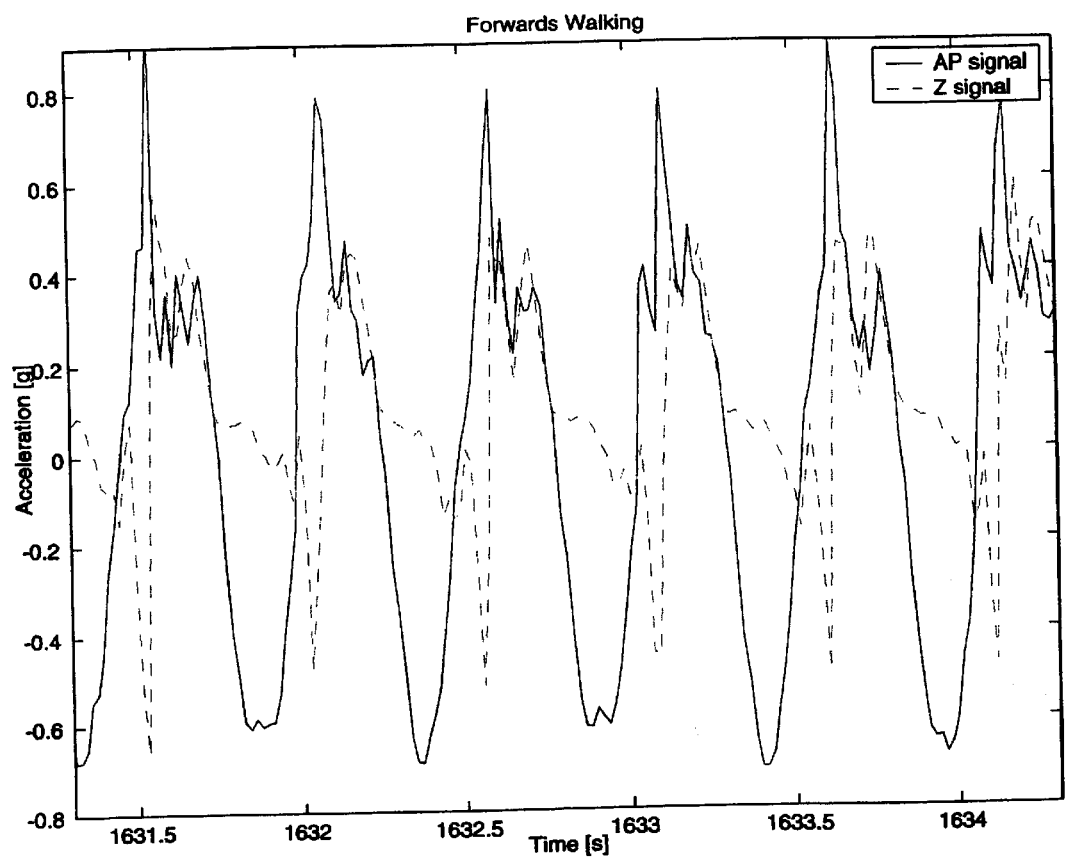
FIG. 6 shows in superposition typical accelerometer signals expressing accelerations respectively in antero-posterior and vertical directions, obtained from a pedestrian walking in the forward direction.
Figure 7:
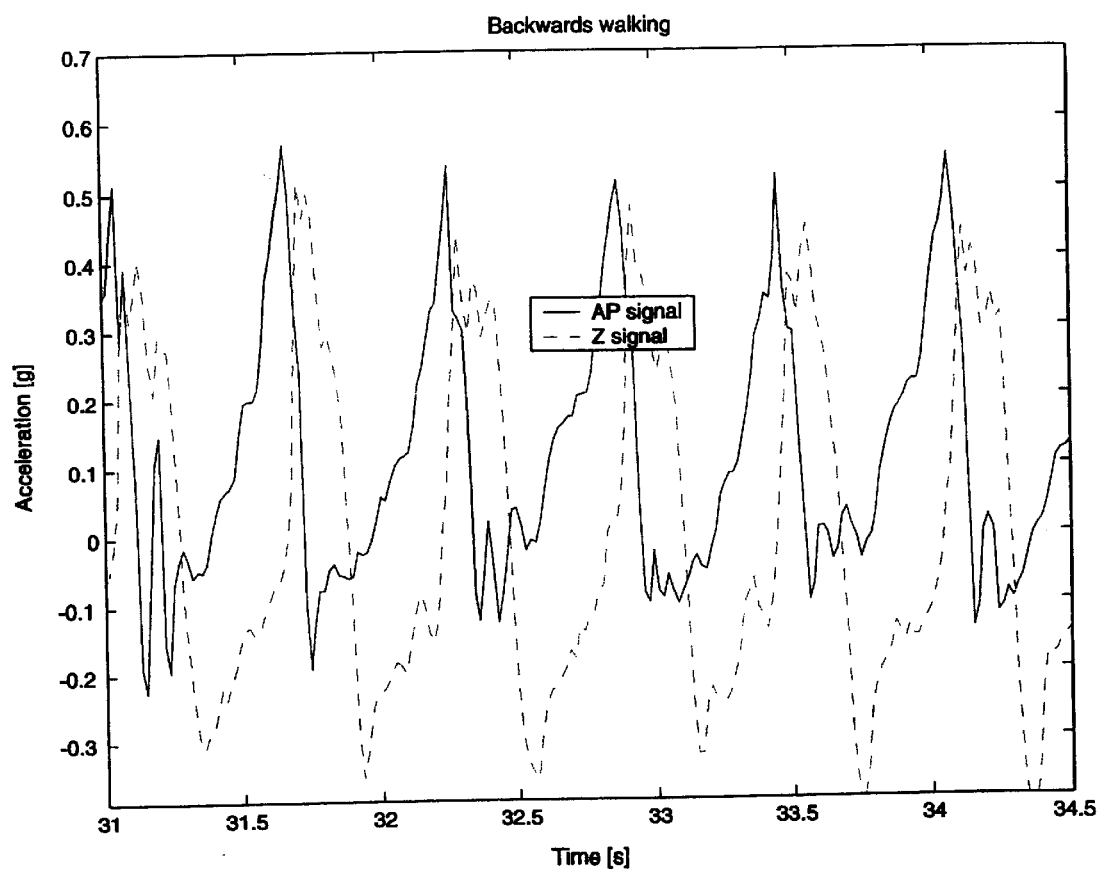
FIG. 7 shows in superposition typical accelerometer signals expressing accelerations respectively in antero-posterior and vertical directions, obtained from a pedestrian walking in the backward direction.

FIGS. 6 and 7 show the output accelerometer signals obtained respectively for forward and backward step motion. Each figure shows the time evolution of both the AP signal (continuous line) which measures acceleration along the forward-backward path and the V signal (broken line) which measures acceleration along the vertical path (the ordinate indicates acceleration (g) an the abscissa indicates time (s)).

These curves illustrate clearly how the AP signal maxima can be detected to determine a forward or backward displacement. The signal for the V signal also varies for both directions of movement, but in practice the AP signal yields more reliable results.

Note that a positive value in the AP signal indicates an acceleration in the backward direction. A positive value in the V signal indicates an acceleration in the upward direction.

Figure 8:
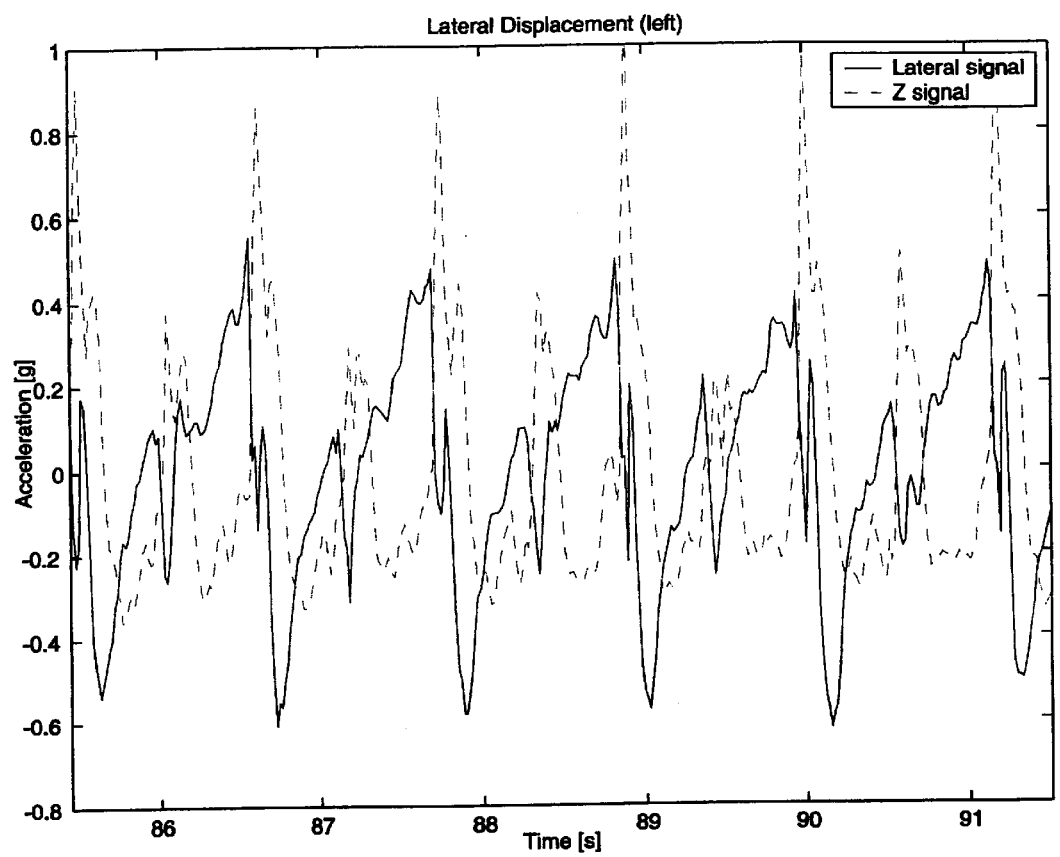
FIG. 8 shows in superposition typical accelerometer signals expressing accelerations respectively in lateral (left-right) and vertical directions, obtained from a pedestrian making side steps in the left direction.
Figure 9:
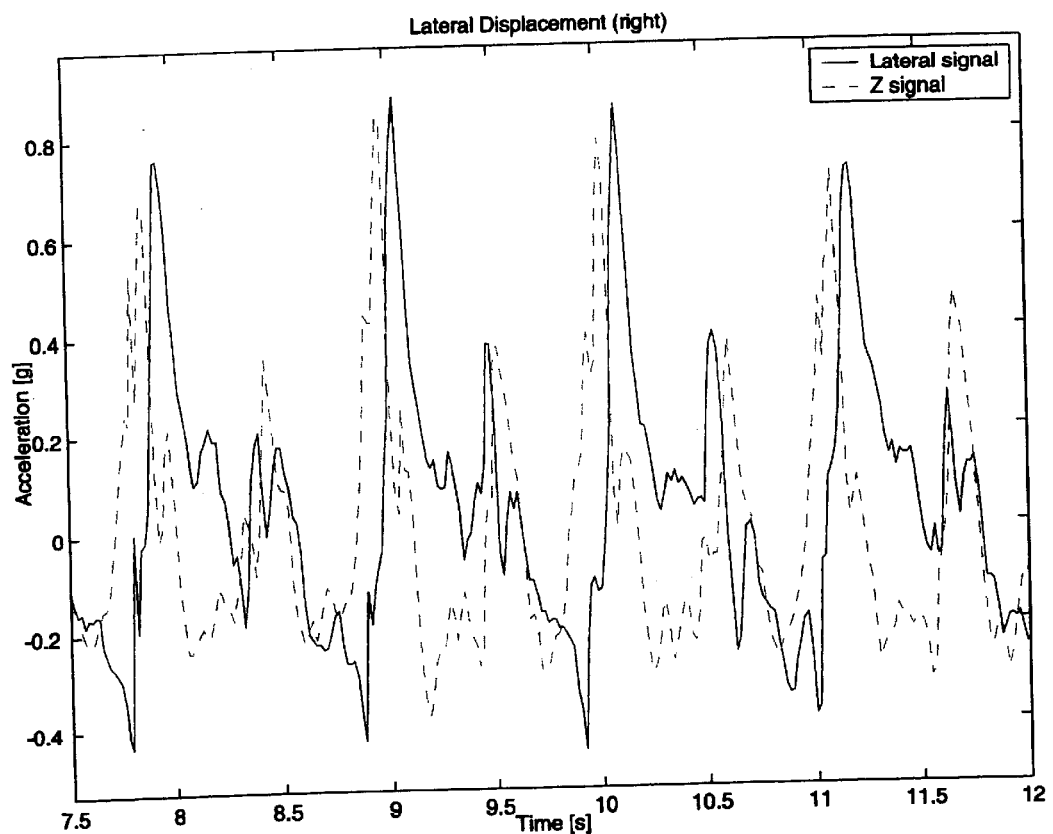
FIG. 9 shows in superposition typical accelerometer signals expressing accelerations respectively in lateral (left-right) and vertical directions, obtained from a pedestrian making side steps in the right direction.

FIGS. 8 and 9 show the output accelerometer signals obtained respectively for a lateral displacement towards the left and a lateral displacement towards the right, using the same axes as in FIGS. 6 and 7. Each figure shows the time evolution of both the LAT signal (continuous line) which measures acceleration along the lateral direction and the V signal (broken line) which measures acceleration along the vertical direction (the ordinate indicates acceleration (g) an the abscissa indicates time (s)).

It can be seen that with a lateral displacement walk, two vertical acceleration maxima represent only one lateral displacement step. The first (largest) maxima of the two on the LAT signal occurs when the first foot is displaced laterally; the second maxima (smallest) occurs when the second foot is brought to the first one. There are thus two impacts, but only one stride. Working with the vertical signal V alone does not allow to determine the direction of displacement; this can only be read from the LAT signal.

Note that a positive value in the LAT signal indicates accelerations towards the right. A positive value in the V signal indicates an acceleration in the upward direction.

Figure 10:
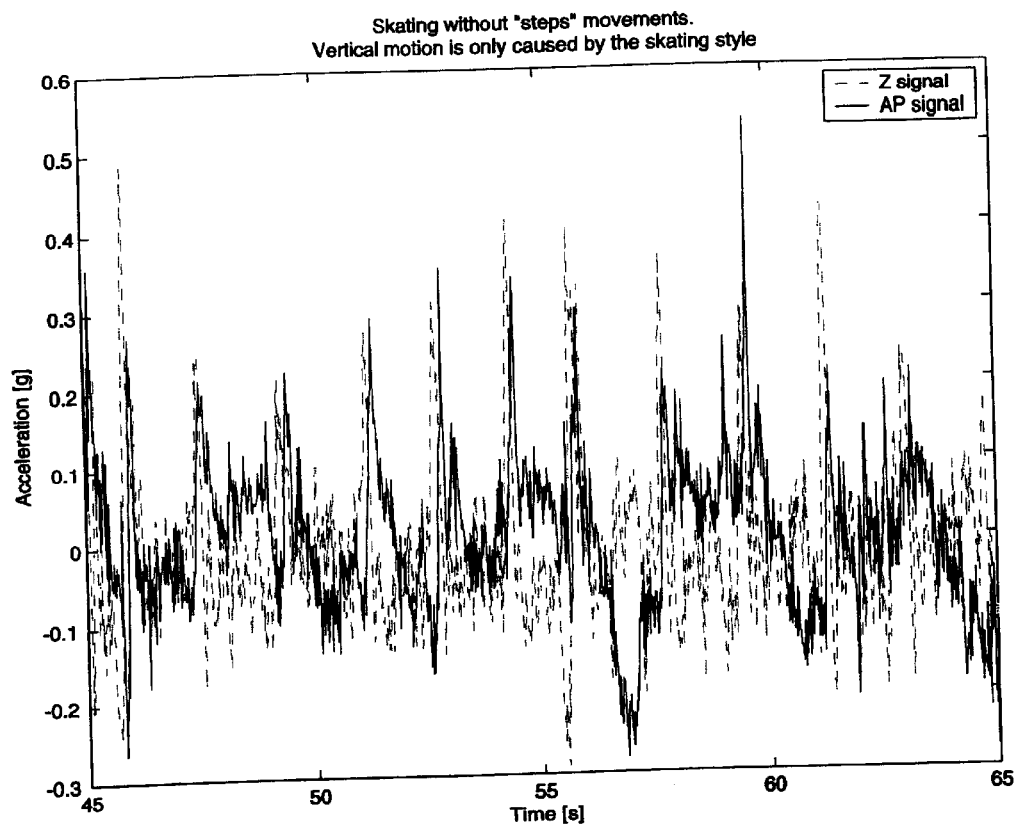
FIG. 10 shows in superposition typical accelerometer signals expressing accelerations respectively in antero-posterior and vertical directions, obtained from a person skating at a relatively constant speed.

FIG. 10 shows the output accelerometer signals obtained for a roller skating motion at relatively constant speed. There is shown the time evolution of both the AP signal (continuous line) path and the V signal (broken line) (the ordinate indicates acceleration in g an the abscissa indicates time in seconds). It can be seen that the accelerations in the forward-backward direction are less identifiable compared with walking motions. This is due to the velocity being maintained by the rolling effect, something which is not possible when walking.

II. Detailed Description of the Algorithm for Extracting Navigation Information from the Sensed Signals and Empirical Data FIG. 11 outlines the structure of the algorithm used for obtaining position, velocity and orientation from the outputs of the accelerometer unit 6 and bearing detector unit 8, using inputted physiological characteristics and the step model described in the previous section.

The raw data signals accessed from the accelerator unit 6 and bearing detector unit 8 (box 50) are subjected to preprocessing 52. This involves noise filtering, gain correction, digitization etc. Such functions can be performed by means of circuit elements within the units 6 and 8 and digital signal processing by the microprocessor 2, or by peripheral processors associated with these units.

The thus pre-processed data is fed into the step model(s) 54 stored in digital form within the memory 12. The physiological characteristics 56 are also fed into the step model(s) 54. They are supplied externally via the calibration data input 24 in the form a digital data representative of the pedestrian's characteristics to be taken into account by the step model(s) 54. The step model(s) then become(s) personalized for the pedestrian whose physiological characteristics are entered and supplied at regular intervals with the necessary sensor data 50.

The pre-processed data is also used for calculating the azimuth of displacement 58. This displacement is determined, as explained in the previous section, using the data from the magnetic compass 8a and/or from the gyroscopes 8b.

The results of calculation from the actualized step model (s) 54 and the azimuth of displacement 58 constitute the variable parameters for the position and velocity determination in the dead reckoning mode 60.

In parallel, the absolute position data from the GPS unit 10 is periodically accessed (where available) and submitted to a pre-filtering operation 62. The GPS data after this pre-filtering 62 and the output from position and velocity determination 60 are both combined in an integration process based on Kalman filtering (KF) 64 or similar, as explained above. The thus-integrated data serves to provide an actualized information of position, velocity and orientation, constituting the navigation data.

The result of the integration is also fed back (loop L1) both to the step model(s) 54 and to the azimuth displacement calculation stage 58. This feedback serves to update the step model(s) and the azimuth displacement calculation stage with corrected values obtained from the GPS unit 10. In this way, drifts from the gyroscopes or accumulated errors in the magnetic compass can be corrected at regular intervals when the GPS data is present. The feedback to the step model(s) can be useful to modify its parameterization in real time. However, this is often not necessary for proper functioning of the apparatus, and the step model(s) can thus be kept frozen, or only corrected at relatively long intervals.

The more specific aspects of the algorithm shall now be described with reference to the flow charts of FIGS. 12A to 12.

The description is based on data acquired from just the Leica DMC-SX module, i.e. with bearing data only from the digital magnetic compass 8a (and not from a gyroscopic sensor 8b) and acceleration data from the tri-axial inertial navigation system housed in that module, as described above. The tri-axial inertial navigation system produces accelerometric data for each of three orthogonal axes, corresponding to the vertical, antero-posterior and left-right directions. It thus comprises the three acceleration sensors 6V, 6AP and 6LR of FIG. 1. The values of the accelerometer signals for the vertical, antero-posterior and left-right directions shall be designated respectively: VERT, AP and LAT (for lateral).

Figure 12A:
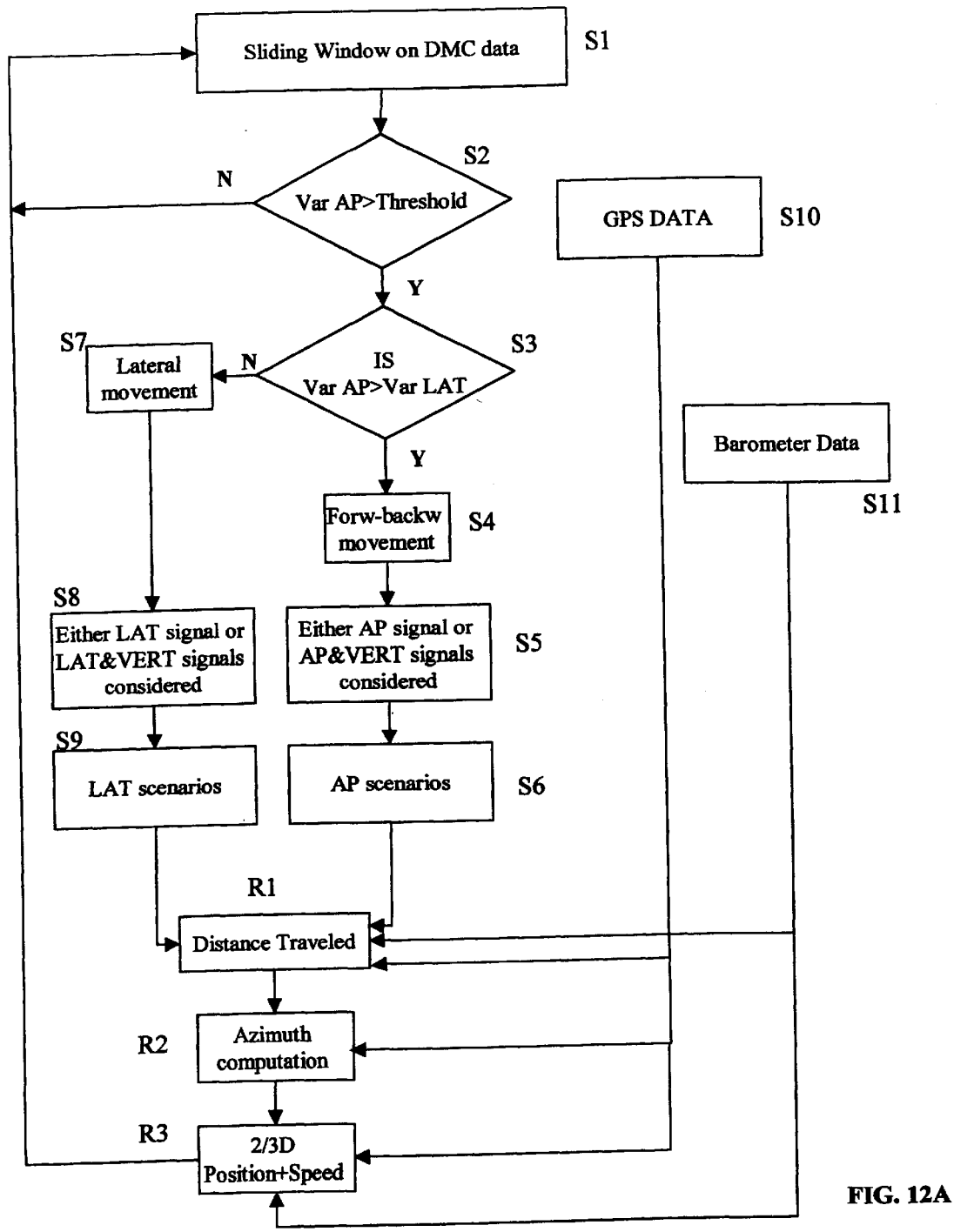

FIG. 12A is a general flow chart of the algorithm used. It is presupposed that the apparatus 1 is operational and that acceleration and bearing data are available.

At regular intervals, the microprocessor 2 acquires VERT, AP and LAT acceleration signal values from unit 6. These values are stored in three respective buffer registers organized as FIFOs (first-in, first-out). After filling the registers, they each contain successive acceleration values, the number n of values stored being equal to the number of register stages. The registers thus keep an up-to-date record of the last n acceleration values acquired along each of the three directions (vertical, antero-posterior, and lateral). These n values constitute a sliding window from which peaks can be detected by statistical analysis of its contents, taking into account relative positions in the window. In particular, the microprocessor 2 analyzes the variance (abbreviation "Var") in the values. The variance is the square of the standard deviation of the values in the window, and quantifies the non-uniformity of these values. It is taken that the greater is this non-uniformity (variance), the greater is the activity of the signal, and hence a detected amount of movement in the direction associated with the accelerometer yielding that signal.

The procedure thus starts with a sliding window acquired for all three directions (step S1). It is then checked whether the variance of the AP signal value is above a stored threshold value (step S2). If the variance of the AP signal is below that threshold, this means that no movement occurs (even for lateral movements). Note that this analysis step for the AP signal is advantageous, since a classical approach based on just vertical impact acceleration analysis would give a false indication of movement in the case where pedestrian is jumping on the spot.

If the variance is below the given value, then it is deduced that the pedestrian is not moving. The procedure then waits for fresh AP values to appear on the sliding window and repeats step S2.

If the variance of the AP value exceeds the above threshold, then the procedure moves on to determine if the variance on the AP signal is higher than the variance of LAT signal value (step S3). In the affirmative, it is deduced that the pedestrian is going either forwards or backwards (step S4). In this case, either the AP signal alone or both the AP signal and the VERT signal will be considered for processing (step S5). These two alternatives give rise to respective processing scenarios referred to as AP (antero-posterior displacement) scenarios 1 and 2, covered by FIGS. 12B and 12C respectively (step S6).

On the other hand, if it is detected at step S3 that the variance of the LAT values is greater than that of the AP values, then it is determined that the person is moving laterally left or right (step S7). In this case, either the LAT signal alone or both the LAT signal and the VERT signal will be considered for processing (step S8). These two alternatives give rise to respective processing scenarios referred to as LAT scenarios 1 and 2, covered by FIGS. 12D and 12E respectively (step S9) (described later).

Once the movement is determined (forwards/backwards or left/right), a routine R1 is called to compute the traveled distance. This routine is described with reference to the flow chart of FIGS. 12I and 12J. If GPS and air pressure data are available, they will be used at this stage (steps S10 and S11 respectively) (described later).

The procedure then continues with a routine R2 for the computation of the azimuth of displacement, that can be different from the azimuth output by the sensor. If GPS data is available, it will be used at this stage. This routine is described with reference to the flow chart of FIGS. 12G and 12H.

Next, the procedure proceeds with a routine R3 for the Computation of the 2 or 3-dimensional position and speed according to the data available. If GPS and Barometer data are available, they will be used at this stage (described later).

The description that now follows in connection with FIGS. 12B to 12L concerns a case where at least one step is detected as point S2 of FIG. 12A, i.e. after it has been detected that the variance in the AP acceleration component exceeds a lower limit threshold.

Figure 12B:
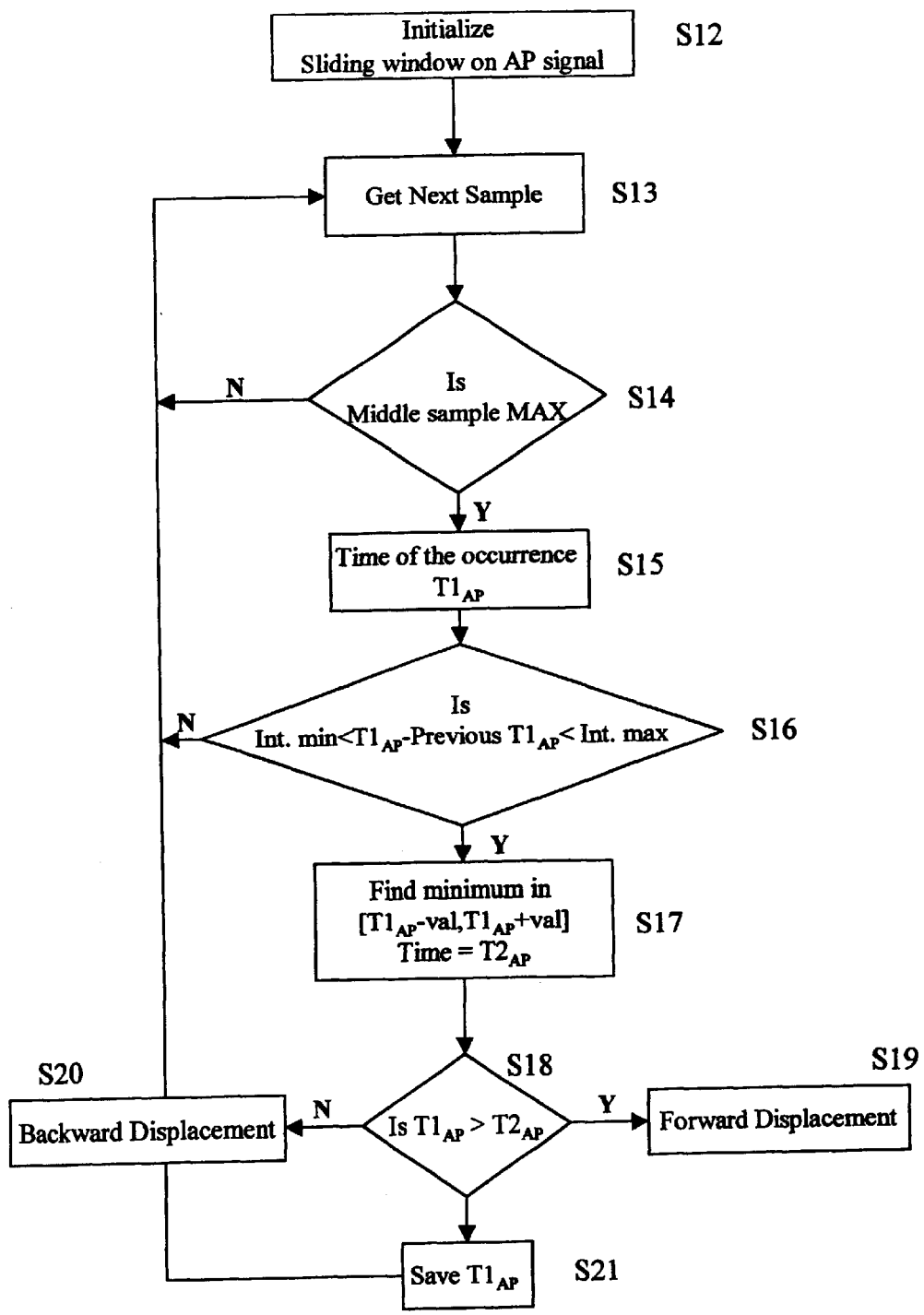

FIG. 12B shows in more detail the steps performed in a first variant of the AP scenario, designated hereafter as "AP scenario 1", where only the AP signal values are used. The starting point of this scenario is thus step S6 of FIG. 12A.

The vertical acceleration is not taken into account in this variant of the procedure. The apparatus 1 for that variant can thus not comprise the vertical direction accelerometer 6V.

It is important to note that depending of the orientation of the sensors, the maximum can become the minimum and vice versa. Here positive values of the AP signal show backwards accelerations (when walking).

The scenario begins by initializing the sliding window on the AP signal (indicating antero-posterior movement) (step S12).

Values (samples) are entered successively into the sliding window for the AP data (step S13). For each newly entered sample, it is determined whether the sample at the middle of the window has the maximum value among all the values in the window (step S14). (For simplicity, the window contains an odd number of samples, so allowing a middle rank to be identified in the window.) The purpose of the step S14 is to determine the AP acceleration maximum representing the forwards or backwards movements.

The moment of occurrence of the maximum value acceleration value (positioned as the center of the window)is considered as corresponding to the moment when the displacement takes place. The time of acquisition $T1_{AP}$ of this maximum is identified (step S15) (using the internal clock and knowing the number of clock cycles elapsed in bringing that maximum value to the central position in the window).

Next is performed a comparison of the time interval between the previous and the present displacement (step S16) This involves subtracting the time of the previous displacement, $T1_{AP}$ Previous, from the time $T1_{AP}$ of the present displacement. It should be within two limit values, Int.min and Int.max that bound the interval considered to correspond to the natural phenomenon of the walk. A pedestrian cannot walk quicker and slower than a certain physiologically determined limit. Next, the procedure determines the minimum AP signal value acquired in a time interval centered on the time $T1_{AP}$, but different from the time interval of step S16 (step S17). Specifically, this interval starts at a time period val before the time $T1_{AP}$ and ends the same time val after that time $T1_{AP}$. The lowest (minimum) signal value for AP occurring within that time interval [$T1_{AP}$–val, $T1_{AP}$+val] is determined. The time of occurrence $T2_{AP}$ of that minimum signal value is saved. There are thus obtained and saved the time $T1_{AP}$, of the maximum AP value and the time $T2_{AP}$ of the minimum AP value.

Next, the procedure determines if the maximum AP value occurred after the minimum AP value, i.e. whether $T1_{AP}$>$T2_{AP}$ (step S18).

If the condition $T1_{AP}$>$T2_{AP}$ is satisfied, then it is deduced that the pedestrian is effecting a forward displacement step (step S19).

Conversely, if the condition $T1_{AP}$>$T2_{AP}$ is not satisfied, then it is deduced that the pedestrian in effecting a backward displacement step (step S20).

The value of $T1_{AP}$ is saved for future reference (step S21).

The basis of the deduction is as follows. When a pedestrian moves forwards, he or she first hits the heel that can cause an opposite reaction of the ground (backwards=min), and then accelerates (forwards=max). When going backwards, the movement is slightly different because the pedestrian first lets him or herself fall (backwards=max), before stopping the fall by hitting the heel on the ground (forwards=min).

Figure 12C:
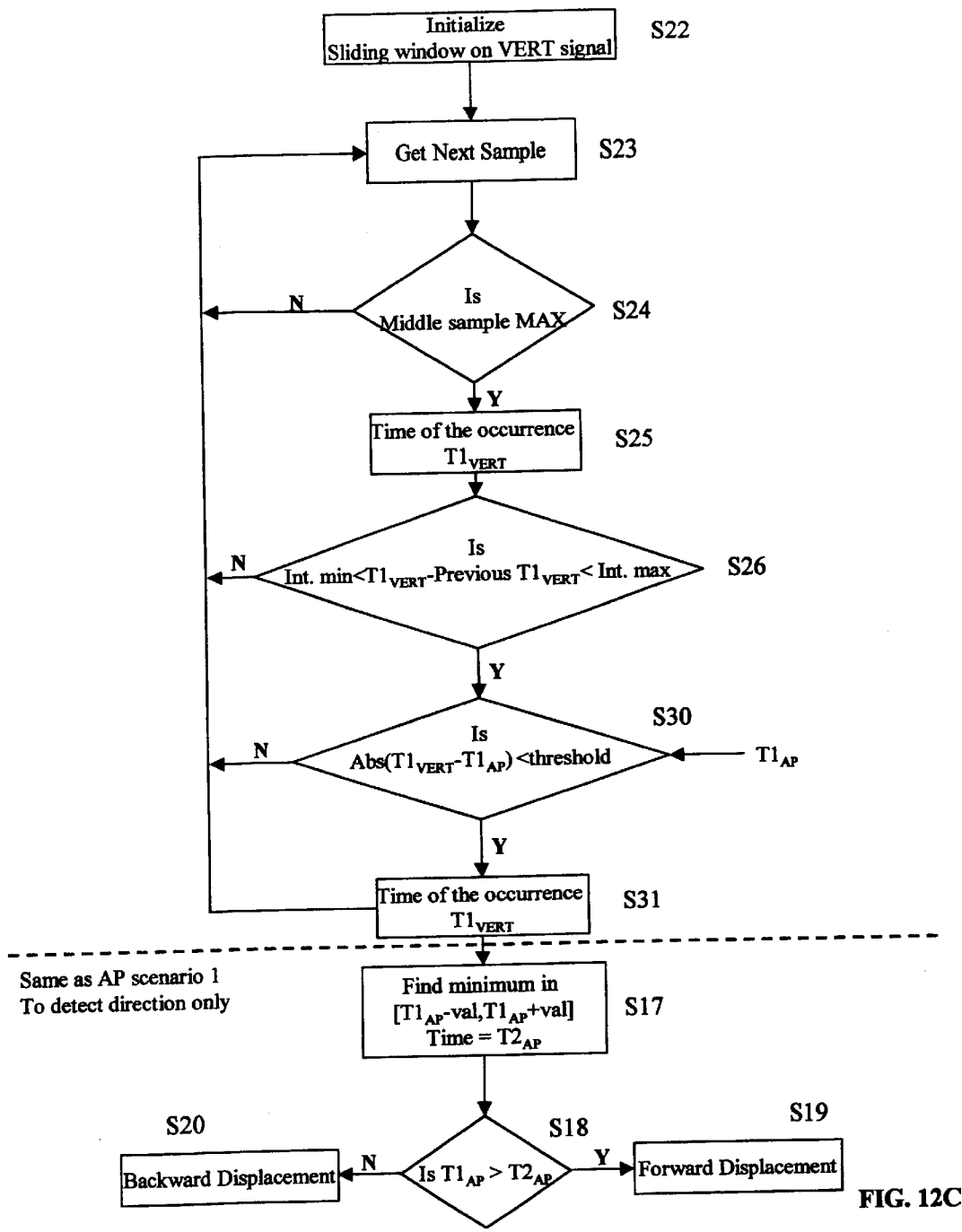

FIG. 12C shows in detail the steps performed in a second variant of the AP scenario, designated hereafter as "AP scenario 2", where both the antero-posterior acceleration signal values AP and the vertical acceleration signal values VERT are used.

The procedure to determine the direction of walk is the same as in AP scenario 1. The only thing that changes is that the step detection process also uses the Vertical signal. Accordingly, procedure steps in FIG. 12C analogous to those in AP scenario 1 of FIG. 12B (except for the direction considered) are identified with "S" followed by a number increased by ten relative to the corresponding step in FIG. 12B (e.g. step S23 of FIG. 12C corresponds to step S13 of FIG. 12B).

AP scenario 2 thus begins by initializing a sliding window for the successive values VERT of the detected vertical acceleration (step S22).

As in the previous case, for each new sample acquired (step S23), it is determined whether the maximum of the vertical signal VERT is located at the central position inside the sliding window (step S24). The acquisitions are repeated until the maximum value of VERT occupies the central position.

The time of acquisition of this thus-determined centrally located maximum value can be considered as the moment when the heel hits the ground. However, it can also correspond to the moment when the body is going up. This moment is not automatically correlated with the hit. The time of occurrence of this maximum vertical acceleration value VERT is determined and saved, using a technique analogous to that described in the previous Fig (step S25).

There is next performed a comparison of the time interval between the previous and the present times of occurrence of the maximum VERT value (step S26). This likewise involves subtracting the time of the previous max VERT value, $T1_{AP}$ Previous, from the time $T1_{AP}$ of the present displacement. It should be within two limit values, Int.min and Int.max, that bound the interval considered to correspond to the natural phenomenon of the walk (step S26).

If the vertical movement is synonymous of an impact that causes a displacement (i.e. a step), there should be a maximum also on the AP signal corresponding to the antero-posterior movement, $T1_{AP}$. This maximum is detected by procedure steps corresponding to steps S12–S15 and S21 of FIG. 12B. AP Scenario 2 uses the value $T1_{AP}$ for control to prevent e.g. a vertical jump from being considered wrongly as a horizontal displacement. To this end, the procedure determines whether, within a given interval from the time of max on the Vertical signal, there is a max on the antero-posterior signal AP. Formally, this involves determining whether the condition $|T1_{VERT}-T1_{AP}|<a$ threshold (step S30). If this condition is satisfied, then the Vertical maximum is validated as causing a displacement.

The time of occurrence $T1_{VERT}$ is stored (step 31).

Next, the forward/backward direction of the step is determined. The procedure is identical to that of AP scenario 1 and involves steps S17 to S20 of FIG. 12B, which shall not be described again for conciseness.

Figure 12D:
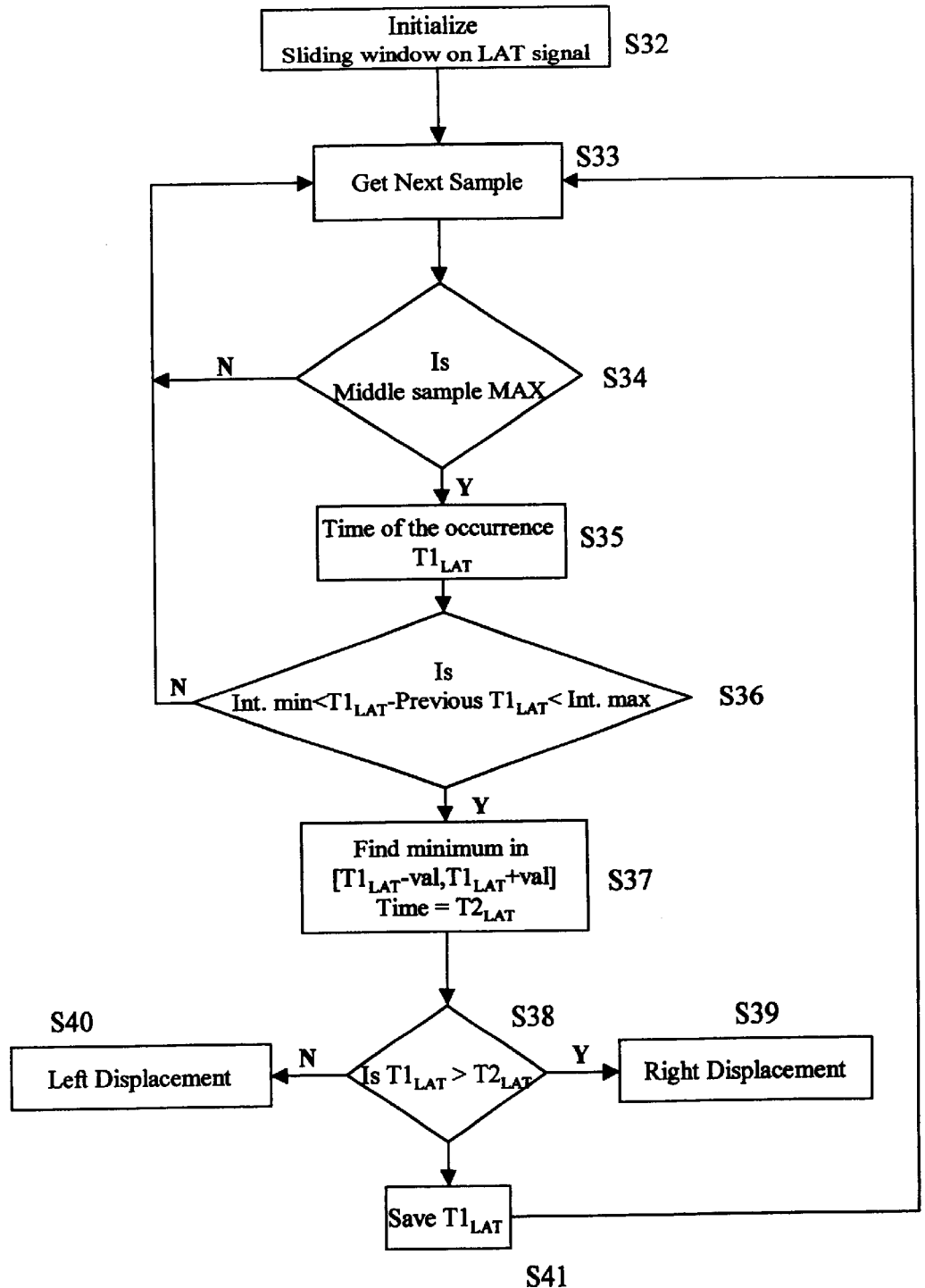
Figure 12E:
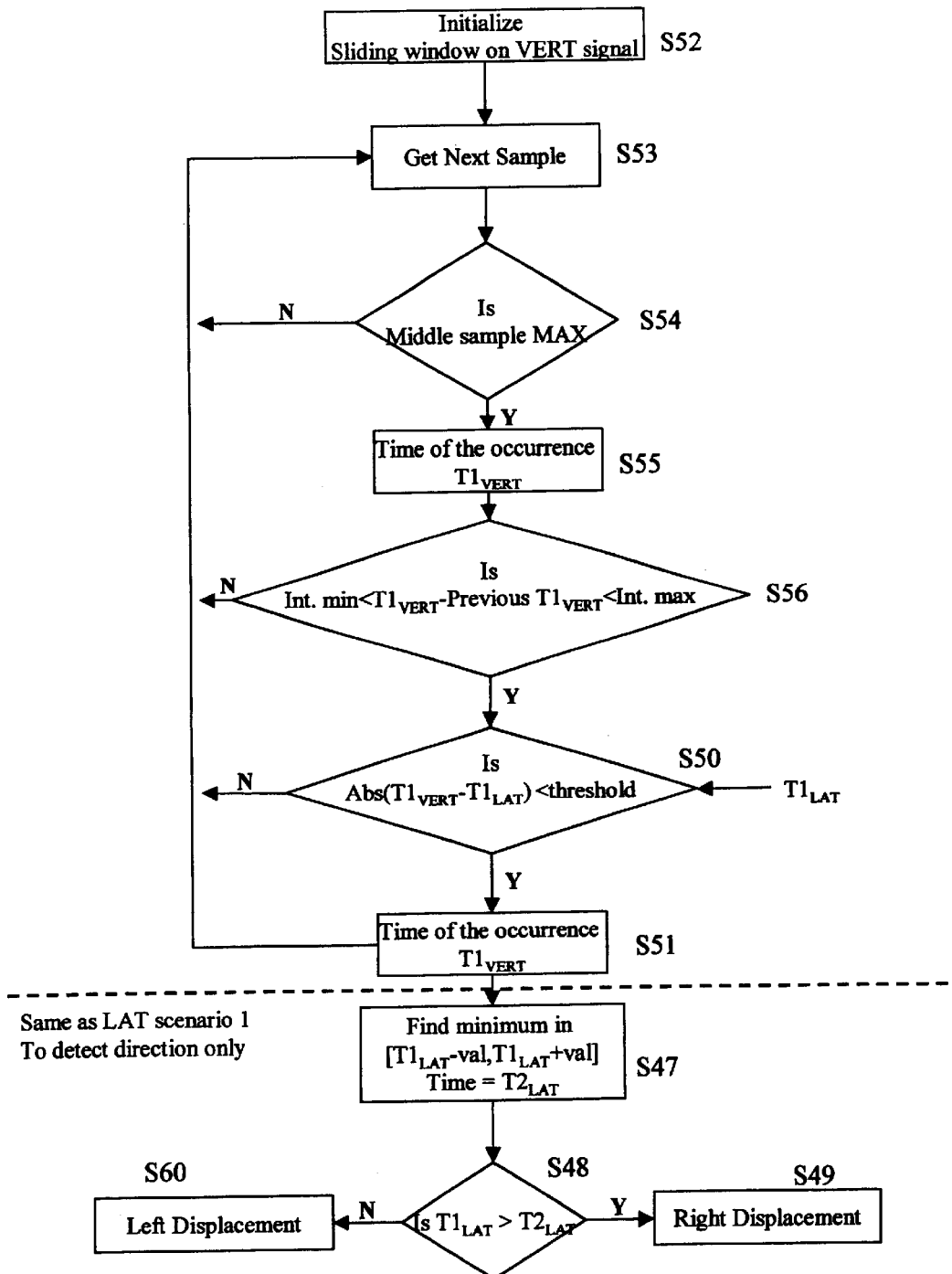

There shall now be explained two further scenarios based on the detection of a lateral displacement. These scenarios, designated LAT scenario 1 and LAT scenario 2, are shown in FIG. 12D and FIG. 12E respectively. The starting point of these two scenarios is step S9 of FIG. 12A, i.e. after it has been detected that that a lateral displacement has taken place.

LAT scenario 1 provides a step detection and direction determination using signals from the left-right accelerometer 6LR only.

As can be seen from FIG. 12D, the procedure is globally the same as the one shown in FIG. 12B to determine the direction using just the AP signal. However, the AP signal of FIG. 12B is replaced by the LAT signal. Steps in FIG. 12D analogous to those of FIG. 12B (except for the above-mentioned difference) are identified by corresponding numerals increased by 20, e.g. step S32 of FIG. 12D corresponds to step S12 of FIG. 12B.

The values of "Int.min" and "Int.max" (Int. for Interval) that change with this kind of movement, as well as the value "val" used to determine the interval in which the minimum is searched, are not the same as for the AP scenario, owing to the different parameters involved.

LAT scenario 2 provides a step detection and direction determination using both LAT and VERT signals from the left-right accelerometer 6LR and the vertical accelerometer 6V.

As can be seen from FIG. 12E, the walk direction determination procedure according to LAT Scenario 2 is the same as for AP scenario 2 shown in FIG. 12C, except that the antero-posterior signal values AP are replaced by lateral signal values LAT. Steps in FIG. 12E analogous to those of FIG. 12C (except for the above-mentioned difference) are identified by corresponding numerals increased by 30, e.g. step S22 of FIG. 12C corresponds to step S52 of FIG. 12E.

The values of "Int.min" and "Int.max" (Int. for Interval) can change for a lateral displacement movement. The value for the "threshold" variable is not the same as the one in FIG. 12C.

Figure 12F:
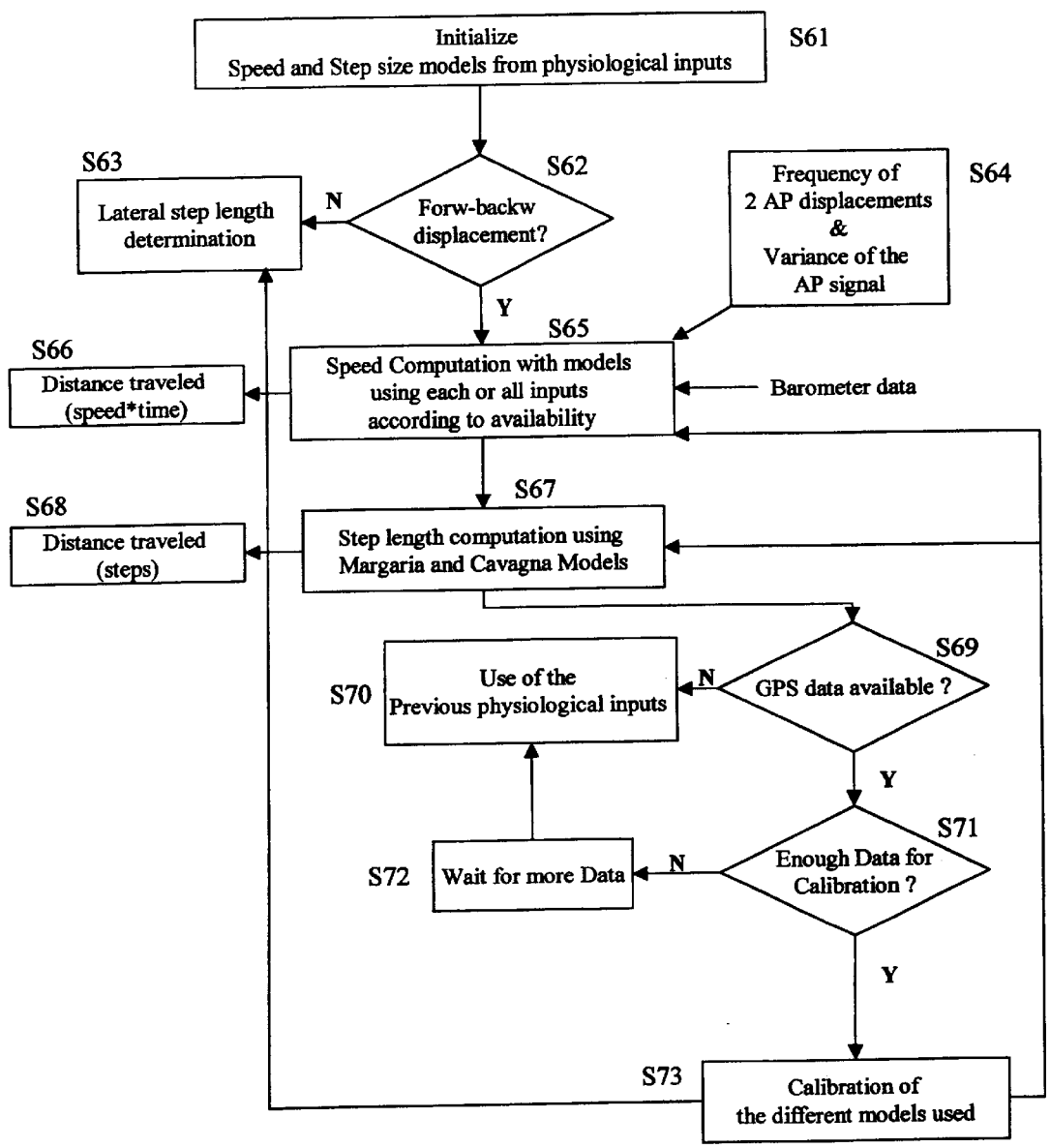

Referring to FIG. 12F, there shall now be explained how the traveled distance is determined, using the step detection in accordance with any one of the scenarios described above.

The procedure starts with the initialization of the different models used with physiological inputs such as body height, leg length, and weight, as explained above (step S61).

Next, it is determined whether the displacement is in the AP direction or not, as known e.g. from AP scenario 1 or 2, in order to determine which model is going to be used (step S62).

If the displacement is lateral, as known e.g. from LAT scenario 1 or 2, the stride is determined as a percentage of a stride in the AP direction (step S63).

If the movement is in the AP direction, the procedure determines the variance and the frequency of the AP displacements (step S64). Specifically, this step involves determining the frequency of successive AP displacements (detected as described above) and the variance on the AP signal value. (The variance is already known from step S2 of FIG. 12A.)

The above parameters determined at step S64 are then used to determine the 2-dimensional speed of the pedestrian (step S65). If barometer data is available, 3-dimensional speed can be determined.

As the walking speed is thus determined, the next step is to calculate the traveled distance using the time between the AP displacements considered, on the basis that the traveled distance is simply the product of this walking speed and the time between the AP displacements considered (step S66).

Once the speed is known, the Margaria and/or Cavagna physiological models discussed above and stored in the memory 12 are called to determine the step length (step S67). 3-dimensional speed will provide slightly better results than the 2-dimensional speed.

The Margaria and Cavagna models provide respective indicators of the distance traveled that can be integrated or used separately relative to the distance calculated at step S67. The more robust is the Margaria/Cavagna model using the different physiological models, but other more general models can be very useful depending on the situations.

From one or the other, or the combination of these models (combination of step S66 and step S68), the distance traveled can also be evaluated from the product of a constant the step length and the detected number of steps.

A periodic check is made to determine whether GPS data is available (step S69). If such data available, it is used to calibrate the different models for the speed as well as for the step length determination (step S70).

A check is made to see if enough GPS data has been acquired to provide a good calibration (step S71). If not enough data are present, a wait period is initiated (step S72) before for more repeating the checking step.

Once sufficient GPS data is acquired, the model is re-calibrated (step S73), whereupon the new values replace the ones determined only from the physiological inputs.

There shall now be described with reference to FIG. 12G the procedure for determining the azimuth of displacement on the basis of signal from the digital magnetic compass 8a.

This part is specific to the use of a magnetic compass. As it is fixed to provide the azimuth of the front part of the body, this is not necessarily the direction of walk and it is therefore necessary, depending on circumstances, to correct its signal according to the type of movement detected.

The procedure starts with the acquisition of azimuth data from the digital magnetic compass (step S74).

The declination of the azimuth is added to the raw signal (step S75).

The raw signal of the azimuth is smoothed with a cascade of low pass filters in order to eliminate the noise without losing any signal $A_Z$ (step S76). The filters are applied to the cosine and sine of the raw azimuth. This has shown to yield better results than applying the filters to the raw signal itself. The azimuth is then recomputed using the "arctan2" function.

The sense of displacement (forward/backward or left/right) will then condition the angle to be added to the given azimuth to find the azimuth of displacement. The sense of direction having already been determined (cf. the above-described scenarios), the procedure simply implements a branch condition based on these results (step S77).

If the displacement is lateral, the left or right direction is identified from the results obtained in the above scenarios (step S78). The azimuth signal $A_Z$ is adapted accordingly by subtracting 90° therefrom in the case of a left displacement, yielding $A_Z$−90° (step S79), or adding 90° thereto in the case of a right displacement, yielding $A_Z$+90° (step S80).

During Lateral displacements, a rotation of the body can be observed. This additional angle has to be removed to compute the real azimuth of displacement (step S81).

A similar adaptation of the azimuth signal $A_Z$ is performed for an antero-posterior displacement. In this case, the procedure moves from the branch step S77 to determine if the displacement is the forward or backward direction (step S82). Here, the azimuth signal is adapted by adding 180° thereto in the case of backward displacement, yielding $A_Z$+180° (step S83), and by leaving the azimuth signal unchanged in the case of forward displacement (step S84), this being the reference direction.

It is then detected whether GPS data is available (step S85). If available, it is used to correct the possible bias of the sensor, caused by magnetic disturbances. To this end, the bias of the magnetometer is determined (step S86). This gives rise to a signal $A_Z$ comprised of the true azimuth+the bias (step S87). As the disturbances are local, the bias is considered to decrease with the distance traveled since its last computation. The function used is the following: fct (bias)=bias*(1-distance^β/distance_maximal^β). The β is the number at which power the distance is considered. The higher this value, the more time the bias will have an influence considering that the maximal distance of influence (distance_maximal) remains constant.

Of course, once the function reaches zero, bias is no longer considered if no update occurs. The procedure in this case moves from step S85 straight to step S88.

The azimuth of displacement is then equated to the value $A_Z$ (step S88). The azimuth is thus calculated for each step to provide a cumulated displacement information, as explained below.

Figure 12H:
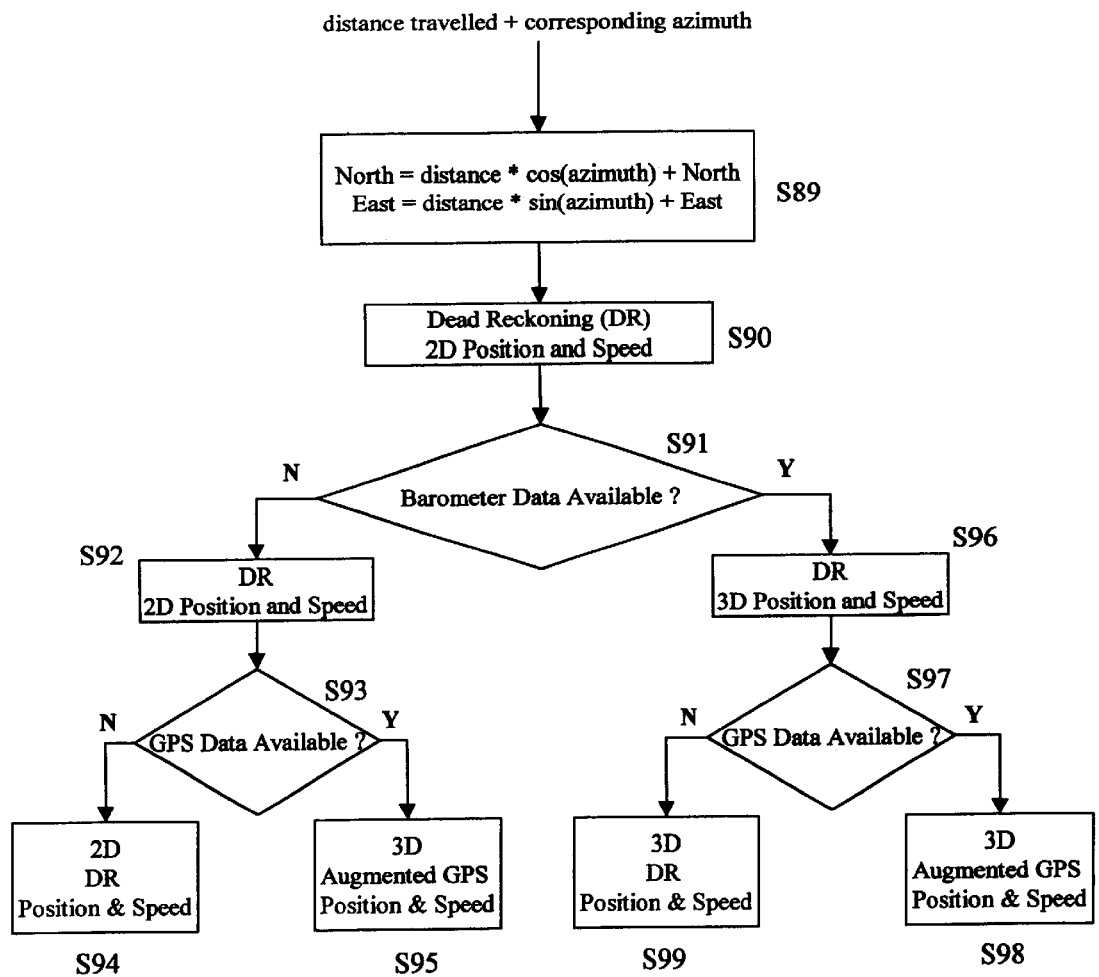

The procedure then continues by calculating the 2-dimensional /3-dimensional coordinate information, which shall be described with reference to FIG. 12H.

This part takes as input the distance traveled (cf. FIG. 12F) and the azimuth $A_Z$ (cf. FIG. 12G).

The computation of positions using cosine and sine functions is the only means used to determine a trajectory if the azimuth signal is present as raw data.

The calculation is based on periodically updating an accumulated North projection. This projection is calculated on the basis of the formula: new North projection=distance traveled*cos(azimuth)+previous North projection. Similarly, an East projection is determined on the basis of the formula: new East projection=distance traveled*sin (azimuth)+previous East projection (step S89).

From this is obtained the two-dimensional position and speed by navigation in the dead reckoning mode (step S90).

The procedure is then pursued to obtain a three-dimensional position, i.e. in which altitude is taken into account.

To this end, it is first determined whether barometer data (e.g. from pressure sensor 32) is available (step S91).

If no such data is available, the navigation by dead reckoning is limited to two-dimensional position and speed (step S92). However, the altitude can still be obtained from the GPS data. It is thus determined next whether GPS data is available (step S93). If no such data is available, then only two-dimensional position and speed in the dead reckoning mode is provided (step S94).

If GPS data is available, the navigation information is produced from three-dimensional GPS position and the speed determined by dead reckoning (step S95).

If barometer data is available (step S91), then the dead reckoning mode can provide navigation information comprising three-dimensional position and speed (step S96). From step S96, the procedure continues to determine whether GPS data is available, for improved accuracy (step S97). If available, the GPS data is then used to obtain three-dimensional position and speed navigation information (step S98). If GPS data is not available, the navigation information obtained at step S96 is maintained (step S99).

Figure 12I:
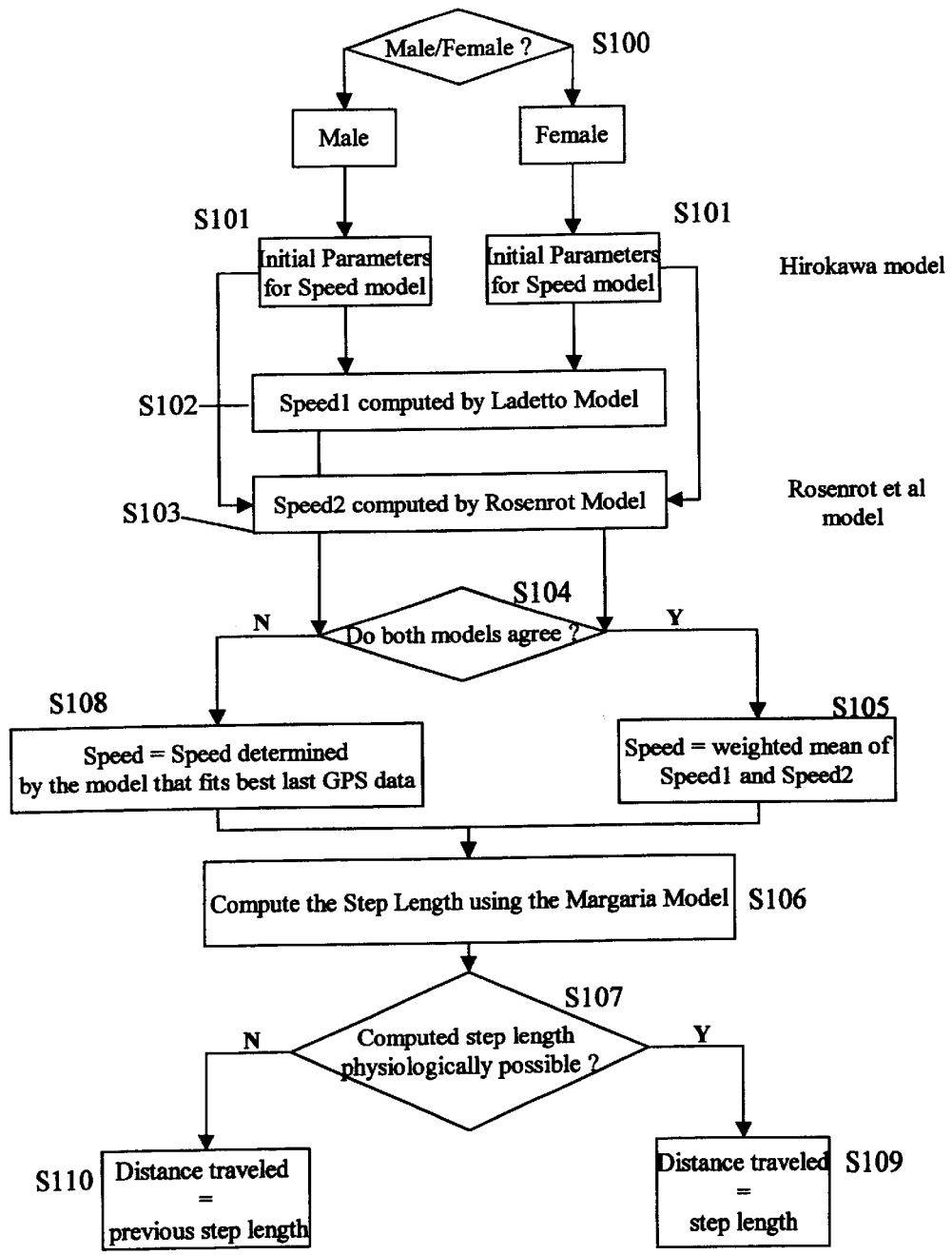

The implementation of the physiological models used above shall now be described in more detail with reference to the flow charts of FIGS. 12I and 12H. Here, use is first made of a "speed model" which determines walking speed. From this model-estimated walking speed, another physiological model, e.g. the Margaria model, is used to derive a step length.

In the example, the parameterization of the speed models is established separately depending on whether the pedestrian is male or female. Accordingly, the procedure starts by determining whether the pedestrian is male or female (step S100). The parameters are initialized separately according the male/female selection (step S101).

The physiological parameters are entered into two separate speed models stored in the memory 12: the Hirokawa and the Rosenrot models. These models separately serve to compute a walking speed as a function of time interval(s) between detected steps and the inputted physiological parameters.

The walking speed is calculated separately using the model developed by the inventor, yielding speed 1 (step S102) and the Rosenrot model, yielding speed 2 (step S103).

The use of two models is advantageous, as one can confirm the validity of the other.

It is thus next determined whether the speed 1 and speed 2 obtained from the respective models both agree to within a specified discrepancy i.e. whether the results are coherent (step S104).

If the results are within the discrepancy limit, a walking speed value is calculated on the basis of the weighted mean of the values for speed values speed 1 and speed 2 (step S105). The weighting can be established using an empirically determined weighting coefficient which can be updated in real time (cf. FIG. 12J, step S116).

The resulting weighted mean speed is then entered into the Margaria model to compute the step length (step S106). The model is set so that an inputted speed yields a corresponding step length. Other models can also be used, either instead of, or in parallel with, the Margaria model to yield the step length.

The step length obtained from Margaria model is checked to ascertain that it fits within a range of physiologically plausible values, and that no anomalous value is given (step S107).

If the discrepancy between speed 1 and speed 2 detected at step S104 exceeds a limit, a choice is made between one of the values speed 1 and speed 2 (step S108). This choice is made by selecting the speed value which most closely correlates with the latest acquired GPS data, when recent GPS data is available (step S108). This value (speed 1 or speed 2) is then used for the step length computation and checking in steps S106 and S107.

If it appears at step S107 that the step length computed from the Margaria (or other) model is within the acceptable range, then the distance traveled by the step is considered to be equal to that step length (step 109), and the total traveled distance is incremented accordingly.

On the other hand, if it appears at step S107 that the step length computed from the Margaria (or other) model is not plausible, the distance considered to be traveled for the step being considered is taken to be equal to the previously determined step length (step S110), and the total traveled distance is incremented by that previously determined value.

Figure 12J:
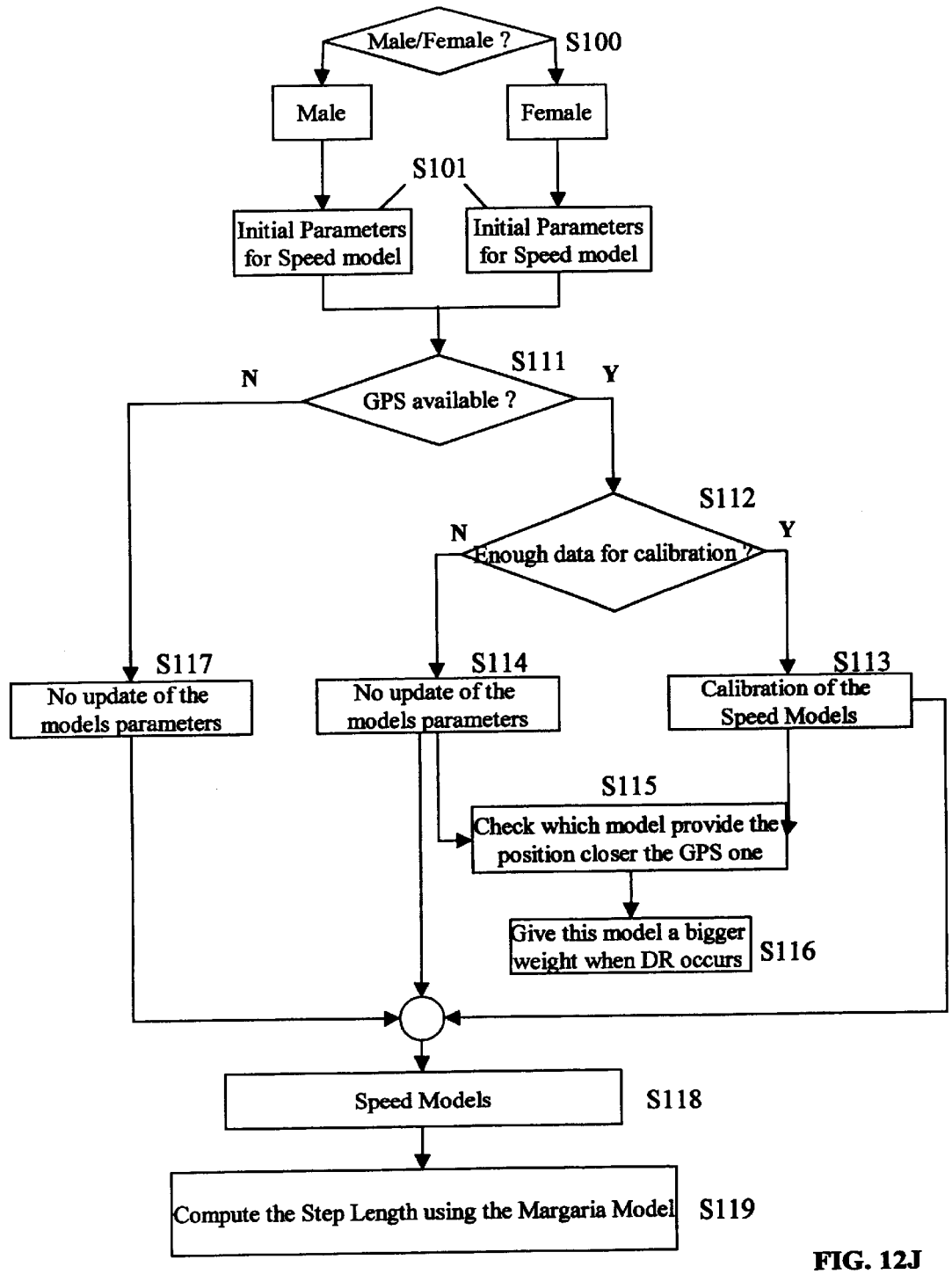

FIG. 12J is a flow chart explaining the procedure for updating the physiological models in real time using GPS data, when available.

The procedure starts as in the previous figure by adapting the parameterization according to whether the pedestrian is male or female (steps S100 and S101 already described).

Next, it is determined whether GPS data is available for an update (step S111).

If such GPS data is available, it is determined whether it is in sufficient quantity to perform a calibration (step S112). If sufficient GPS data is available, that data is used to recalibrate the physiological models (step S113).

If there is no sufficient GPS data, no recalibration of the models is performed (step S114).

In either case, a check is made as to which model provides the results closest to the GPS solution (step S115). This model is then given the most weight for the weighted average in the dead reckoning mode used in step S105 of the previous figure (step S116).

If no GPS data is available at all (step S111), then no update of the model parameters is performed (step S117).

Once the recalibration procedure is completed, the procedure returns to the normal operating mode for computation using the speed models (step S118) and the Margaria step length model (step S118).

The algorithm according to the preferred embodiment also provides for an automatic detection of a magnetic disturbance, in view of taking appropriate action in such an event.

Figure 12K:
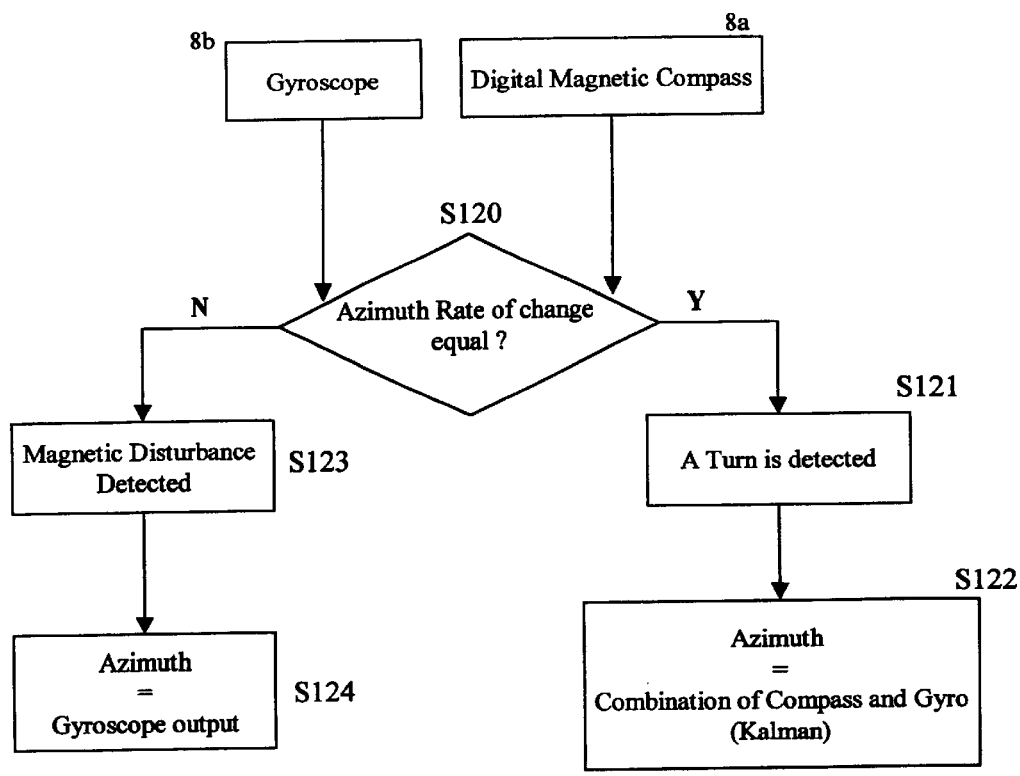

This aspect shall be described with reference to FIG. 12K. Here, it is assumed that the apparatus 1 has bearing sensors in the form of both digital magnetic compass 8a and gyroscopes 8b.

The bearing data from these two forms of sensors are compared to determine whether they indicate respective azimuth rates of change (ARC) which are substantially equal, i.e. for which the discrepancy is within a predetermined limit (step S120).

If the two values are within the discrepancy limit, then it is assumed that both types of sensor are substantially correct and that the change of azimuth that they indicate corresponds to a turn (step S121). In this case, the actualized azimuth value is obtained by combining the magnetic compass and gyro sensor values using integration and Kalman filtering techniques, known per se in the field of navigation (step S122).

If, on the other hand, it is determined at step S120 above that the two sensors do not yield substantially the same values, then it is deduced that the discrepancy arises from the fact that the magnetic sensor is subject to a magnetic perturbation (step S123). In this case, the reading from the digital magnetic compass 8a is temporarily ignored and the azimuth is simply taken from the value of the gyroscope sensor output (step S124).

There shall now be described with reference to FIG. 12L a part of the algorithm used in the preferred embodiment for detecting quick about turns (i.e. in which the pedestrian makes a substantially 180° turn over a short, substantially negligible distance), and adapting the navigation processing accordingly.

The procedure begins by monitoring the azimuth rate of change (ARC) by reading successive azimuth data from the bearing sensors 8a, 8b at short and regular intervals. This information is used to determine a condition in which the azimuth rate of change exceeds a predetermined threshold (step S125). This threshold is set to an ARC value corresponding to an about turn. In other words, all the while the ARC is below the threshold, the pedestrian is walking without any significant angular movement or turning very regularly with normal steps, and the navigation algorithm follows the course as described above (step S126).

If the ARC threshold is exceeded, then the algorithm follows a different path which begins by deactivating the step model(s) (step S127). This action is dictated by the fact that in this case the pedestrian is turning very quickly and the step lengths cannot be considered the same as those envisaged for the step models. The deactivation of the step models lasts all the while the ARC values are above the threshold. The inventor has found that during this rapid turning phase, the step length is reduced to become equal to about 80% of a normal step length. Analysis has shown that in a quick turn, the center of gravity of a person does not undergo a significant displacement. Satisfactory calculations can be made on the assumption that the pedestrian makes no translational displacement at all during a rapid change of direction.

After deactivating the step models, the procedure waits until the ARC values falls back to below the threshold (step S128), so indicating the end of the quick turn. Once the turn is considered as done, then the step model is re-activated (step S129) Next, it is checked whether the quick turn just terminated corresponds to a full about turn (substantially 180°). This is achieved by determining whether the azimuth values just before and just after detection of the quick turn differ from each other by 180° (to within a small angular tolerance) (step S130).

If such is the case, then it is considered that the pedestrian is going back on his or her footsteps (backtracking). It is then determined whether the distance traveled after the about turn ("forward traveled distance") is not statistically greater than the distance traveled in the reverse direction just after the about turn ("backwards traveled distance") (step S131). If this is the case, it is deduced that the pedestrian has most probably backtracked, on the assumption that when a pedestrian turns back on his or her steps, the return path is often of the same length as the forward path. A confirmation of this assumption should appear by comparing the alignment of azimuths in the trajectories before and after the turn while the backtracked way is expected (step S132) (i.e. it is determined whether the forward and return paths are substantially aligned). If the difference in alignment of these paths is the same to within a predetermined threshold tolerance (step S133), then it is deduced that the trajectories are the same, apart from the fact that one is offset by 180° with respect to the other. On the basis of this deduction, the azimuth of the pedestrian is determined as being the average of the two measured alignments corresponding respectively to the forward and return paths (step S134). In other words, the procedure in this case exploits the fact that the same path is presumably followed, to average out any error in azimuth measured along the forward and return directions.

If the azimuth directions are considered to be different at step S130, then the procedure returns to the standard processing mode using the determined models (step S135). Likewise, the procedure also returns to the standard processing mode if it is determined at step S131 that the backtracking distance is greater than the forward path (step S135).

Also, if it is detected at step S133 that the forward and return paths are not sufficiently closely aligned, the procedure continues as if the these two paths are different and the new trajectory of the return path is computed using standard processing (step S137).

Figure 13:
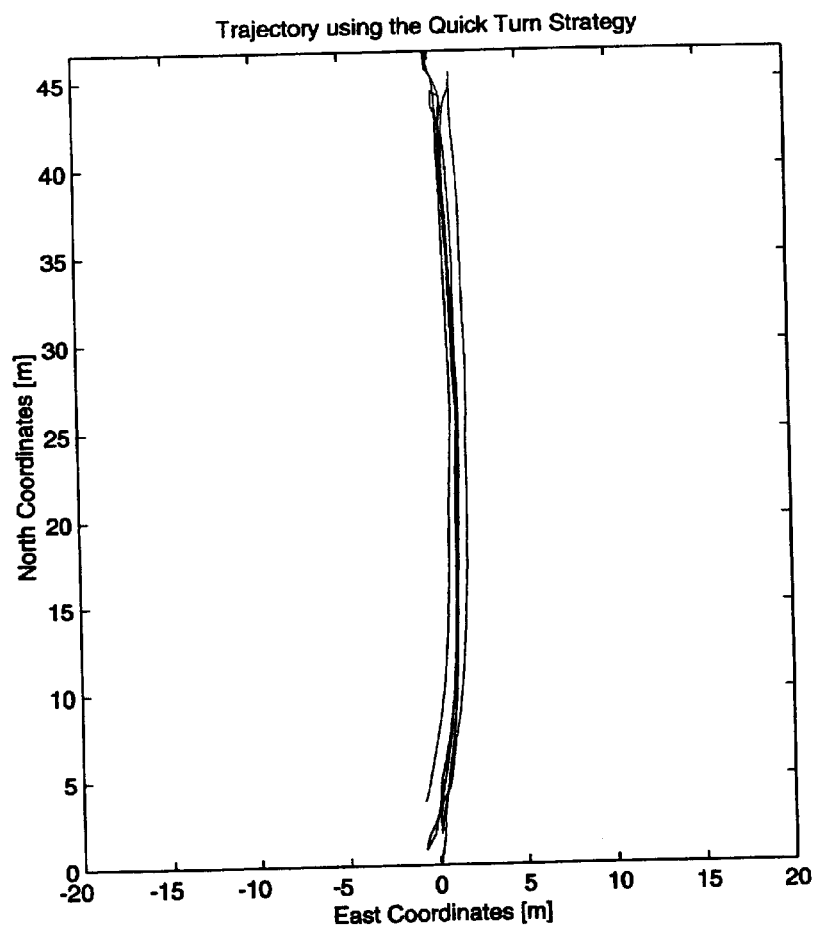
FIG. 13 is a navigation trace showing a calculated displacement when the pedestrian is making an about turn at 180°, as detected by a quick turn processing procedure in accordance with one aspect of the algorithm of FIG. 12.
Figure 14:
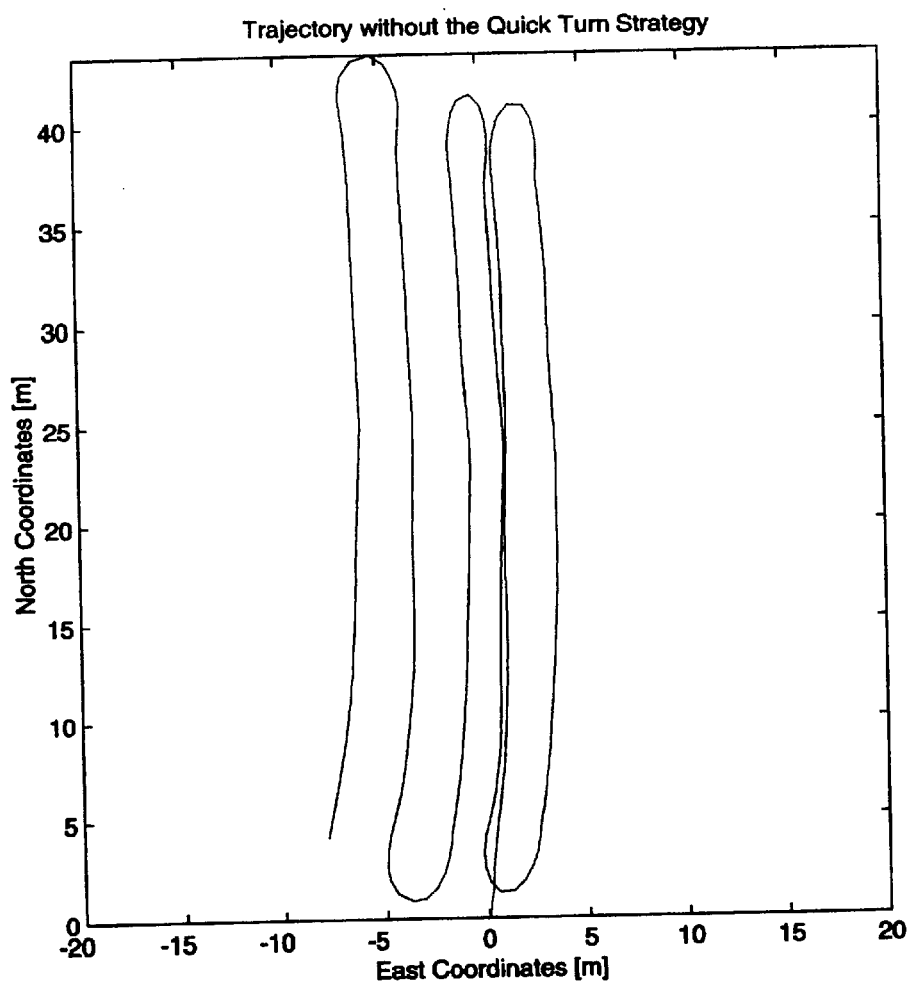
FIG. 14 is a navigation trace showing a calculated displacement when a pedestrian is making an about turn at 180° detected without making use of the quick turn processing procedure.

Experimental results of the above quick turn processing procedure are shown in FIGS. 13 and 14.

Figure 12L:
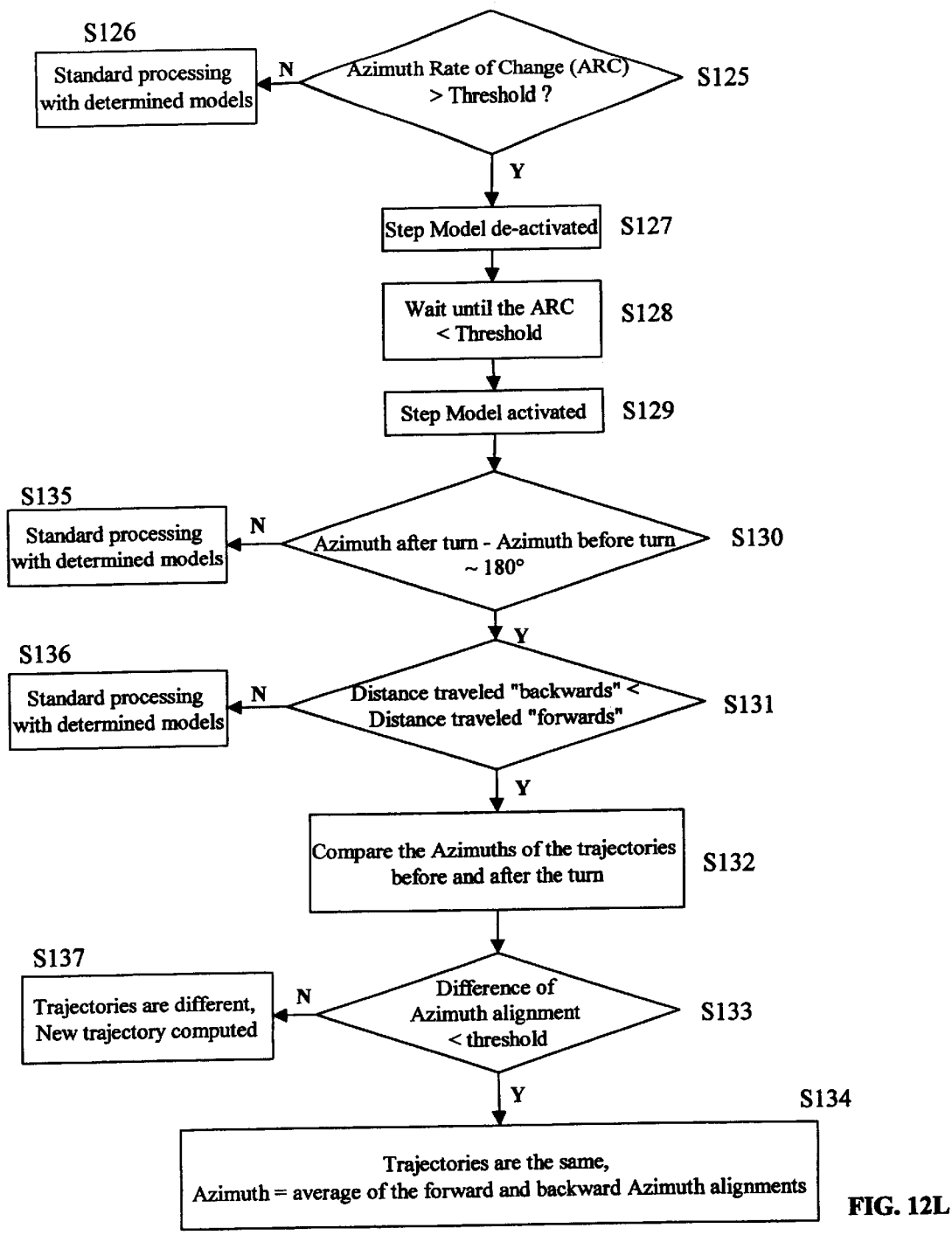

FIG. 13 shows the calculated evolution of a pedestrian effecting an about turn, using the quick turn analysis procedure of FIG. 12L. In the figure, the trajectory is shown against north and east coordinates (respectively along the ordinate and abscissa axes). It can be observed that the determined paths substantially overlap, showing that the navigation data does indeed provide reliable information.

FIG. 14 shows the calculated evolution of a pedestrian effecting the same about turn as in FIG. 13, but without using the quick turn analysis procedure is not implemented, i.e. the normal step model is used throughout the turning motion. It can be observed that the detected trajectory for the forward and return paths no longer overlap as they should (and do in the case of FIG. 13), implying that a navigation error is introduced.

There shall now be described with reference to FIGS. 15 and 16 a second embodiment of the invention for determining a step direction. This second embodiment rests on the principle of pattern recognition applied to accelerometer signals to determine a "signature" specific to a type of step motion: forward, backward, left or right sidestep. To this end, a model is used to identify a pedestrian's signature acceleration patterns and recognize the corresponding steps.

Figure 15:
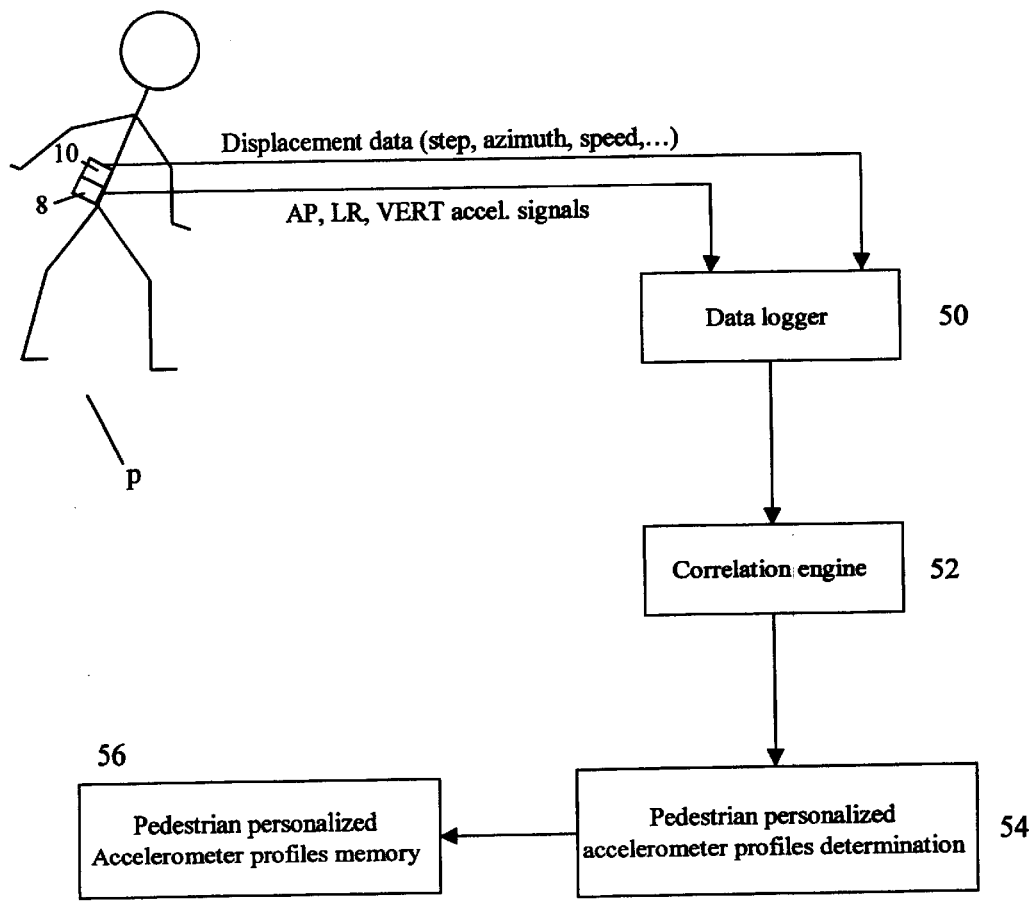
FIG. 15 is a schematic diagram showing how a pattern recognition model is personalized in a learning phase to produce a pedestrian personalized accelerometer profile for a Hidden Markov Model according to a variant embodiment of the invention.
Figure 16:
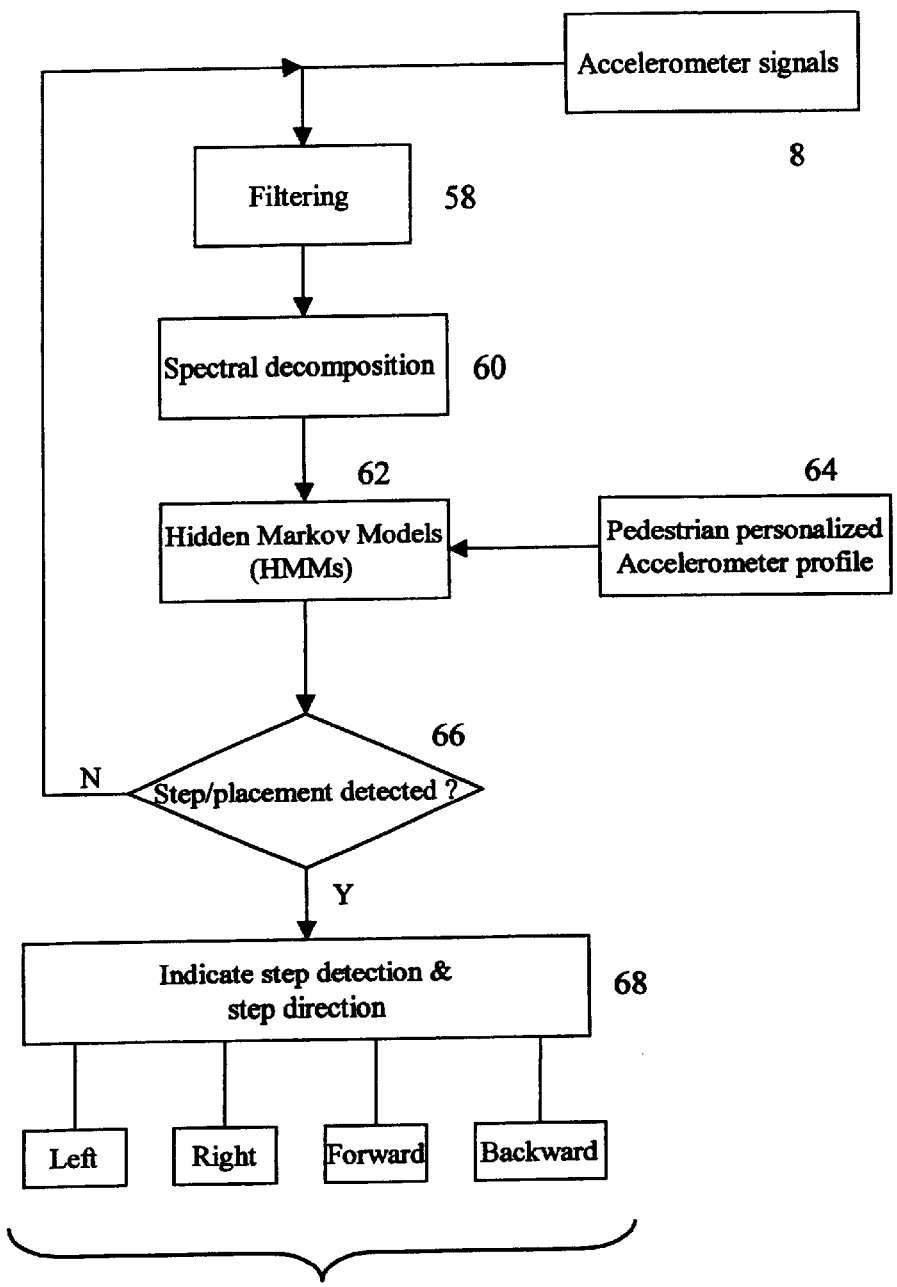
FIG. 16 is a schematic diagram showing how the Hidden Markov Model is used to determine a step direction in accordance with the variant embodiment.

As shown in FIG. 15, the signature acceleration patterns are obtained during a learning phase by placing on a pedestrian an accelerometer unit 8 and a GPS positioning unit 10, which can be taken from the apparatus 1 itself. The outputs from these units 8 and 10 are fed to a data logger 50. The latter periodically acquires displacement data including step length, azimuth, speed, absolute position from the GPS unit, and respective acceleration signals from each of the three orthogonal acceleration sensors 8AP, 8V and 8LR respectively delivering the antero-posterior, vertical and left-right acceleration components.

The data logger stores the displacement data and acceleration data in a time correlated manner, so that a record is kept of the evolution in acceleration signals for the corresponding displacements.

In the learning mode, the pedestrian goes through a program of step motions which correspond to different walking and/or running situations forward and backward steps, left and right sidesteps, walking at different step rates, strides, speeds, along different positive and negative gradients, making forward, backward, left and right side steps, turning at different rates, etc. The data logger in this way establishes a comprehensive library of acceleration data for these different displacement conditions.

The thus-acquired data is fed to a correlation engine which executes a spectral analysis program suited to the requirements of a chosen signal pattern recognition program. In the example, the model in question is the so-called "Hidden Markov Model" (HMM), which is known notably in the art of speech recognition techniques. Other models can be considered, however.

The output of the correlation engine 52 after processing is a set of data, designated "pedestrian personalized accelerometer profile" ready to parameterize the HMM in the appropriate manner for the particular pedestrian P.

This profile is then stored in a profile memory 56 for downloading into memory 12 of the pedestrian navigation apparatus 1.

In operation, the apparatus 1 is loaded with both the Hidden Markov Model and the pedestrian personalized profile specific to the pedestrian P who underwent the learning phase and now becomes the user.

In operation, the acceleration signals from the accelerometer unit 8 are passed through a filtering stage 58 and undergo a spectral decomposition 60 to extract suitably quantized acceleration values for the HMM 64, to which they are inputted. The HMM is also fed with the pedestrian personal profile data 64.

In this way, the microprocessor 2 uses the HMM in real time to process the acceleration signals and correlate their spectrum with patterns obtained in the learning phase. A detected correlation indicates that the pedestrian P is effecting a step motion analogous to one previously identified with similar acceleration signals during the learning mode.

The model is periodically interrogated to indicate whether a step and placement has thus been identified 66. In the affirmative, it further outputs an indication of the step direction recognized from the correlation: left, right, forward or backward 68. For example, if the model recognizes from the acceleration signal spectrum a pattern associated in the learning phase with acceleration signals made during a left sidestep, the model shall output at 68 that a left step has been made.

The means just described leading to the output 68 thus effectively replace the part of the algorithm of FIG. 12 used to determine the step direction. Thereafter, this variant embodiment can follow on with the execution of the algorithm according to FIG. 12, continuing on from step S61 of FIG. 12F.

It will be appreciated that techniques applied to voice recognition techniques or the like can be transposed to this particular application in pedestrian navigation. The analysis of the signals made by Hidden Markov Model can be in the time and/or frequency domain. Here, a step direction is thus recognized from acceleration signal frequency/amplitude patterns in a manner analogous to how a word would be recognized from voice frequency/amplitude patterns.

Depending on the chosen level of sophistication and learning phase program, the Hidden Markov Model can further be used to recognize not only a step direction, but also other step parameters, including: step length, walking speed, acceleration and deceleration, etc. These additional parameters are determined in a similar way, by correlation with corresponding step parameter values acquired in the learning phase.

Figure 17:
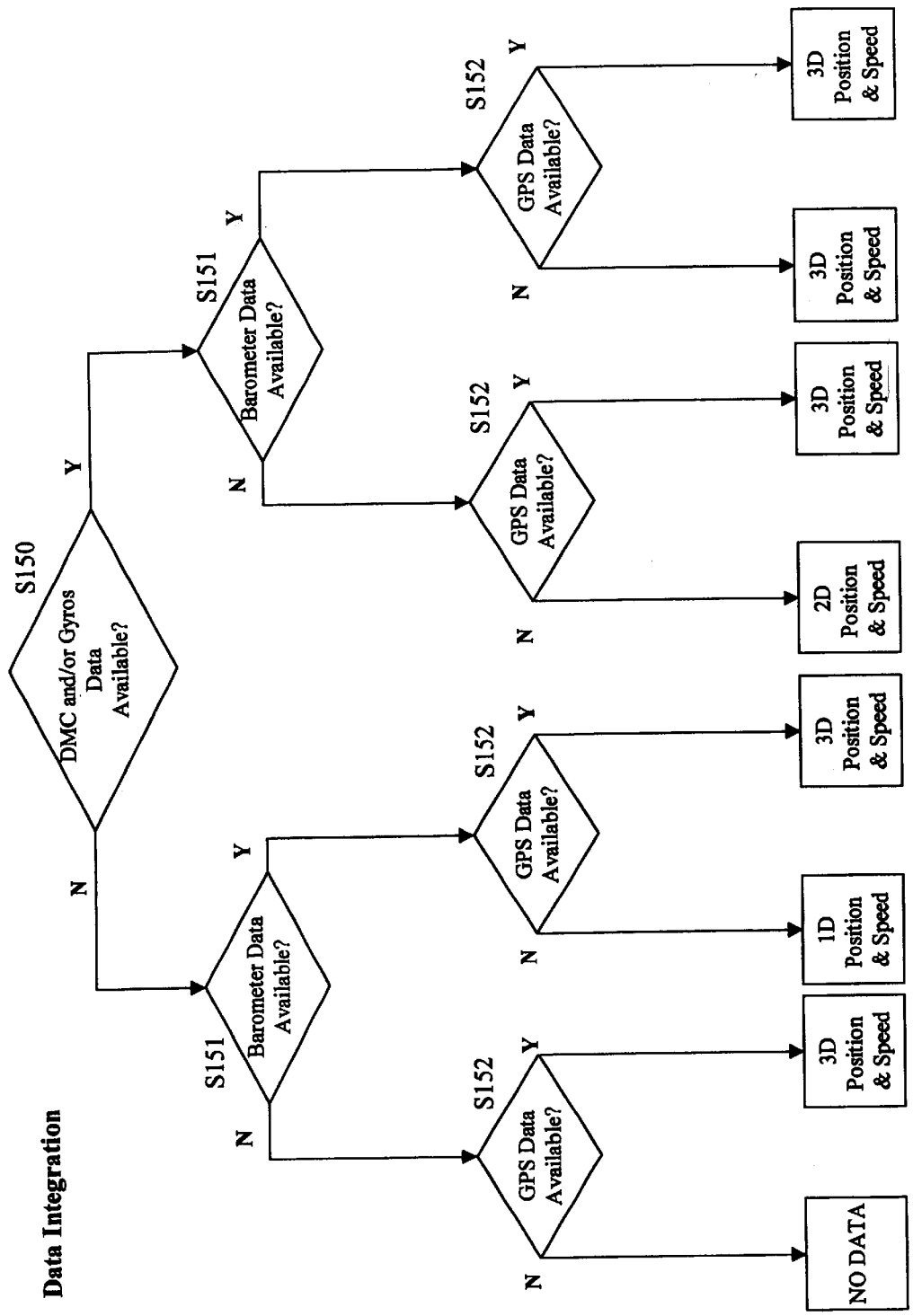
FIG. 17 is a general flow chart showing the type of navigation information that can be obtained in the embodiments of the invention depending on the data sources available

FIG. 17 is general flow chart explaining the different options for providing navigation information as a function of availability of magnetic sensor data and/or gyroscope(s), barometer data, and GPS data. This flow chart is self explanatory and only general remarks shall be given in what follows.

Navigation in the dead reckoning mode requires first and foremost some means of obtaining bearing data. The first decision point is whether such data is available (step S150). (The example refers to magnetic compass data, but applies equally to an embodiment based on gyroscopic sensors 8b.)

Next to be determined is whether barometer data is available (step S151), both in the case where bearing data is available and not available.

This gives rise by combination to four possibilities, for each of which it is determined whether GPS data is available (step 152). The number of situations then increases to eight. To each situation is provided a response in terms of the navigation information provided by the apparatus 1. These responses are summarized below:
  bearing data: no, barometer data: no, GPS data: no→no navigation data,
  bearing data: no, barometer data: no, GPS data: yes→3-dimensional position and speed from GPS,
  bearing data: no, barometer data: yes, GPS data: no→1D position and speed by dead reckoning mode,
  bearing data: no, barometer data: yes, GPS data: yes→3-dimensional position and speed from GPS,
  bearing data: yes, barometer data: no, GPS data: no→2-dimensional position and speed by dead reckoning mode,
  bearing data: yes, barometer data: no, GPS data: yes→3-dimensional position and speed from GPS,
  bearing data: yes, barometer data: yes, GPS data: no→3-dimensional position and speed by dead reckoning mode, and
  bearing data: yes, barometer data: yes, GPS data: yes→3-dimensional position and speed from GPS.

As can be appreciated from the different flow-charts presented, measurement of acceleration in the forward-backward (antero-posterior) direction provides a better basis for pedestrian navigation by dead reckoning compared vertical acceleration measurements. In particular, it allows for a determination of walking direction, both in front or back stepping movements and in left or right side stepping movements. It is not necessary to work with the vertical acceleration signal. However, a vertical acceleration signal can be used to provide a good check, and thus improve the reliability of the results.-It appears that vertical acceleration is in some ways characteristic of the way humans walk, jump, ski, skate etc. A vertical acceleration signal is thus not specific to a walking motion and is active even when no step is performed.

The AP movement stops becoming evident to detect once the velocity is maintained constant. This is the case in skating and skiing (cf. FIG. 9): the body is maintained for a while at a constant velocity and no strong detectable AP acceleration is detected. While walking, however, if the body does not produce a pronounced AP acceleration, its velocity will quickly fall to zero suddenly. This why optimal results are achieved by exploiting the AP signal.

On a separate account, the invention proposes judiciously to use an Pedestrian Navigation System (PNS) module to provide acceleration data signals that are exploited not by time integration, as in standard vehicle navigation, but by wave analysis to determine step motion, as explained above.

The above embodiments are based on an accelerometer unit which contains three orthogonal acceleration sensors, each delivering an acceleration component (antero-posterior, vertical, lateral) on a respective channel. However, the invention can be implemented using just two acceleration sensors, e.g. in view economizing on hardware requirements. In this case, it is still possible to exploit the non-vertical acceleration component by having one of the acceleration sensors arranged to detect the acceleration component along the antero-posterior direction. The other acceleration sensor can be arranged either in the lateral left-right alignment so as to detect the left and right side-steps. It can also be envisaged to have one or both sensors inclined when mounted on the pedestrian so that they are aligned not with a vertical or horizontal plane of the pedestrian. In this way, at least one sensor acquires an acceleration signal having components in an antero-posterior direction and one other orthogonal direction axis, be it the vertical axis or the left-right axis. Signal processing and filtering techniques can then be applied to the sensor signals for resolving the acceleration signals along the main axes to thereby obtain the information required for the algorithms.

It shall be apparent to those skilled in the art that numerous embodiments and variants can be envisaged without departing from the scope or spirit of the invention, and that the invention may be practiced in other forms while remaining within the scope of the appended claims.

What is claimed is:

1. A method of determining a displacement of a pedestrian by detecting accelerations of said pedestrian, said method comprising the steps of:

detecting accelerations having at least a component that is substantially along an antero-posterior (forward-backward) direction which is substantially non-vertical, determining at least one characteristic feature of said detected accelerations correlated with a displacement step motion, and determining said diplacement from a previous point to a predicted point on the basis of said at least one determined characteristic feature.

2. The method of claim 1, further comprising determining a direction, relative to said pedestrian, of a detected step.

3. The method of claim 1, wherein said displacement determining step involves calculating a displacement on foot and/or a displacement speed of said pedestrian.

4. The method of claim 1, wherein said accelerations are detected along a lateral (left-right) direction of said pedestrian.

5. The method of claim 1, wherein said step characteristic feature determining step involves determining a peak acceleration from said detected accelerations and correlating said peak with a motion of the body corresponding to a displacement.

6. The method of claim 1, further comprising a step of distinguishing between whether said pedestrian is making a step in an antero-posterior sense (forward or backward direction) on the one hand, and in a lateral sense (left or right direction) on the other, said distinguishing step comprising:

determining a variance of successive acceleration values over a given time period for both an acceleration in the antero-posterior sense and in the lateral sense, comparing the variance determined for the antero-posterior acceleration values with the variance determined for the lateral acceleration values, determining that said pedestrian is making a step in said antero-posterior sense if the variance of said antero-posterior acceleration values exceeds the variance of said lateral acceleration values, and determining that said pedestrian is making a step in said lateral sense if the variance of said lateral acceleration values exceeds the variance of said antero-posterior acceleration values.

7. The method of claim 1, wherein said acceleration detecting step further comprises detecting accelerations along said vertical direction.

8. The method of claim 1, wherein:

said acceleration detecting step comprises acquiring successive acceleration values, said characteristic and displacement determination steps comprise the sub-steps of:

determining a current peak acceleration in said successive acceleration values by means of a sliding window, determining a variance of said successive acceleration values acquired between said current peak and a previous peak acceleration value, comparing said variance to an adaptive threshold to detect if said pedestrian is walking or not, determining whether a time interval between two successive peak acceleration values falls within a physiologically possible time interval, and storing the time of acquisition of said current peak acceleration value as the time of occurrence of a detected foot impact corresponding to a displacement step.

9. The method of claim 1, further comprising the step of detecting whether said pedestrian is moving or not, said determining step comprising:

acquiring acceleration values during a time interval, calculating a variance in said acquired acceleration values, comparing said variance to a determined threshold, and considering that said pedestrian is moving if the variance is superior to said threshold.

10. The method of claim 1, wherein said accelerations are detected by acceleration sensor means mounted on the trunk of said pedestrian.

11. The method of claim 1, wherein said accelerations are detected by acceleration sensor means mounted on the waist of said pedestrian.

12. The method of claim 1, wherein said accelerations are detected by means of three mutually orthogonal acceleration sensors each delivering an acceleration component of a respective orthogonal axis on a separate channel.

13. The method of claim 1, further comprising the step of using means satellite positioning means to correct displacement information obtained through said accelerations.

14. The method of claim 1, wherein said characteristic determination step comprises the sub-steps of:

detecting a repetition of a said characteristic feature in said accelerations, measuring a time interval separating a currently detected and a previously detected said characteristic feature, and determining whether said time interval falls within at least one of an upper and a lower limit, and wherein said displacement determining step comprises the step of considering said currently detected characteristic feature as corresponding to a displacement step if said time interval falls within said upper and lower limits.

15. The method of claim 14, wherein said characteristic feature is a maximum acceleration value or a minimum acceleration value in a determined group of detected acceleration values acquired in a time window.

16. The method of claim 1, further comprising a step of distinguishing between forward and backward steps relative to said pedestrian, said distinguishing step comprising:

detecting accelerations along the antero-posterior (forward-backward) direction relative to said pedestrian, determining a time of occurrence of a current first characteristic value and a previous first characteristic value in the antero-posterior accelerations, determining whether a time interval separating said current and previous first characteristic values is within determined time limits, determining a time of occurrence of a second characteristic value in the antero-posterior accelerations occurring within a time range at least sufficiently large to contain said determined time limits, and discriminating between a forward and a backward step on the basis of the order of occurrence of said current first characteristic value and said second characteristic value.

17. The method of claim 16, wherein said first characteristic value is a maximum value in a group of detected acceleration values, and said second characteristic value is a minimum value of said detected accelerations, and wherein said displacement step is determined as corresponding to a forward displacement step if said minimum value precedes said maximum value, and as corresponding to a backward step if said maximum value precedes said minimum value.

18. The method of claim 1, further comprising a step of distinguishing between left and right displacement steps relative to said pedestrian, said distinguishing step comprising:
- detecting accelerations along a lateral (left-right) direction relative to said pedestrian,
- determining a time of occurrence of a current first characteristic value and a previous first characteristic value in the lateral accelerations,
- determining whether a time interval separating said current and previous first characteristic values is within determined time limits,
- determining a time of occurrence of a second characteristic value in the lateral accelerations occurring within a time range at least sufficiently large to contain said determined time limits, and
- discriminating between a left and a right step on the basis of the order of occurrence of said current first characteristic value said second characteristic value.

19. The method of claim 18, wherein said first characteristic value is a maximum value in a group of detected acceleration values, and said second characteristic value is a minimum value of said detected accelerations, and wherein said displacement step is determined as corresponding to a right displacement step if said minimum value precedes said maximum value, and as corresponding to a left displacement step if said maximum value precedes said minimum value.

20. The method of claim 1, wherein said characteristic determination step comprises the sub-steps of:
- determining a first time corresponding to an occurrence of a characteristic feature in said accelerations along a substantially non-vertical direction of said pedestrian,
- detecting accelerations along a vertical direction of said pedestrian,
- determining a second time corresponding to an occurrence of said characteristic feature in said accelerations along a vertical direction of said pedestrian,
- comparing said first and second times, and
- using a result of said comparison to confirm the presence of a displacement step.

21. The method of claim 20, wherein said characteristic feature is a maximum acceleration value in a determined group of detected acceleration values.

22. The method of claim 1, wherein a step direction in at least one of an antero-posterior (forward-backward) sense and a lateral (left-right) sense is distinguished using a model adapted to recognize patterns in detected acceleration values that are representative of specific step directions.

23. The method of claim wherein said model is a Hidden Markov Model.

24. The method of claim 1, wherein said accelerations are detected by using sensors of an inertial navigation system (INS).

25. The method of claim 24, wherein said sensors are housed in a module together with azimuth detection means, said azimuth detection means being one of magnetic sensor means and/or gyroscope means, and being used to acquire azimuth data.

26. The method of claim 1, further comprising the step of acquiring barometer data to determine an elevational component in said determined displacement.

27. The method of claim 1, wherein said displacement determining step involves determining a distance traveled by using at least one first model which yields a pedestrian displacement speed in response to a variance and/or a frequency of occurrence of said characteristic feature in values of said acquired accelerations, and at least a time indicator or a second model which correlates the pedestrian displacement speed obtained by said first model with a step length.

28. The method of claim 27, wherein said first mathematical model correlates displacement speed with said variance in accordance with the following relationships:
- 2-dimensional relative speed=D*(variance)E+F*frequency of steps;
- displacement speed=2-dimensional displacement speed+vbaro
- where D, F and F are numerical coefficients from which D and F can be set equal to 0 or finite values and vbaro is the vertical velocity measured by a barometer, 2-dimensional displacement speed being obtained by multiplying the 2-dimensional relative speed by stature or the leg length according to the model which is chosen and 3-dimensional displacement speed then being computed by adding the vertical displacement vbaro to the 2-dimensional displacement speed.

29. The method of claim 27, wherein said first mathematical model correlates displacement speed with either said variance or a frequency of occurrence of said characteristic feature in accordance with the following relationship:
- 2-dimensional relative Speed=A*(Frequency or Variance) B+C,
- displacement speed=2-dimensional displacement speed+vbaro
- where A, B and C are numerical coefficients and vbaro is the vertical velocity measured by the barometer, the 2-dimensional displacement speed being obtained by multiplying the 2-dimensional relative speed by stature or the leg length according to the model which is chosen and 3-dimensional displacement speed then being computed by adding the vertical displacement vbaro to the 2-dimensional displacement speed.

30. The method of claim 27, wherein said time indicator correspond to a time interval between two successive said characteristic features, whereby:
- step length=speed*time between two successive characteristic features
- or wherein said second mathematical model correlates step length with displacement speed in accordance with the following relationships:
- step length=s10+m*displacement speed;
- where s10 is a fraction of the step length which is constant and independent of speed of progression, and m is a slope of a function describing the step length as a function of displacement speed.

31. The method of claim 30, wherein an initial s10 value is determined with different model for a male or a female pedestrian.

32. The method of claim 27, further comprising the step of updating at least one parameter of said second mathematical model on the basis of external positioning data from a global positioning by satellite (GPS) system.

33. The method of claim 1, further comprising the step of azimuth computation for each step or group of steps effected to determine a position of said pedestrian.

34. The method of claim wherein an azimuth computation is computed for each determined displacement step, said computation comprising the steps of:

distinguishing a direction of a step between forward, backward, left and right displacement steps, detecting an azimuth from a sensor carried by said pedestrian, correcting said detected azimuth with an offset angle in accordance with a distinguished of step.

35. The method of claim 33, wherein said azimuth computation is performed from azimuth signals produced by magnetic sensor means.

36. The method of claim 33, wherein said azimuth computation step is performed from azimuth signals produced by magnetic sensor means yielding raw angular data signals, said step comprising a sub step of extracting the cosine and sine components of said raw azimuth data and filtering said cosine and sine components.

37. The method of claim 33, wherein said azimuth computation is performed from azimuth signals produced by a gyroscopic sensor.

38. The method of claim 33, wherein said azimuth computation is performed by magnetic sensor means and by other sensor means not dependent on the North magnetic field, said method further comprising the steps:

comparing azimuth readings from said magnetic and said other sensor means, and ignoring azimuth readings from said magnetic sensor means if said comparison step reveals a discrepancy between said readings exceeding a limit value, indicative of a significant magnetic disturbance.

39. The method of claim 1, further comprising a step of detecting an about turn in said displacement of said pedestrian, comprising:

detecting a condition in which an azimuth rate of change of said pedestrian exceeds a determined threshold, determining whether said azimuth rate of change corresponds roughly to a 180° turn, in the affirmative, determining whether alignments of trajectories before and after said turn are the same to within a determined discrepancy limit, in the affirmative, considering that an about turn is affected.

40. The method of claim 39, wherein any step made during a period in which said azimuth rate of change exceeds said determined threshold is not used to calculate a distance of displacement.

41. The method of claim 39, wherein an azimuth is calculated on the basis of an average between said alignments corresponding to a forward and return path.

42. The method of claim 39, wherein said about turn is considered to be effected only on the further condition that a trajectory effected after said azimuth rate of change of said pedestrian exceeding a determined threshold is shorter than the trajectory effected before said azimuth rate of change of said pedestrian exceeds a determined threshold.

43. The method of claim 1, wherein said accelerations are detected by means of two mutually orthogonal acceleration sensors each delivering an acceleration component operatively aligned along a respective orthogonal axis, the alignment of at least one of said sensors having a component in a non vertical direction when operatively carried by said pedestrian.

44. The method of claim 43, wherein at least one said axis of an accelerometer is inclined with respect to a vertical axis of said pedestrian.

45. A method of pedestrian navigation operative in a dead reckoning mode, comprising the steps of:

detecting an evolving signal indicative of accelerations of said pedestrian in-an antero-posterior (forward-backward) direction, analyzing said signals to determine a variation therein conforming to predetermined constraints, using said variation to establish a displacement step motion and to determine displacement information comprising at least one of a speed and distance of displacement, determining an azimuth of said pedestrian, and combining said displacement data with said azimuth to obtain pedestrian navigation information.

46. A method of pedestrian navigation operative in a dead reckoning mode, comprising the steps of:

using an Inertial Navigation System (INS) as a source acceleration signals, said system having a motion detection sensor responsive to accelerations along an antero-posterior (forward-backward) direction of said pedestrian, submitting signals from said INS to a waveform analysis to determine a step of said pedestrian, and determining pedestrian navigation information of said step from a previous point to a predicted point on the basis of said waveform analysis.

47. The method of claim 46, wherein said INS also has a motion sensor responsive to accelerations along a lateral (left-right) direction of said pedestrian, signals therefrom being submitted to a waveform analysis to determine a left or right displacement effected by said pedestrian.

48. The method of claim 47, wherein said INS also has a motion sensor responsive to accelerations along a vertical direction of said pedestrian, signals therefrom being submitted to a waveform analysis to provide a confirmation of a determination of a displacement step.

49. The method of claim 47, wherein said INS further comprises bearing detection means in the form of magnetometer means or gyroscope means, said means being used to obtain an azimuth of said pedestrian for the determination of said navigation information.

50. The method of claim 46, wherein said INS is in the form of a module carried on the waist of said pedestrian.

51. The method of claim 47, wherein said INS is in the form of a module carried on trunk of said pedestrian.

52. An apparatus for determining a displacement of a pedestrian by detecting accelerations of said pedestrian, said apparatus comprising:

sensing means for detecting accelerations having at least a component that is substantially along an antero-posterior (forward-backward) direction which is substantially non-vertical, characteristic determining means for determining at least one characteristic feature of said detected accelerations correlated with a displacement step motion, and displacement determining means for determining said displacement from a previous point to a predicted point on the basis of said at least one determined characteristic feature.

53. The apparatus of claim 52, wherein said acceleration detecting means comprises means for detecting accelerations along said vertical direction.

54. The apparatus of claim 52, wherein said displacement determining means are operative for calculating a displacement on foot and/or a displacement speed of said pedestrian.

55. The apparatus of claim 52, further comprising motion detecting means for detecting whether said pedestrian is moving or not, said means comprising:

means for acquiring acceleration values during a time interval, means for calculating a variance in said acquired acceleration values, means for comparing said variance to a determined threshold, and means for considering that said pedestrian is moving if the variance is superior to said threshold.

56. The apparatus of claim 52, wherein said step characteristic feature determining means is operative to detect a peak acceleration from said detected accelerations and to correlate said peak with a motion of the body corresponding to a displacement.

57. The apparatus of claim 52, further comprising first distinguishing means for distinguishing between whether said pedestrian is making a step in an antero-posterior sense (forward or backward direction) on the one hand, and in a lateral sense (left or right direction) on the other, said first distinguishing means comprising:

means for determining a variance of successive acceleration values over a given time period for both an acceleration in the antero-posterior sense and in the lateral sense, means for comparing the variance determined for the antero-posterior acceleration values with the variance determined for the lateral acceleration values, means for determining that said pedestrian is making a step in said antero-posterior sense if the variance of said antero-posterior acceleration values exceeds the variance of said lateral acceleration values, and means for determining that said pedestrian is making a step in said lateral sense if the variance of said lateral acceleration values exceeds the variance of said antero-posterior of said lateral acceleration values.

58. The apparatus of claim 52, further comprising direction determining means for determining a direction, relative to said pedestrian, of a detected step.

59. The apparatus of claim 52, further comprising satellite positioning means to correct displacement information obtained through said accelerations.

60. The apparatus of claim 52, wherein said accelerations are detected by acceleration sensor means mounted on the waist of said pedestrian.

61. The apparatus of claim 62, wherein:

said acceleration detecting means is operative to acquire successive acceleration values, said characteristic and displacement determination means comprise:

means for determining a current peak acceleration in said successive acceleration values by means of a sliding window, means for determining a variance of said successive acceleration values acquired between said current peak and a previous peak acceleration value, means for comparing said variance to an adaptive threshold to detect if said pedestrian is walking or not, means for determining whether the time interval between two successive peak acceleration values falls within a physiologically possible time interval, and means for storing a time of acquisition of said current peak acceleration value as the time of occurrence of a detected foot impact corresponding to a displacement step.

62. The apparatus 52, wherein said accelerations are detected by means of three mutually orthogonal acceleration sensors each delivering an acceleration component of a respective orthogonal axis on a separate channel.

63. The apparatus of claim 52, wherein said accelerations are detected along a lateral (left-right) direction of said pedestrian.

64. The apparatus of claim 52, wherein said characteristic determining means comprises:

means for detecting a repetition of a said characteristic feature in said accelerations, means for measuring a time interval separating a currently detected and a previously detected said characteristic feature, and means for determining whether said time interval falls within at least one of an upper and a lower limit, and wherein said displacement determining means comprises means for considering said currently detected characteristic feature as corresponding to a displacement step if said time interval falls within said upper and lower limits.

65. The apparatus of claim 52, wherein said characteristic feature is a maximum acceleration value or a minimum acceleration value in a determined group of detected acceleration values acquired in a time window.

66. The apparatus of claim 52, further comprising second distinguishing means for distinguishing between forward and backward steps relative to said pedestrian, said second distinguishing means comprising:

means for detecting accelerations along the antero-posterior (forward-backward) direction relative to said pedestrian, means for determining a time of occurrence of a current first characteristic value and a previous first characteristic value in the antero-posterior accelerations, means for determining whether a time interval separating said current and previous first characteristic values is within determined time limits, means for determining a time of occurrence of a second characteristic value in the antero-posterior accelerations occurring within a time range at least sufficiently large to contain said determined time limits, and means for discriminating between a forward and a backward step on the basis of the order of occurrence of said current first characteristic value and said second characteristic value.

67. The apparatus of claim 66, wherein said first characteristic value is a maximum value in a group of detected acceleration values, and said second characteristic value is a minimum value of said detected accelerations, and wherein said displacement step is determined as corresponding to a forward displacement step if said minimum value precedes said maximum value, and as corresponding to a backward step if said maximum value precedes said minimum value.

68. The apparatus of claim 52, further comprising model means for distinguishing a step direction in at least one of an antero-posterior (forward-backward) sense and a lateral (left-right), said model means being adapted to recognize patterns in detected acceleration values that are representative of specific step directions.

69. The apparatus of claim 68, wherein said model means is a Hidden Markov Model.

70. The apparatus of claim 52, wherein said accelerations are detected by acceleration sensor means mounted on the trunk of said pedestrian.

71. The apparatus of claim 70, wherein said sensors are housed in a module together with azimuth detection means, said azimuth detection means being one of a magnetic sensor means and/or gyroscope means, and being used to acquire azimuth data.

72. The apparatus of claim 52, wherein said accelerations are detected by using sensors of an inertial navigation system (INS).

73. The apparatus of claim 27, wherein said INS is in the form of a module that is carried on said pedestrian and is oriented independently of said pedestrian.

74. The apparatus of claim 52, further comprising pressure sensor means for determining an elevational component in said determined displacement.

75. The apparatus of claim 52, wherein said characteristic determination means comprises:
- means for determining a first time corresponding to an occurrence of a characteristic feature in said accelerations along a substantially non-vertical direction of said pedestrian,
- means for detecting accelerations along a vertical direction of said pedestrian,
- means for determining a second time corresponding to an occurrence of said characteristic feature in said accelerations along a vertical direction of said pedestrian,
- means for comparing said first and second times, and
- means using a result of said comparison to confirm the presence of a displacement step.

76. The apparatus of claim 75, said characteristic feature is a maximum acceleration value in a determined group of detected acceleration values.

77. The apparatus of claim 52, further comprising third distinguishing means for distinguishing between left and right displacement steps relative to said pedestrian, said third distinguishing step comprising:
- means for detecting accelerations along a lateral (left-right) direction relative to said pedestrian,
- means for determining a time of occurrence of a current first characteristic value and a previous first characteristic value in the lateral accelerations,
- means for determining whether a time interval separating said current and previous first characteristic values is within determined time limits,
- means for determining a time of occurrence of a second characteristic value in the lateral accelerations occurring within a time range at least sufficiently large to contain said determined time limits, and
- means for discriminating between a left and a right step on the basis of the order of occurrence of said current first characteristic value and said second characteristic value.

78. The apparatus of claim 77, wherein said first characteristic value is a maximum value in a group of detected acceleration values, and said second characteristic value is a minimum value of said detected accelerations, and wherein said displacement step is determined as corresponding to a right displacement step if said minimum value precedes said maximum value, and as corresponding to a left displacement step if said maximum value precedes said minimum value.

79. The apparatus of claim 52, wherein said displacement determining means comprises means for determining a distance traveled by using at least one first model which yields a pedestrian displacement speed in response to a variance and/or a frequency of occurrence of said characteristic feature in values of said acquired accelerations, and at least a second model which correlates the pedestrian displacement speed obtained by said first model with a step length.

80. The apparatus of claim 79, wherein said first mathematical model correlates displacement speed with said variance in accordance with the following relationship:

2-dimensional relative speed=D*(variance) E+F*frequency of steps displacement speed=2-dimensional displacement speed+vbaro where D, E and F are numerical coefficients from which D and F can be set equal to 0 or finite values and vbaro is the vertical velocity measured by a barometer, 2-dimensional displacement speed being obtained by multiplying the 2-dimensional relative speed by stature or the leg length according to the model which is chosen and 3-dimensional displacement speed then being computed by adding the vertical displacement vbaro to the 2-dimensional displacement speed.

81. The apparatus of claim 79, wherein said first mathematical model correlates displacement speed with either said variance or a frequency of occurrence of said characteristic feature in accordance with the following relationships:

2-dimensional relative Speed=A*(Frequency or Variance) B+C, displacement speed=2-dimensional displacement speed+vbaro where A, B and C are numerical coefficients and vbaro is the vertical velocity measured by the barometer, the 2-dimensional displacement speed being obtained by multiplying the 2-dimensional relative speed by stature or the leg length according to the model which is chosen and 3-dimensional displacement speed then being computed by adding the vertical displacement vbaro to the 2-dimensional displacement speed.

82. The apparatus of claim 79, wherein said time indicator corresponds to a time interval between two successive said characteristic features, whereby:
step length=speed*time between two successive characteristic features;
or wherein said second mathematical model correlates step length with displacement speed in accordance with the following relationship:
step length=s10+m×displacement speed;
where s10 is a fraction of the step length which is constant and independent of speed of progression, and m is a slope of a function describing the step length as a function of displacement speed.

83. The apparatus of claim 82, wherein an initial s10 value is determined with different model for a male or a female pedestrian.

84. The apparatus of claim 79, further comprising means for updating at least one parameter of said second mathematical model on the basis of external positioning data from a global positioning by satellite (GPS) system.

85. The apparatus of claim 52, further comprising means for performing an azimuth computation for each step or group of steps effected to determine a position of said pedestrian.

86. The apparatus of claim 85, wherein said azimuth computation means computes an azimuth for each determined displacement step, said computation means comprising:
- means for distinguishing a direction of a step between forward, backward, left and right displacement steps,
- means for detecting an azimuth from a sensor carried by said pedestrian, and
- means for correcting said detected azimuth with an offset angle in accordance with a distinguished of step.

87. The apparatus of claim 85, wherein said azimuth computation means comprise magnetic sensor means and other sensor means not dependent on the North magnetic field, said apparatus further comprising:

means for comparing azimuth readings from said magnetic and said other sensor means, and means for ignoring azimuth readings from said magnetic sensor means if said comparison step reveals a discrepancy between said readings exceeding a limit value, indicative of a significant magnetic disturbance.

88. The apparatus of claim 86, wherein said azimuth computation is performed from azimuth signals produced by magnetic sensor means.

89. The apparatus of claim 86, wherein said azimuth computation means uses azimuth signals produced by magnetic sensor means yielding raw angular data signals, said apparatus further comprising means for extracting the cosine and sine components of said raw azimuth data and filtering said cosine and sine components.

90. The apparatus of claim 86, wherein said azimuth computation means are operative to perform said computation from angular rate signals produced by a gyroscopic sensor.

91. The apparatus of claim 52, further comprising means for detecting an about turn in said displacement of said pedestrian, comprising:

means for detecting a condition in which an azimuth rate of change of said pedestrian exceeds a determined threshold, means for determining whether said azimuth rate of change corresponds roughly to a 180° turn, means, operative in the affirmative, for determining whether alignments of trajectories before and after said turn are the same to within a determined discrepancy limit, and means, operative in the affirmative, for considering that an about turn is affected.

92. The apparatus of claim 91, wherein any step made during a period in which said azimuth rate of change exceeds said determined threshold is not used to calculate a distance of displacement.

93. The apparatus of claim 91, wherein an azimuth is calculated on the basis of an average between said alignments corresponding to a forward and return path.

94. The apparatus of claim 91, wherein said about turn is considered to be effected only on the further condition that a trajectory effected after said azimuth rate of change of said pedestrian exceeds a determined threshold is statistically shorter than or equal to the straight trajectory effected before said azimuth rate of change of said pedestrian exceeds a determined threshold.

95. The apparatus of claim 52, wherein said accelerations are detected by means of two mutually orthogonal acceleration sensors each delivering an acceleration component operatively aligned along a respective orthogonal axis, the alignment of at least one of said sensors having a component in a non vertical direction when operatively carried by said pedestrian.

96. The apparatus of claim 95, wherein at least one said axis of an accelerometer is inclined with respect to a vertical axis of said pedestrian.

97. An apparatus for pedestrian navigation operative in a dead reckoning mode, comprising:

means for detecting an evolving signal indicative of accelerations of said pedestrian in an antero-posterior (forward-backward) direction, means for analyzing said signals to determine a variation therein conforming to predetermined constraints, means using said variation to establish a displacement step motion and to determine displacement information comprising at least one of a speed and distance of displacement, means for determining an azimuth of said pedestrian, and means for combining said displacement data with said azimuth to obtain pedestrian navigation information.

98. An apparatus for pedestrian navigation operative in a dead reckoning mode, comprising:

an Inertial Navigation System (INS) serving as a source of acceleration signals, said system having a motion detection sensor responsive to accelerations along an antero-posterior (forward-backward) direction of said pedestrian, means for submitting signals from said INS to a waveform analysis to determine a step of said pedestrian, and means for determining pedestrian navigation information of said step from a previous point to a predicted point on the basis of said waveform analysis.

99. The apparatus of claim 98, wherein said INS also has a motion sensor responsive to accelerations along a lateral (left-right) direction of said pedestrian, signals therefrom being submitted to a waveform analysis to determine a left or right displacement effected by said pedestrian.

100. The apparatus of claim 98, wherein said INS also has a motion sensor responsive to accelerations along a vertical direction of said pedestrian, signals therefrom being submitted to a waveform analysis to provide a confirmation of a determination of a displacement step.

101. The apparatus of claim 98, wherein said INS further comprises bearing detection means in the form of magnetometer means or gyroscope means, said means being used to obtain an azimuth of said pedestrian for the determination of said navigation information.

102. The apparatus of claim 98, wherein said INS is in the form of a module carried on the waist of said pedestrian.

103. The apparatus of claim 98, wherein said INS is in the form of a module carried on trunk of said pedestrian.

104. The apparatus of claim 98, wherein said INS is in the form of a module that is carried on said pedestrian and is oriented independently of said pedestrian.

105. A method of determining a displacement of a pedestrian by detecting accelerations of said pedestrian, said method comprising the steps of:

detecting accelerations having at least a component that is substantially along a lateral (left-right) direction which is substantially non-vertical, determining at least one characteristic feature of said detected accelerations correlated with a displacement step motion, and determining said displacement from a previous point to a predicted point on the basis of said at least one determined characteristic feature.

106. The method of claim 105, wherein said characteristic determination step comprises the sub-steps of:

detecting a repetition of a said characteristic feature in said accelerations, measuring a time interval separating a currently detected and a previously detected said characteristic feature, and determining whether said time interval falls within at least one of an upper and a lower limit, and wherein said displacement determining step comprises the step of considering said currently detected characteristic feature as corresponding to a displacement step if said time interval falls within said upper and lower limits.

107. The method of claim 105, wherein said accelerations are detected by using sensors of an inertial navigation system (INS) in the form of a module that is carried on said pedestrian and is oriented independently of said pedestrian.

108. An apparatus for determining a displacement of a pedestrian by detecting accelerations of said pedestrian, said apparatus comprising:
sensing means for detecting accelerations having at least a component that is substantially along a lateral (left-right) direction which is substantially non-vertical,
characteristic determining means for determining at least one characteristic feature of said detected accelerations correlated with a displacement step motion, and
displacement determining means for determining said displacement from a previous point to a predicted point on the basis of said at least one determined characteristic feature.

109. The apparatus of claim 108, wherein said accelerations are detected by using sensors of an inertial navigation system (INS) in the form of a module that is carried on said pedestrian and is oriented independently of said pedestrian.

110. The apparatus of claim 108, wherein said characteristic determining means comprises:
means for detecting a repetition of a said characteristic feature in said accelerations,
means for measuring a time interval separating a currently detected and a previously detected said characteristic feature, and
means for determining whether said time interval falls within at least one of an upper and a lower limit,
and, wherein said displacement determining means comprises means for considering said currently detected characteristic feature as corresponding to a displacement step if said time interval falls within said upper and lower limits.

111. The method of claim 24, wherein said INS is in the form of a module that is carried on said pedestrian and is oriented independently of said pedestrian.

112. A method of determining a displacement of a pedestrian by detecting accelerations of said pedestrian, said method comprising the steps of:
detecting accelerations along a direction which is substantially non-vertical,
determining at least one characteristic feature of said detected accelerations correlated with a displacement step motion, and
determining said displacement from a previous point to a predicted point on the basis of said at least one determined characteristic feature, wherein said accelerations are detected along an antero-posterior (forward-backward) direction of said pedestrian.

113. The method of claim 112, wherein said characteristic determination step comprises the sub-steps of:
detecting a repetition of a said characteristic feature in said accelerations,
measuring a time interval separating a currently detected and a previously detected said characteristic feature, and
determining whether said time interval falls within at least one of an upper and a lower limit, wherein said displacement determining step comprises the step of considering said currently detected characteristic feature as corresponding to a displacement step if said time interval falls within said upper and lower limits.

114. The method of claim 112, further comprising a step of distinguishing between whether said pedestrian is making a step in an antero-posterior sense (forward or backward direction) on the one hand, and in a lateral sense (left or right direction) on the other, said distinguishing step comprising:
determining a variance of successive acceleration values over a given time period for both an acceleration in the antero-posterior sense and in the lateral sense,
comparing the variance determined for the antero-posterior acceleration values with the variance determined for the lateral acceleration values,
determining that said pedestrian is making a step in said antero-posterior sense if the variance of said antero-posterior acceleration values exceeds the variance of said lateral acceleration values, and
determining that said pedestrian is making a step in said lateral sense if the variance of said lateral acceleration values exceeds the variance of said antero-posterior acceleration values.

115. The method of claim 112, comprising a step of distinguishing between forward and backward steps relative to said pedestrian, said distinguishing step comprising:
detecting accelerations along the antero-posterior (forward-backward) direction relative to said pedestrian,
determining a time of occurrence of a current first characteristic value and a previous first characteristic value in the antero-posterior accelerations,
determining whether a time interval separating said current and previous first characteristic values is within determined time limits,
determining a time of occurrence of a second characteristic value in the antero-posterior accelerations occurring within a time range at least sufficiently large to contain said determined time limits, and
discriminating between a forward and a backward step on the basis of the order of occurrence of said current first characteristic value and said second characteristic value.

116. The method of claim 112, wherein a step direction in at least one of an antero-posterior (forward-backward) sense and a lateral (left-right) sense is distinguished using a model adapted to recognize patterns in detected acceleration values that are representative of specific step directions.

117. The method of claim 112, wherein:
said acceleration detecting step comprises acquiring successive acceleration values,
said characteristic and displacement determination steps comprise the sub-steps of:
determining a current peak acceleration in said successive acceleration values by means of a sliding window,
determining a variance of said successive acceleration values acquired between said current peak and a previous peak acceleration value,
comparing said variance to an adaptive threshold to detect if said pedestrian is walking or not,
determining whether a time interval between two successive peak acceleration values falls within a physiologically possible time interval, and
storing the time of acquisition of said current peak acceleration value as the time of occurrence of a detected foot impact corresponding to a displacement step.

118. The method of claim 112, wherein said displacement determining step involves determining a distance traveled by using at least one first model which yields a pedestrian displacement speed in response to a variance and/or a frequency of occurrence of said characteristic feature in values of said acquired accelerations, and at least a time indicator or a second model which correlates the pedestrian displacement speed obtained by said first model with a step length.

119. The method of claim 112, further comprising the step of azimuth computation for each step or group of steps effected to determine a position of said pedestrian.

120. The method of claim 112, further comprising a step of detecting an about turn in said displacement of said pedestrian, comprising:
    detecting a condition in which an azimuth rate of change of said pedestrian exceeds a determined threshold,
    determining whether said azimuth rate of change corresponds roughly to a 180° turn,
    in the affirmative, determining whether alignments of trajectories before and after said turn are the same to within a determined discrepancy limit, and
    in the affirmative, considering that an about turn is affected.

121. The method of claim 112, wherein said accelerations are detected by means of three mutually orthogonal acceleration sensors each delivering an acceleration component of a respective orthogonal axis on a separate channel.

122. An apparatus for determining a displacement of a pedestrian by detecting accelerations of said pedestrian, said apparatus comprising:
    sensing means for detecting accelerations along a direction which is substantially non-vertical,
    characteristic determining means for determining at least one characteristic feature of said detected accelerations correlated with a displacement step motion, and
    displacement determining means for determining said displacement from a previous point to a predicted point on the basis of said at least one determined characteristic feature, wherein said accelerations are detected along an antero-posterior (forward-backward) direction of said pedestrian.

123. The apparatus of claim 122, wherein said characteristic determining means comprises:
    means for detecting a repetition of a said characteristic feature in said accelerations,
    means for measuring a time interval separating a currently detected and a previously detected said characteristic feature, and
    means for determining whether said time interval falls within at least one of an upper and a lower limit, wherein said displacement determining means comprises means for considering said currently detected characteristic feature as corresponding to a displacement step if said time interval falls within said upper and lower limits.

124. The apparatus of claim 122, further comprising first distinguishing means for distinguishing between whether said pedestrian is making a step in an antero-posterior sense (forward or backward direction) on the one hand, and in a lateral sense (left or right direction) on the other, said first distinguishing means comprising:
    means for determining a variance of successive acceleration values over a given time period for both an acceleration in the antero-posterior sense and in the lateral sense,
    means for comparing the variance determined for the antero-posterior acceleration values with the variance determined for the lateral acceleration values,
    means for determining that said pedestrian is making a step in said antero-posterior sense if the variance of said antero-posterior acceleration values exceeds the variance of said lateral acceleration values, and
    means for determining that said pedestrian is making a step in said lateral sense if the variance of said lateral acceleration values exceeds the variance of said antero-posterior acceleration values.

125. The apparatus of claim 122, further comprising second distinguishing means for distinguishing between forward and backward steps relative to said pedestrian, said second distinguishing means comprising:
    means for detecting accelerations along the antero-posterior (forward-backward) direction relative to said pedestrian,
    means for determining a time of occurrence of a current first characteristic value and a previous first characteristic value in the antero-posterior accelerations,
    means for determining whether a time interval separating said current and previous first characteristic values is within determined time limits,
    means for determining a time of occurrence of a second characteristic value in the antero-posterior accelerations occurring within a time range at least sufficiently large to contain said determined time limits, and
    means for discriminating between a forward and a backward step on the basis of the order of occurrence of said current first characteristic value and said second characteristic value.

126. The apparatus of claim 122, wherein said characteristic determination means comprises:
    means for determining a first time corresponding to an occurrence of a characteristic feature in said accelerations along a substantially non-vertical direction of said pedestrian,
    means for detecting accelerations along a vertical direction of said pedestrian,
    means for determining a second time corresponding to an occurrence of said characteristic feature in said accelerations along a vertical direction of said pedestrian,
    means for comparing said first and second times, and
    means using a result of said comparison to confirm the presence of a displacement step.

127. The apparatus of claim 122, wherein said displacement determining means comprises means for determining a distance traveled by using at least one first model which yields a pedestrian displacement speed in response to a variance and/or a frequency of occurrence of said characteristic feature in values of said acquired accelerations, and at least a second model which correlates the pedestrian displacement speed obtained by said first model with a step length.

128. The apparatus of claim 122, further comprising means for detecting an about turn in said displacement of said pedestrian, comprising:
    means for detecting a condition in which an azimuth rate of change of said pedestrian exceeds a determined threshold,
    means for determining whether said azimuth rate of change corresponds roughly to a 180° turn,
    means, operative in the affirmative, for determining whether alignments of trajectories before and after said turn are the same to within a determined discrepancy limit, and
    means, operative in the affirmative, for considering that an about turn is affected.

129. The apparatus of claim 122, wherein said accelerations are detected by means of three mutually orthogonal acceleration sensors each delivering an acceleration component of a respective orthogonal axis on a separate channel.

130. A method of pedestrian navigation operative in a dead reckoning mode, comprising the steps of:

detecting an evolving signal indicative of accelerations of said pedestrian in a lateral (left-right) direction, analyzing said signals to determine a variation therein conforming to predetermined constraints, using said variation to establish a displacement step motion from a previous point to a predicted point, and to determine displacement information comprising at least one of a speed and distance of displacement, determining an azimuth of said pedestrian, and combining said displacement data with said azimuth to obtain pedestrian navigation information.

131. A method of pedestrian navigation operative in a dead reckoning mode, comprising the steps of:

using an Inertial Navigation System (INS) as a source acceleration signals, said system having a motion detection sensor responsive to accelerations along a lateral (left-right) direction of said pedestrian, submitting signals from said INS to a waveform analysis to determine a step of said pedestrian, and determining pedestrian navigation information of said step from a previous point to a predicted point on the basis of said waveform analysis.

132. The method of claim 131, wherein said INS is in the form of a module that is carried on said pedestrian and is oriented independently of said pedestrian.

133. An apparatus for pedestrian navigation operative in a dead reckoning mode, comprising:

means for detecting an evolving signal indicative of accelerations of said pedestrian in a lateral (left-right) direction, means for analyzing said signals to determine a variation therein conforming to predetermined constraints, means using said variation to establish a displacement step motion and to determine displacement information comprising at least one of a speed and distance of displacement, means for determining an azimuth of said pedestrian, and means for combining said displacement data with said azimuth to obtain pedestrian navigation information.

134. An apparatus for pedestrian navigation operative in a dead reckoning mode, comprising:

an Inertial Navigation System (INS) serving as a source acceleration signals, said system having a motion detection sensor responsive to accelerations along a lateral (left-right) direction of said pedestrian, means for submitting signals from said INS to a waveform analysis to determine a step of said pedestrian, and means for determining pedestrian navigation information of said step from a previous point to a predicted point on the basis of said waveform analysis.

135. The apparatus of claim 134, wherein said INS is in the form of a module that is carried on said pedestrian and is oriented independently of said pedestrian.

136. A method of determining a displacement of a pedestrian by detecting accelerations of said pedestrian, said method comprising the steps of:

detecting accelerations along a direction which is substantially non-vertical, determining at least one characteristic feature of said detected accelerations determining said displacement from a previous point to a predicted point on the basis of said at least one determined characteristic feature, wherein said accelerations are detected along a lateral (left-right) direction of said pedestrian.

137. The method of claim 136, wherein said characteristic determination step comprises the sub-steps of:

detecting a repetition of a said characteristic feature in said accelerations, measuring a time interval separating a currently detected and a previously detected said characteristic feature, and determining whether said time interval falls within at least one of an upper and a lower limit, wherein said displacement determining step comprises the step of considering said currently detected characteristic feature as corresponding to a displacement step from a previous point to a predicted point if said time interval falls within said upper and lower limits.

138. An apparatus for determining a displacement of a pedestrian by detecting accelerations of said pedestrian, said apparatus comprising:

sensing means for detecting accelerations along a direction which is substantially non-vertical, characteristic determining means for determining at least one characteristic feature of said detected accelerations correlated with a displacement step motion, and displacement determining means for determining said displacement from a previous point to a predicted point on the basis of said at least one determined characteristic feature, wherein said accelerations are detected along a lateral (left-right) direction of said pedestrian.

139. The apparatus of claim 138, wherein said characteristic determining means comprises:

means for detecting a repetition of a said characteristic feature in said accelerations, means for measuring a time interval separating a currently detected and a previously detected said characteristic feature, and means for determining whether said time interval falls within at least one of an upper and a lower limit, wherein said displacement determining means comprises means for considering said currently detected characteristic feature as corresponding to a displacement step if said time interval falls within said upper and lower limits.

* * * * *

UNITED STATES PATENT AND TRADEMARK OFFICE
CERTIFICATE OF CORRECTION

PATENT NO. : 6,826,477 B1
APPLICATION NO. : 09/839204
DATED : November 30, 2004
INVENTOR(S) : Quentin Ladetto, Vincent Gabaglio and Joesphus Van Seeters It is certified that error appears in the above-identified patent and that said Letters Patent is hereby corrected as shown below:

On Column 5, line 46,
Please delete the following:

$^B$+C, where AB, and C are numerical coefficients.

and Replace with:

$^B$+C, where A, B, and C are numerical coefficients.

On Column 38, line 13,
Please delete the following:

2-dimensional relative speed = D*(variance)E + and Replace with:

2-dimensional relative speed = D*(variance)$^E$ +

On Column 38, line 17,
Please delete the following:

where, D, F and F are numerical coefficients from which and Replace with:

where, D, E and F are numerical coefficients from which

On Column 38, line 31,
Please delete the following:

B+C and Replace with:

$^B$+C

UNITED STATES PATENT AND TRADEMARK OFFICE
CERTIFICATE OF CORRECTION

PATENT NO. : 6,826,477 B1
APPLICATION NO. : 09/839204
DATED : November 30, 2004
INVENTOR(S) : Quentin Ladetto, Vincent Gabaglio and Joesphus Van Seeters It is certified that error appears in the above-identified patent and that said Letters Patent is hereby corrected as shown below:

On Column 44, line 2,
Please delete the following:

E+F* frequency of steps displacement speed=2- and Replace with:

$^E$+F* frequency of steps displacement speed=2-

On Column 44, line 19,
Please delete the following:

B+C, displacement speed=2-dimensional displacement and Replace with:

$^B$+C, displacement speed=2-dimensional displacement

Signed and Sealed this

Twenty-ninth Day of January, 2008

JON W. DUDAS
*Director of the United States Patent and Trademark Office*